(12) United States Patent
Clarke et al.

(10) Patent No.: US 7,574,071 B2
(45) Date of Patent: Aug. 11, 2009

(54) METHOD AND APPARATUS FOR RESIZING IMAGES

(75) Inventors: Ian Clarke, Toronto (CA); Hui Zhou, Toronto (CA); Jeffrey Matthew Achong, Brampton (CA)

(73) Assignee: Seiko Epson Corporation, Tokyo (JP)

( * ) Notice: Subject to any disclaimer, the term of this patent is extended or adjusted under 35 U.S.C. 154(b) by 836 days.

(21) Appl. No.: 10/958,838

(22) Filed: Oct. 5, 2004

(65) Prior Publication Data

US 2006/0072853 A1 Apr. 6, 2006

(51) Int. Cl.
*G06K 9/32* (2006.01)
(52) U.S. Cl. .................. 382/298; 382/299; 382/276
(58) Field of Classification Search ............... 382/269, 382/298, 299
See application file for complete search history.

(56) References Cited

U.S. PATENT DOCUMENTS

| | | | |
|---|---|---|---|
| 4,853,794 A | 8/1989 | Fukumoto et al. | |
| 4,885,786 A | 12/1989 | Anderson et al. | |
| 5,329,614 A | 7/1994 | Kidd et al. | |
| 5,465,308 A | 11/1995 | Hutcheson et al. | |
| 5,511,137 A | 4/1996 | Okada | |
| 5,588,435 A | 12/1996 | Weng et al. | |
| 5,781,665 A * | 7/1998 | Cullen et al. | 382/254 |
| 5,793,350 A | 8/1998 | Chandavarkar et al. | |
| 5,960,126 A * | 9/1999 | Nielsen et al. | 382/298 |
| 5,974,199 A * | 10/1999 | Lee et al. | 382/289 |
| 6,084,598 A | 7/2000 | Chekerylla | |
| 6,125,201 A | 9/2000 | Zador | |
| 6,157,749 A | 12/2000 | Miyake | |
| 6,324,309 B1 | 11/2001 | Tokuyama et al. | |
| 6,389,180 B1 | 5/2002 | Wakisawa et al. | |
| 6,392,711 B1 * | 5/2002 | Kesatoshi | 348/581 |
| 6,456,745 B1 * | 9/2002 | Bruton et al. | 382/298 |
| 6,507,677 B2 | 1/2003 | Miura et al. | |
| 6,584,237 B1 | 6/2003 | Abe | |
| 6,587,602 B2 | 7/2003 | Wakisawa et al. | |
| 7,266,250 B2 * | 9/2007 | Bloomberg et al. | 382/269 |
| 7,362,900 B2 * | 4/2008 | Urano et al. | 382/199 |
| 2001/0048771 A1 | 12/2001 | Sasaki | |
| 2003/0048271 A1 | 3/2003 | Liess et al. | |
| 2003/0081225 A1 | 5/2003 | Nakami et al. | |

* cited by examiner

*Primary Examiner*—Matthew C Bella
*Assistant Examiner*—Sean Motsinger

(57) ABSTRACT

A method of fractionally resizing an image comprises locating areas of sensitivity in the image. Adjustment lines in the image are selected at least partially based on the location of the located areas of sensitivity. The image is then resized along the adjustment lines. An apparatus for fractionally resizing an image is also provided.

30 Claims, 56 Drawing Sheets

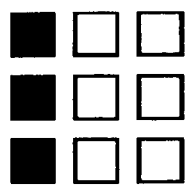 = 3
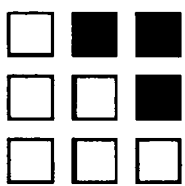 = 0
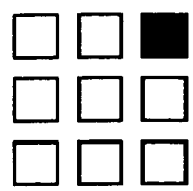 = 1
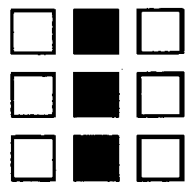 = 6
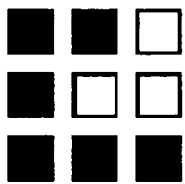 = 0
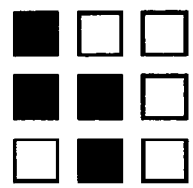 = 2
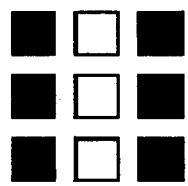 = 6
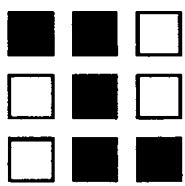 = 4
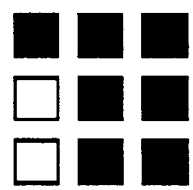 = 2
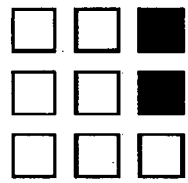 = 2
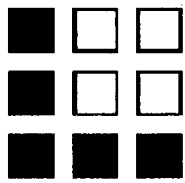 = 2
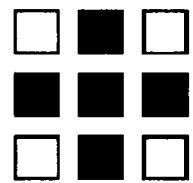 = 4
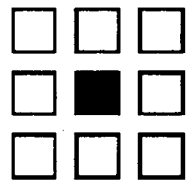 = 2
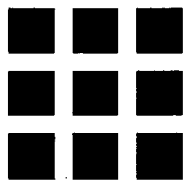 = 0
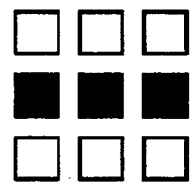 = 0
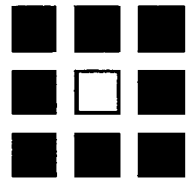 = 2
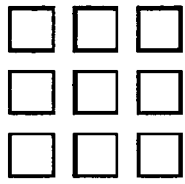 = 0
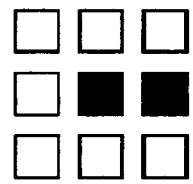 = 1
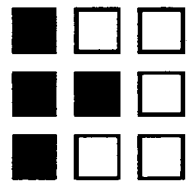 = 1
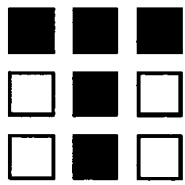 = 4
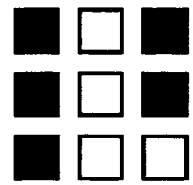 = 5
Fig. 11

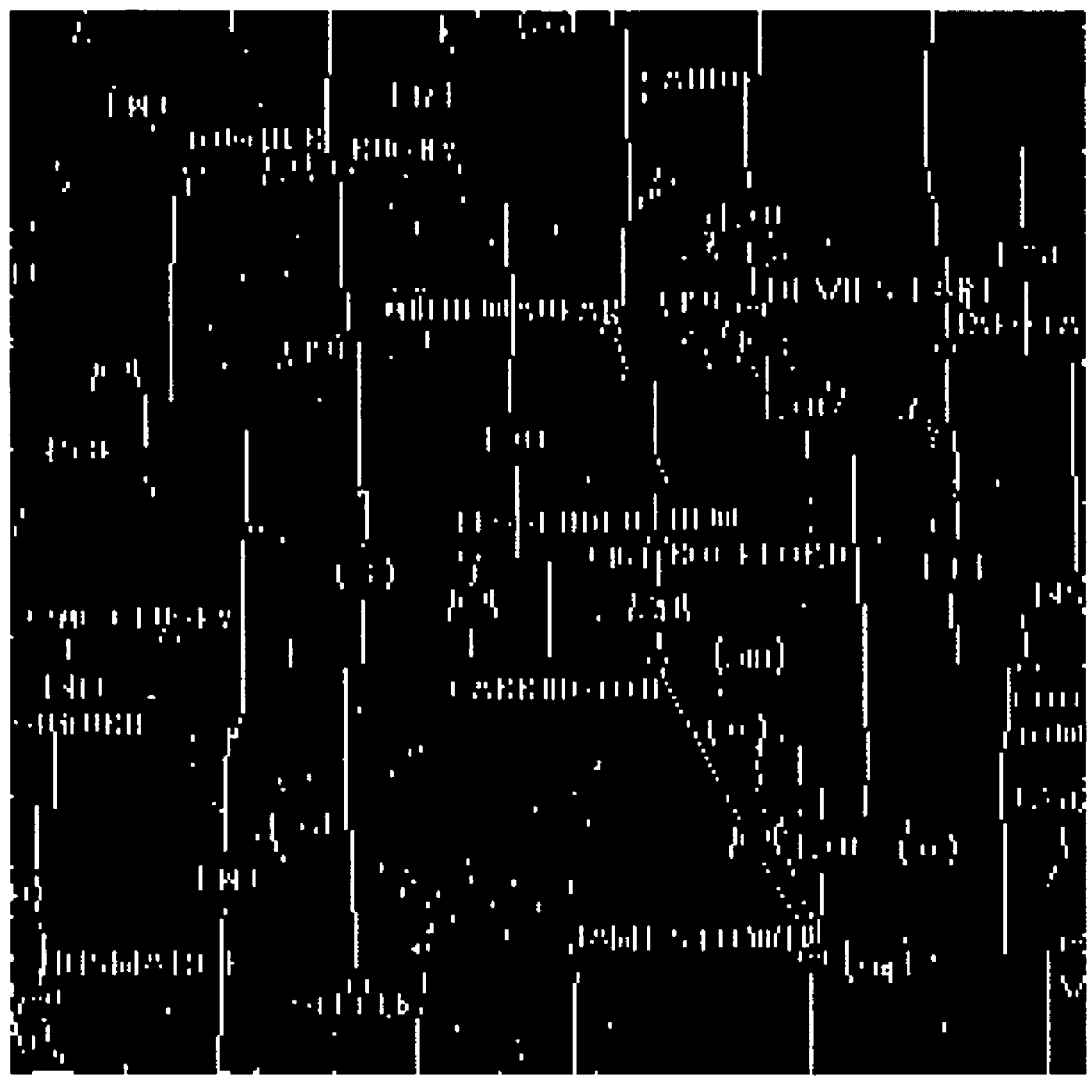
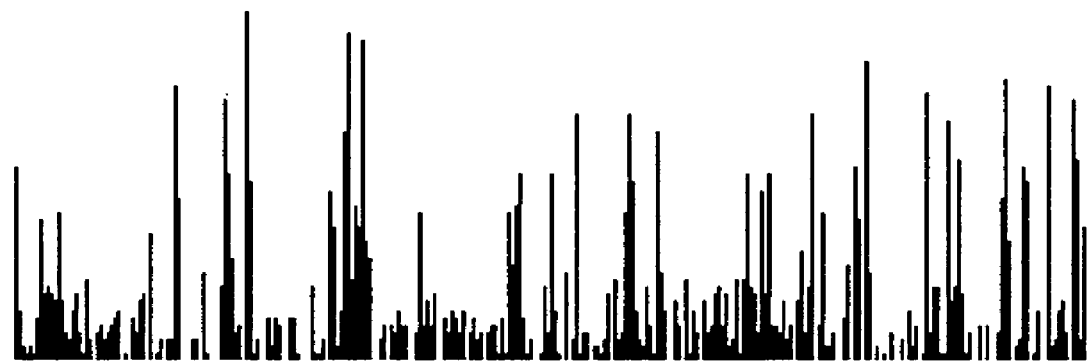
Fig. 15

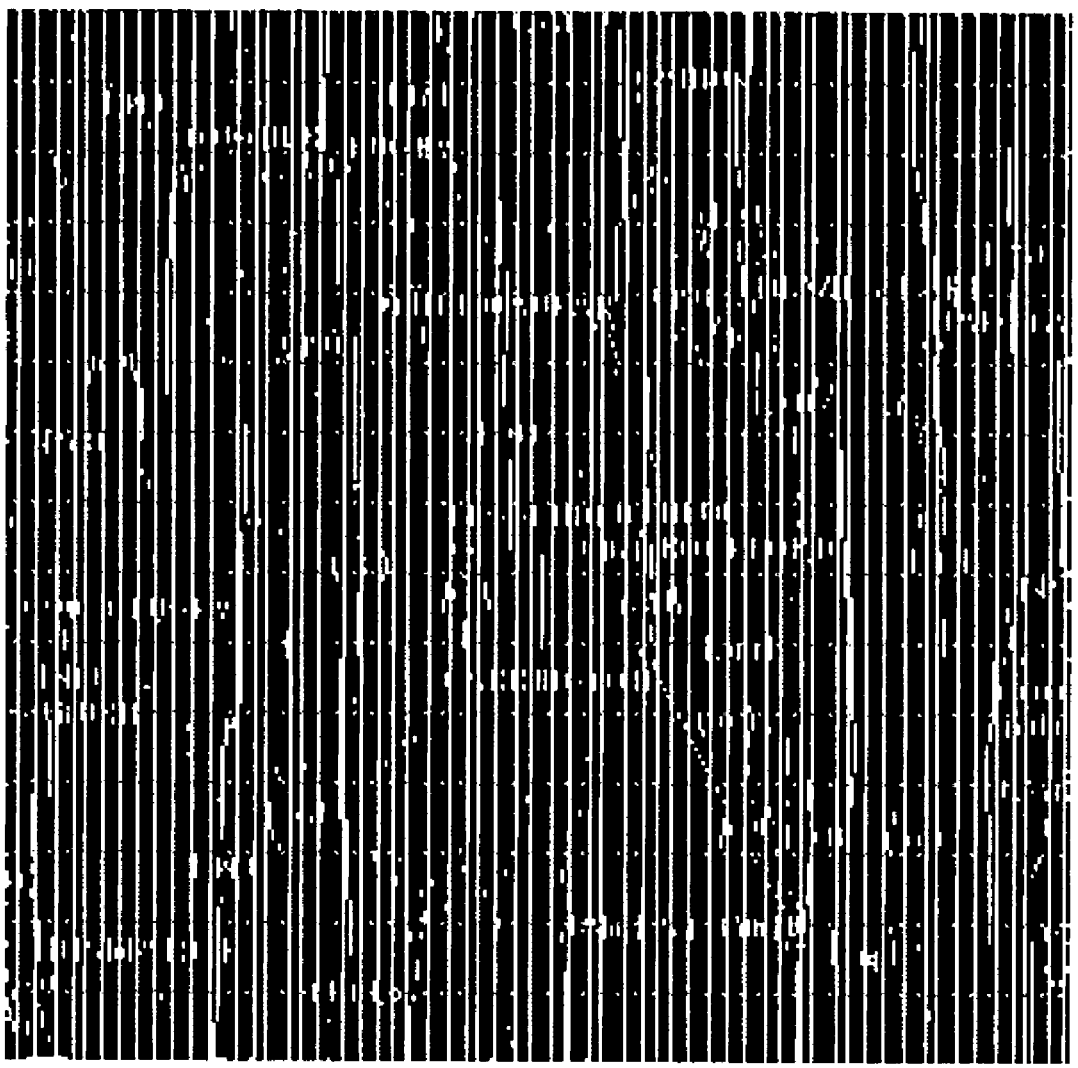
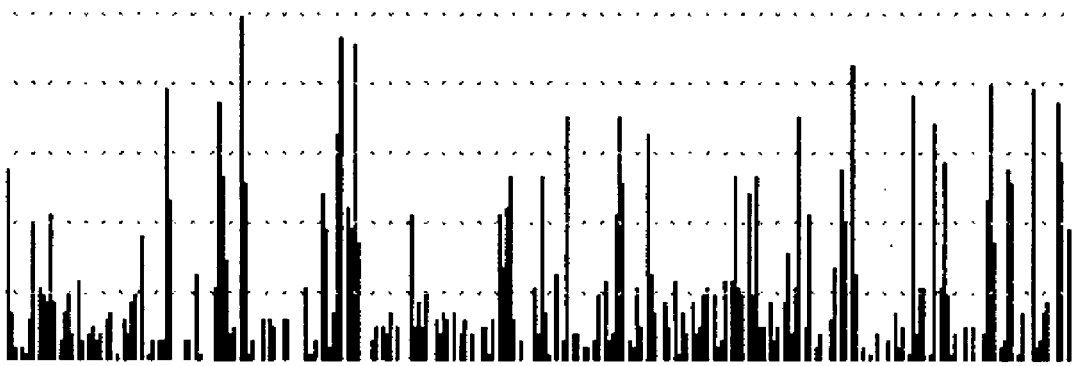
Fig. 16

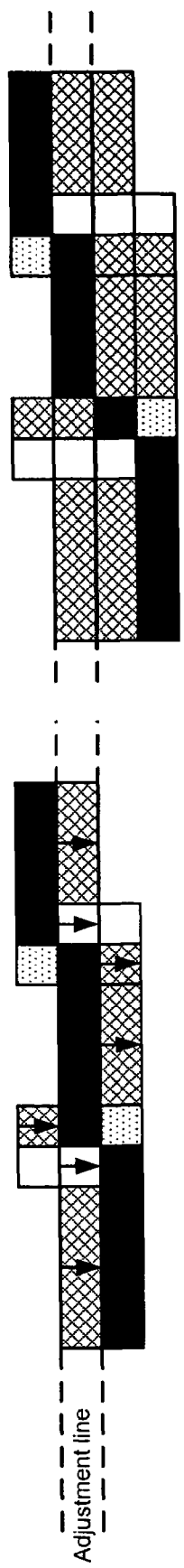

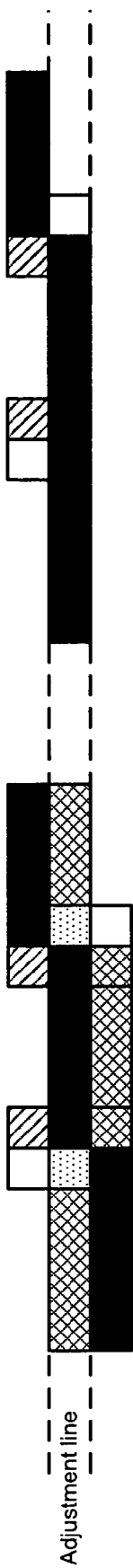

METHOD AND APPARATUS FOR RESIZING IMAGES

FIELD OF THE INVENTION

The present invention relates generally to digital image processing and more specifically, to a method and apparatus for resizing images.

BACKGROUND OF THE INVENTION

Capturing images in digital form and subjecting the captured images to digital image editing processes is commonplace. In some instances during digital image editing, it is desired to stretch or reduce an existing image so that it is resized to a desired form. For example, most photocopiers allow scanned documents to be resized to either larger or smaller forms.

During image resizing, horizontal and/or vertical pixel lines of the image to be resized are either duplicated or removed depending on whether the image to be resized is being stretched or reduced. The Nearest Neighbour method is a common technique used to duplicate or remove pixel lines during image resizing. Although the Nearest Neighbour method allows images to be resized quickly and relatively easily without requiring intensive processing, the Nearest Neighbour method suffers disadvantages. During image resizing using the Nearest Neighbour method, pixel lines are duplicated or removed arbitrarily without regard to the effect that the duplicated or removed pixel lines will have on the resized image. As a result, in the case of image reducing important information in the original image may be lost in the resized image. In the case of image stretching, pixel lines in the resized image may be thickened giving the resized image a different visual appearance.

Other image resizing methods such as for example, intensity adjustment, bilinear interpolation and bicubic interpolation resizing methods have been considered. Unfortunately, these methods also suffer disadvantages resulting in resized images that visually deviate from the original images. As will be appreciated, there exists a need for an image resizing technique that allows resized images to be generated while retaining the visual appearance of the original images.

It is therefore an object of the present invention to provide a novel method and apparatus for resizing images.

SUMMARY OF THE INVENTION

Accordingly, in one aspect of the present invention, there is provided a method of fractionally resizing an image. During the method, areas of sensitivity in the image to be resized are located. Adjustment lines in the image are selected at least partially based on the location of the areas of sensitivity. The image is then resized along the adjustment lines.

In one embodiment, the adjustment lines are selected to avoid areas of sensitivity. The areas of sensitivity are edges in the image. The image is resized according to a non-integer scaling factor. For scaling factors below one, the adjustment lines are deleted during resizing and for scaling factors greater than one, the adjustment lines are duplicated during resizing. The adjustment lines are examined to detect zones thereof passing through areas of sensitivity. Upon deleting or duplicating adjustment lines, the detected zones are replaced with image information selected to maintain visual continuity in the resized image.

The image is divided into a number of regions with each region encompassing an adjustment line. The regions are generally evenly-sized. Subsets of the regions are examined to determine the extent to which lines therein pass through areas of sensitivity. The results of the examining are used to select the adjustment lines. Corresponding subsets of regions are examined to determine the set of adjustment lines for each subset group that avoids areas of sensitivity to the greatest extent. The sets of adjustment lines are compared to detect and select the set of adjustment lines that overall avoids areas of sensitivity to the greatest extent.

In one embodiment, the adjustment lines are parallel lines of image pixels. The locating, selecting and resizing are first performed along a first dimension of the image and are then repeated for a second orthogonal dimension of the image.

According to another aspect of the present invention, there is provided a method of fractionally resizing an image. During the method, areas of sensitivity in the image are located and the image is resized along unevenly spaced lines in the image to avoid resizing along lines passing through localized areas of sensitivity.

According to yet another aspect of the present invention, there is provided a method of fractionally resizing an image according to a non-integer scaling factor. During the method, a number of adjustment lines in the image distributed generally evenly across the image are selected according to the scaling factor. For scaling factors below one, the adjustment lines are deleted during resizing and for scaling factors greater than one, the adjustment lines are duplicated during resizing. Areas of sensitivity in the image are identified and the positions of the adjustment lines are adjusted to reduce the intersection of the adjustment lines with the identified areas of sensitivity. The image is then resized along the adjustment lines.

According to yet another aspect of the present invention, there is provided a computer readable medium embodying a computer program for fractionally resizing an image. The computer program includes computer program code for locating areas of sensitivity in the image, computer program code for selecting adjustment lines in the image at least partially based on the location of the areas of sensitivity, and computer program code for resizing the image along the adjustment lines.

According to still yet another aspect of the present invention, there is provided an apparatus for fractionally resizing an image according to a non-integer scaling factor. The apparatus includes an image processor examining the image to locate areas of sensitivity in the image. The image processor selects unevenly spaced adjustment lines in the image, with the adjustment lines being selected to avoid areas of sensitivity in the image. The image processor resizes the image by duplicating selected adjustment lines during an image stretch and by deleting selected adjustment lines during an image reduction.

The image resizing method and apparatus provide advantages in that images are resized in a manner that is sensitive to the information contained in the images. In this manner, resized images retain the visual appearance of the original images. This is achieved by selecting adjustment lines to be duplicated or removed at least partially based on the location of areas of sensitivity in the image. As a result, the negative effects of image resizing can be reduced, resulting in a visually pleasing resized image. Where at least some consideration is given to the uniform distribution of the adjustment lines, the general proportions of the original image are preserved in the resized image without excessive morphing or distortion.

In addition, by adjusting portions of the image corresponding to areas of intersection between the adjustment lines and the areas of sensitivity, visual distortion in the resized image is reduced. Also, as intensity values in the resized image are restricted to those in the range of the intensity spectrum of the original image, image quality is preserved.

BRIEF DESCRIPTION OF THE DRAWINGS

Embodiments of the present invention will now be described, by way of example only, with reference to the accompanying drawings in which:

FIG. 11 shows exemplary pixel sub-arrays and resulting intensity values generated by the unidirectional vertical edge detector of FIG. 10;

FIG. 15 shows the image of FIG. 13 together with an edge histogram by column;

FIG. 16 shows adjustment lines through the image of FIG. 15 that are selected using the edge histogram of FIG. 15;

FIGS. 18a and 18b show an exemplary locator pattern and a corresponding replacement pixel pattern used during image stretching;

FIGS. 19a and 19b show an exemplary locator pattern and a corresponding replacement pixel pattern used during image reducing.

DETAILED DESCRIPTION OF THE EMBODIMENTS

A method and apparatus for resizing an image are provided to overcome disadvantages associated with prior art image resizing techniques and allow a resized image to be generated that retains the visual qualities of the original image. Initially, areas of sensitivity in the image to be resized are located. Adjustment lines in the image are then selected based at least partially on the located areas of sensitivity. The image is then resized along the adjustment lines. By selecting adjustment lines based on the located areas of sensitivity, the negative effects typically associated with image resizing are reduced resulting in a high resolution resized image.

Figure 1:
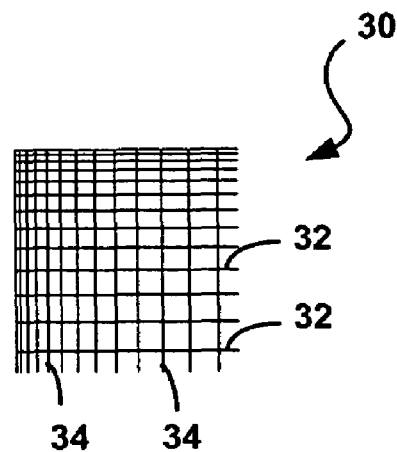
FIG. 1 is a binary image of a logarithmic grid to be resized.

For ease of understanding, the prior art Nearest Neighbour method of imaging resizing will firstly by described to highlight problems associated with prior art image resizing techniques. Turning now to FIG. 1, a sample digital binary input image 30 to be resized is shown. In this example, the digital binary input image 30 comprises a plurality of horizontal rows and vertical columns of black pixels. The rows and columns of black pixels define foreground horizontal and vertical pixel lines 32 and 34 respectively, arranged to create a logarithmic grid on a white background. The foreground pixel lines 32 and 34 are of equal thickness.

Consider the case where the digital input image 30 of FIG. 1 is to be resized only in the horizontal direction, using the Nearest Neighbour method. For a given pixel row in a horizontally resized output image, pixels $p_{out}$ at column positions $c_{out}$ in the given row of the resized output image can be related to pixels $p_{in}$ at column positions $c_{in}$ in a corresponding pixel row of the original input image according to the equation:

$$\frac{c_{out}}{w_{out}} = \frac{c_{in}}{w_{in}} \quad (0.1)$$

where:
$w_{out}$ is the width of the resized output image;
$w_{in}$ is the width of the original input image;
$c_{out}$ is the column position of the resized output image; and
$c_{in}$ is the column position of the original input image.

Manipulating equation (0.1) yields the following equation:

$$c_{in} = \frac{c_{out} \times w_{in}}{w_{out}} \quad (0.2)$$

As can be seen, equation (0.2) clearly illustrates how pixels in a row of a resized output image are related to pixels in a corresponding row of the original input image. That is, the pixel at column number $c_{out}$ in the resized output image is assigned the value of the pixel at column number $c_{in}$ in the original input image scaled by the width ratio of the original input image and resized output image.

During image resizing in the horizontal direction, the above relationship between pixels in each row of the resized output image and pixels in corresponding rows of the original input image, is used to select values for the pixels in the resized output image based on the values of pixels in the original input image. Depending on the degree of resizing, in many cases, the value determined for $c_{in}$ may be a non-integer and thus, pixels in the original input image that map directly to pixels in the resized output image may not exist. When $c_{in}$ is a non-integer, during image resizing using the Nearest Neighbour method, $c_{in}$ is typically set to the next highest or next lowest integer value. The selected integer value can be arbitrarily selected or selected based on proximity to a pixel column. With the value $c_{in}$ set to an integer value, values for the pixels in each row of the resized output image can be determined based on the values of related pixels in corresponding rows of the original input image.

When the image to be resized is being stretched horizontally, vertical pixel lines in the original input image are duplicated in the resized output image. When the image to be resized is being reduced horizontally, vertical pixel lines in the original input image are removed and do not appear in the resized output image.

Rather than setting the value of $c_{in}$ to an integer value when the value $c_{in}$ is a non-integer, the values for pixels in the original input image that are to be used to determine the values for pixels in the resized output image can be determined by bilinearly interpolating between the pixels in the original input image that are on opposite sides of the value of $c_{in}$. In this manner, the values for the pixels in the original input image that are used to determine the values for pixels in the resized output image are weighted averages of the pixel values at adjacent integer pixel columns based on the relative proximity of the value $c_{in}$ to the integer pixel columns. While this interpolation method may be satisfactory in some circumstances, such as for example, in some color photographs, in other circumstances it is not acceptable or feasible, as detail sharpness is sacrificed for graduated color transitions.

Many anomalies can result using the Nearest Neighbour method during image resizing. For example, where two pixels in a row of the resized output image are assigned values based on the same pixel in the original input image during a minor stretch, details in the original input image such as vertical lines of single pixel thickness can be disproportionately adjusted in the resized output image. Similarly, for image reductions, the values of some pixels in the original input image may not be used to compute values for pixels in the resized output image. If these unused pixels correspond to an area of sensitivity in the original input image, important image information can be lost.

Figure 2:
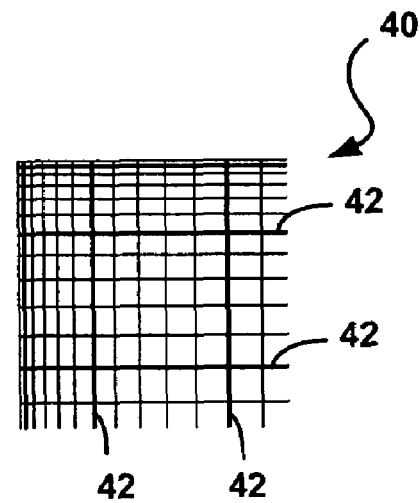
FIG. 2 shows the image of FIG. 1 after being stretched using the prior art Nearest Neighbor method.

FIG. 2 shows a resized output image 40 derived from the binary input image 30 of FIG. 1. In this case, the input image 30 has been stretched horizontally and vertically using the Nearest Neighbour method thereby to increase its width and height by 20%. During stretching, horizontal and vertical pixel lines in the input image 30 are duplicated in the resized output image 40. As some of the foreground pixel lines 32 and 34 in the original input image 30 lay on pixel columns and rows that are duplicated in order to stretch the input image, lines of double thickness 42 appear in the resized output image 40. Foreground pixel lines 32 and 34 in the input image 30 that do not lie on duplicated pixel lines retain their original thickness in the resized output image 40. In the example of FIG. 2, there are six foreground pixel lines 42 of double thickness (three vertical and three horizontal) in the resulting resized output image 40. As a result of this foreground pixel line width doubling, the resized output image 40 does not appear to be a simple magnification of the input image 30, as the foreground pixel lines, which were originally all of equal width, are now of varying widths.

Figure 3:
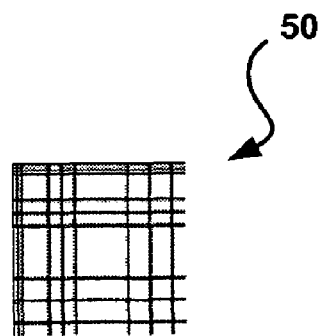
FIG. 3 shows the image of FIG. 1 after being reduced using the prior art Nearest Neighbor method.

FIG. 3 also shows a resized output image 50 derived from the binary input image 30 of FIG. 1. In this case, the input image 30 has been reduced both horizontally and vertically using the Nearest Neighbour method thereby to decrease its width and height by 20%. During reducing, some of the horizontal and vertical foreground pixel lines in the input image 30 are absent from the resized output image 50. In particular, some of the horizontal and vertical foreground pixel lines of the input image 30, having a thickness of one pixel, do not appear in the resized output image 50. As a result of this foreground pixel line deletion, the resized output image 50 does not appear to be a simple demagnification of the input image 30. Also, by deleting foreground pixel lines valuable image information can be lost.

Figure 4:
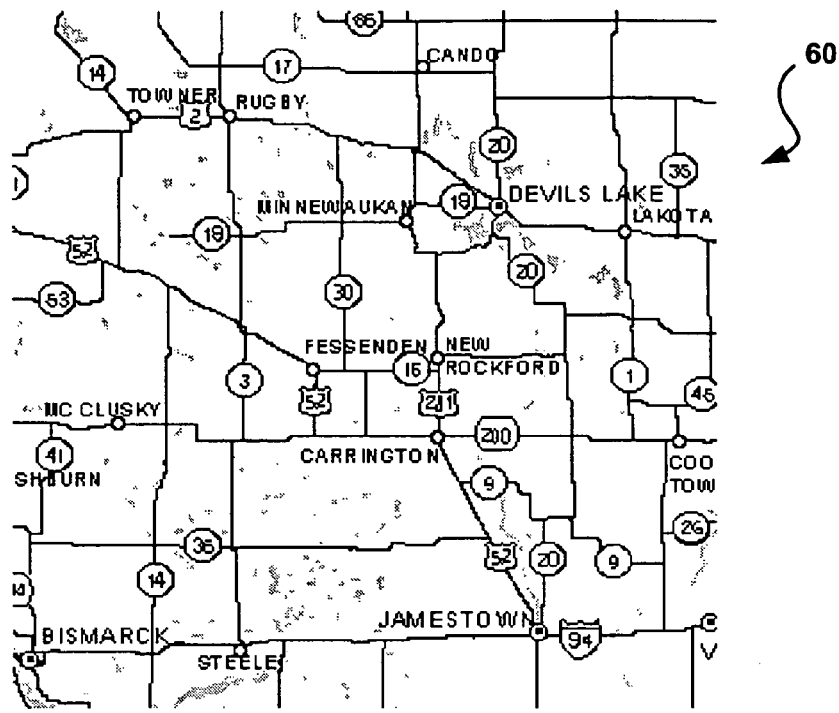
FIG. 4 is a greyscale image of a map to be resized.

To further illustrate the Nearest Neighbour method of resizing an image, another image 60 to be resized is shown in FIG. 4. The image 60 is a 300-by-300 pixel grayscale map having a number of horizontal and vertical straight black foreground elements (streets) on a white background. Gray features corresponding to lakes and ponds are also shown on the map 60.

Figure 5:
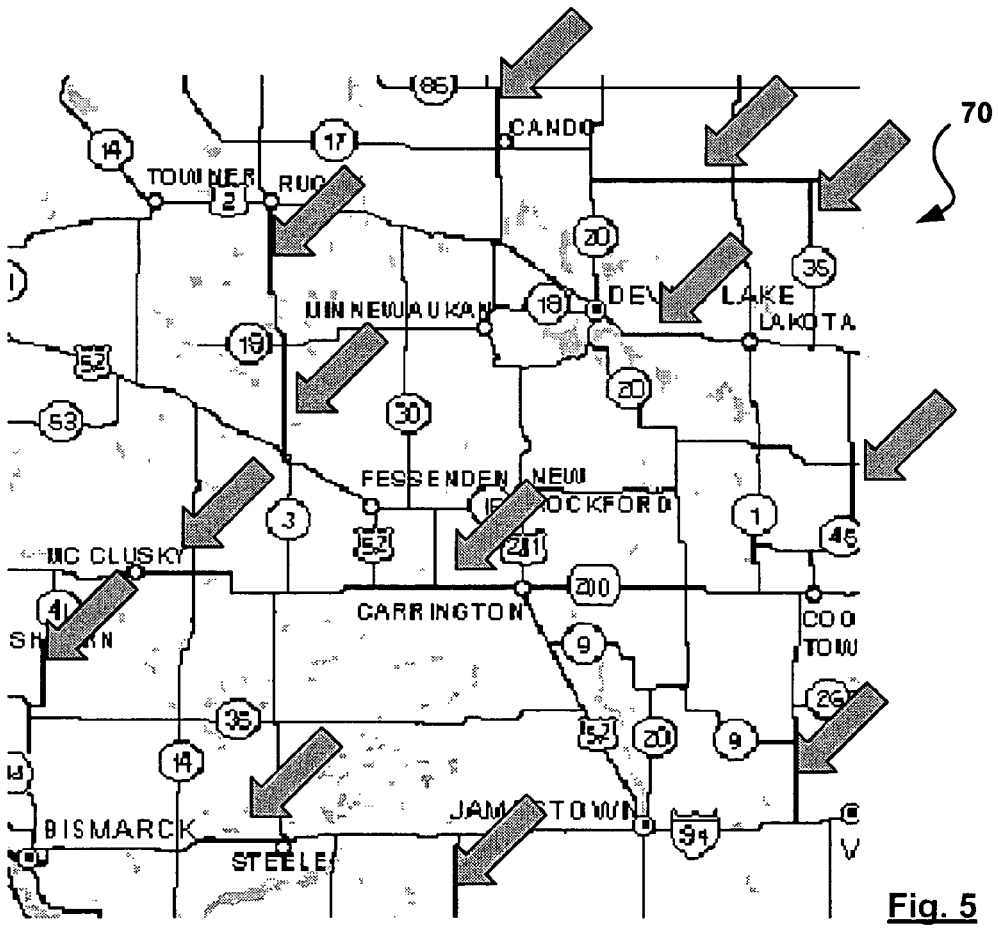
FIG. 5 shows the image of FIG. 4 after being stretched in both horizontal and vertical directions using the prior art Nearest Neighbor method.

FIG. 5 shows a resized output image 70 corresponding to image 60 after stretching using the Nearest Neighbour method in both horizontal and vertical directions. As can be seen, resizing has resulted in a number of aberrations in the resized output image 70. Specifically, a number of horizontal and vertical foreground elements representing streets identified by the arrows have doubled in thickness. Once again, the resized output image 70 does not appear to be a simple magnification of the input image 60.

Figure 6:
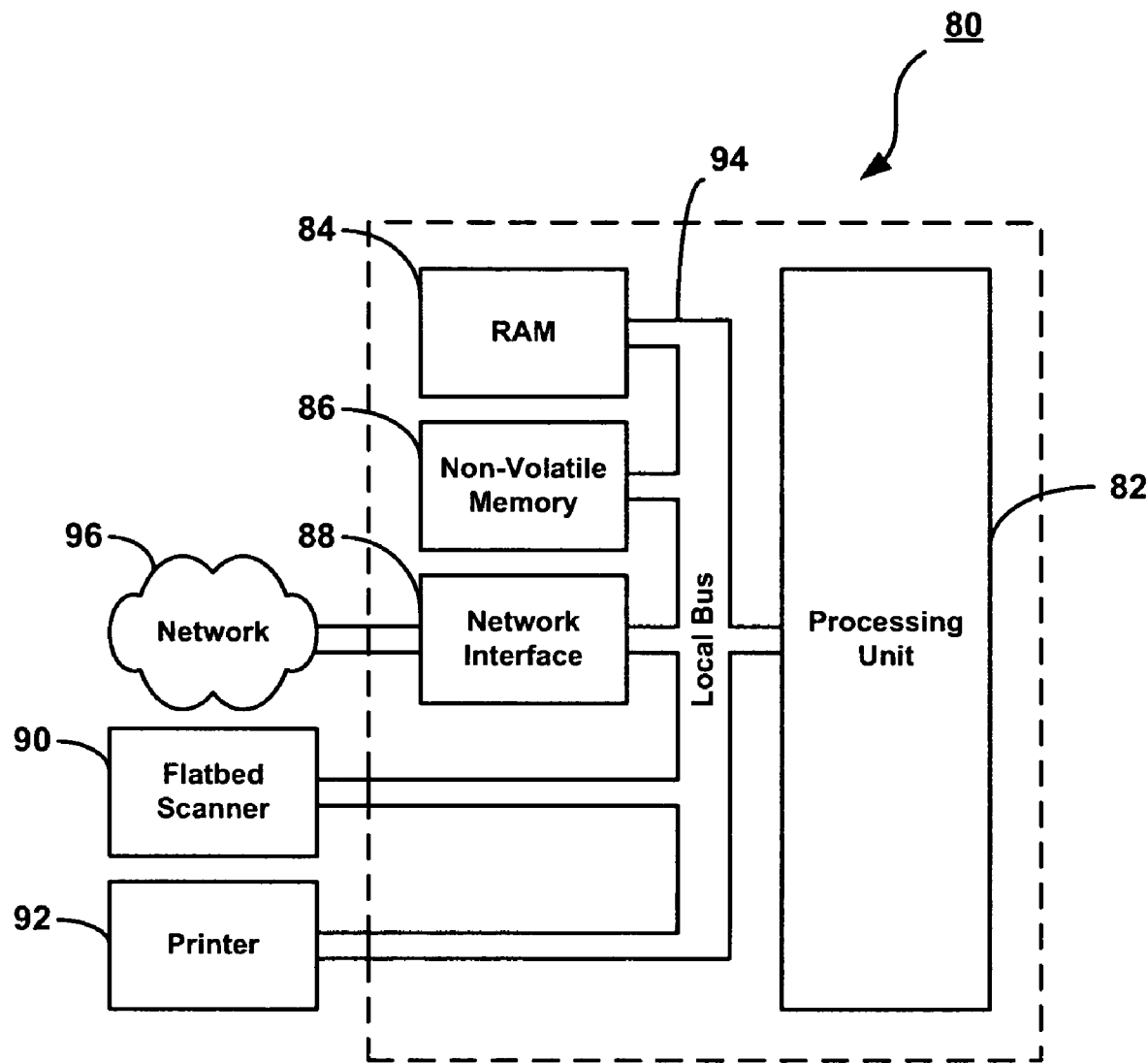
FIG. 6 is a schematic block diagram of an apparatus for resizing images.

Turning now to FIG. 6, an apparatus for resizing images designed to overcome the above disadvantages is shown and is generally identified by reference numeral 80. Apparatus 80 in this particular embodiment is a photocopier with an image resizing feature that allows high quality resized versions of input digital images to be created while avoiding the problems associated with prior art resizing techniques described above. As can be seen, the apparatus 80 comprises a processing unit 82 that communicates with random access memory (RAM) 84, non-volatile memory 86, a network interface 88, a 600-by-600 flatbed scanner 90 and a printer 92 over a local bus 94. The network interface 88 communicates with one or more information networks identified generally by reference numeral 96.

The processing unit 82 executes image copying and resizing software to enable digital images to be copied and resized as will be described. The non-volatile memory 86 stores the operating system and image copying and resizing software used by the processing unit 82 as well as stretch and reduction locator pattern libraries.

Scanner 90 scans documents placed thereon thereby to capture digital images of the scanned documents. Documents to be scanned may present information in a number of different formats. For example, the documents may be text documents, black and white pictures or photographs, color pictures or photographs, maps, graphs, logos, etc. or any combination thereof. Network interface 88 allows digital images of documents be loaded from one or more information networks 96 and permits remote software maintenance.

Figure 7:
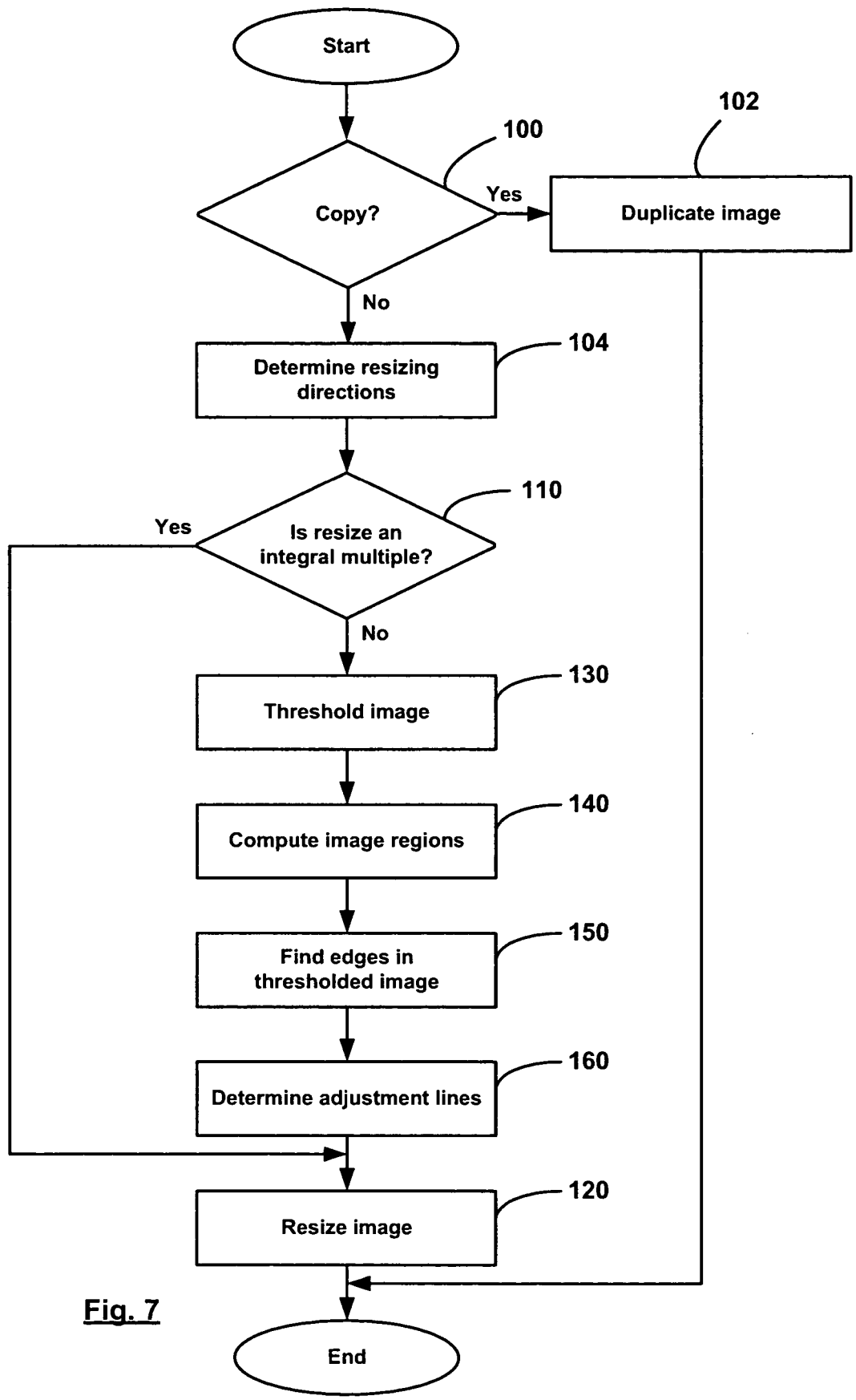
FIG. 7 shows the steps performed by the apparatus of FIG. 6 during image resizing.

The general operation of the apparatus 80 will now be described with particular reference to FIG. 7. Upon power up, the processing unit 82 loads the operating system from the non-volatile memory 86. The processing unit 82 then loads the image copying and resizing software and the stretch and reduction locator pattern libraries from the non-volatile memory 86. Once loaded, when the apparatus 80 is conditioned to copy or resize an input digital image, the processing unit 82 executes the image copying and resizing software.

During copying or resizing, for each input digital image, whether scanned by scanner 90 or loaded from an information network 96, a check is made to determine if the input image is to be resized or copied (step 100). If the input image is simply to be copied, a duplicate of the input image is created and output by the apparatus 80 (step 102). At step 100, if the input image is to be resized, a check is made to determine the direction(s) i.e. horizontal and/or vertical, in which the input image is to be resized (step 104). In this embodiment, the apparatus 80 performs resizing in only the horizontal direction. As a result, if the input image is only to be resized in the vertical direction, the input image is rotated by 90 degrees before image resizing commences. If the input image is to be resized in both the horizontal and vertical directions, image resizing is performed firstly in the horizontal direction. The input image is then rotated 90 degrees and image resizing is again performed in the horizontal direction.

After the resizing direction(s) has been determined at step 104 and the input image rotated, if necessary, image resizing commences. During resizing, the degree by which the input image is to be resized i.e. the scaling factor, is examined to determine if the scaling factor is an integral multiple of the input image (step 110). For example, if the input image is 300-by-300 pixels in size and is to be stretched to form a resized output image that is 360-by-360 pixels in size, the scaling factor in both the horizontal and vertical directions is equal to 1.2 (i.e. 360/300).

The scaling factor is used to determine the number of pixel columns that must be added to or removed from the input image in order to generate the desired resized output image. If the scaling factor is an integral multiple of the input image, the input image is stretched by duplicating each pixel column of the input image the appropriate number of times to generate the resized output image (step 120). For example, if the scaling factor is equal to two (2) i.e. the input image is to be doubled in size, a duplicate pixel column is inserted beside each pixel column of the input image thereby to generate the resized output image.

At step 110, if the scaling factor is not an integral multiple of the input image, the input image is firstly thresholded (step 130). Then regions of the input image, where pixel columns will either be duplicated or removed depending on whether the input image is to be stretched or reduced, are computed (step 140). Vertical edges are then located in the regions of the input image as such edges are sensitive to horizontal stretching and reducing (step 150). Adjustment pixel columns through the regions of the input image that are either to be duplicated or removed, which avoid sensitive vertical edges, are then determined (step 160). The image is then resized either by duplicating or removing the determined adjustment pixel columns according to the scaling factor while taking vertical edges lying along the determined adjustment pixel columns as well as edges that intersect the determined adjustment pixel columns into account thereby to generate the resized output image (step 120).

For image reductions and fractional stretches, where the scaling factor is less than two, the number of adjustment pixel columns to be added to or removed from the input image being resized is equal to the difference in the number of pixel columns between the input image and desired resized output image. For instance, where the input image is 300-by-300 pixels in size and the resized output image size is 300-by-360 pixels in size resulting in a horizontal scaling factor equal to 1.2, a complete set of duplicate pixel columns cannot be inserted into the input image to create the resized output image. Rather, a partial set of duplicate pixel columns, in this case sixty (60) adjustment pixel columns, must be inserted into the input image to create the resized output image.

Where the scaling factor is greater than two for a stretch, the total number of pixel columns to be added to the input image to form the resized image is equal to:

$$\text{additionalcolumns} = n \cdot \text{originalcolumns} + \text{adjustmentcolumns} \quad (0.3)$$

with:

$$n = int(\text{scalingfactor}) - 1, \quad (0.4)$$

where:

n is the number of duplicate pixel columns to be inserted after each pixel column in the input image; and adjustment columns is the number of remaining additional pixel columns that are to be distributed across the input image after the addition of n duplicate pixel columns beside each pixel column in the input image.

For instance, if the 300-by-300 pixel input image is to be stretched to become 300-by-1000 pixels in size, resulting in a horizontal scaling factor equal to 3.3, two duplicate pixel columns are inserted beside each pixel column of the input image, and a partial set of duplicate pixel columns, in this case one-hundred (100) adjustment pixel columns, are also inserted into the input image.

During thresholding at step 130, the average intensity of the pixels in the input image is determined and is used to binarize the input image. Foreground and background pixels are then designated in the binarized or black and white image. During foreground and background pixel designation, the average intensity in the grayscale representation of the input image is examined to determine if it lies closer to white or black. If the average intensity lies closer to white, then white is defined as the background and black is defined as the foreground. If the average intensity lies closer to black, black is defined as the background and white is defined as the foreground.

Figure 8:
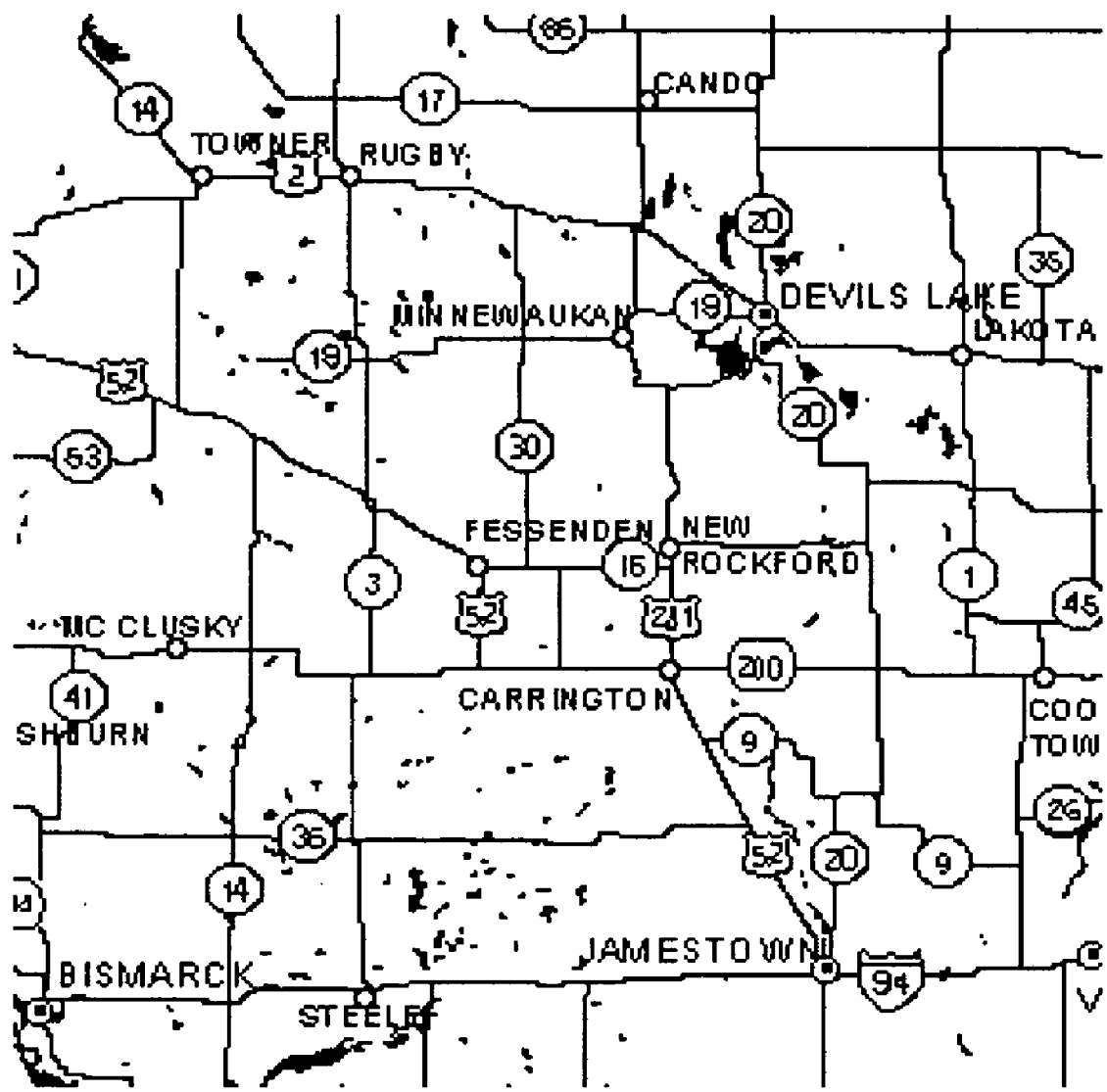
FIG. 8 shows the map image of FIG. 4 after thresholding.

FIG. 8 shows the map 60 of FIG. 4 after thresholding. As can be seen, in this case white pixels are deemed background and black pixels are deemed foreground. The streets in the map 60 are visibly distinct and are clearly defined in FIG. 8. The darker gray areas in FIG. 4 representing lakes and ponds are determined to be foreground pixels as a result of thresholding and are set to black as shown.

After thresholding at step 130, during step 140 the input image is divided into a plurality of generally equal regions along its width. To determine the number of regions into which the input image is divided, the number of pixel columns in the input image is divided by the number of pixel columns in the partial set of duplicate pixel columns to be inserted into the input image. This yields the number of pixel columns of the input image to be encompassed by each region. When the number of pixel columns in the input image is not equally divisible by the number of pixel columns in the partial set, the remainder pixel columns are distributed amongst the regions as desired. In the present implementation, remainder pixel columns are distributed across the regions from left to right one at a time until none remain. In this case, the regions are not all equal in width.

Figures 9, 10:
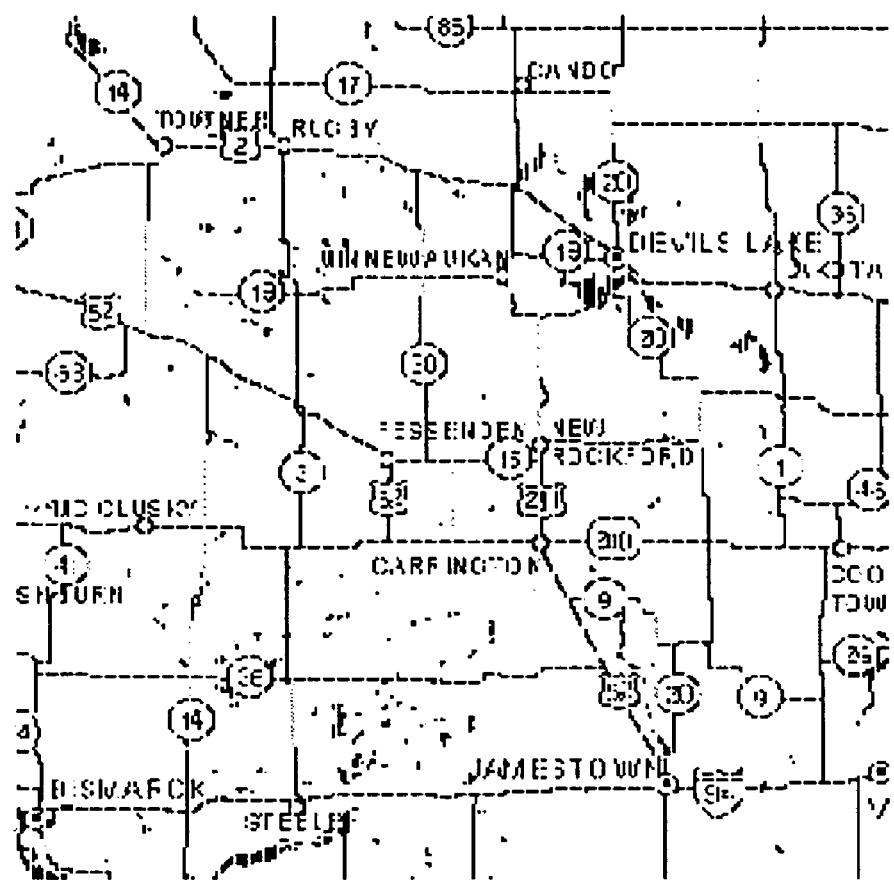
FIG. 9 shows the image of FIG. 8 divided into a number of generally equally-sized regions along its width.
FIG. 10 shows a unidirectional vertical edge detector used by the apparatus of FIG. 6.

FIG. 9 shows the thresholded input image of FIG. 8 after determination of the regions. In this example, the input image has been divided into sixty (60) regions.

After the thresholded image has been segmented into the regions at step 140, during step 150 vertical edges within the thresholded input image are detected using a unidirectional vertical edge detector as shown in FIG. 10. During vertical edge detection, the vertical edge detector is centered on each pixel of the thresholded input image and an intensity value for each pixel is generated. During generation of the intensity value for each pixel, the value of the subject pixel and the values of the surrounding pixels are examined i.e. a 3-by-3 pixel sub-array centered on the subject pixel are examined. For pixels in the sub-array that represent foreground, black pixels in this case, the corresponding values of the vertical edge detector are summed and the absolute value of the sum is determined thereby to yield the intensity value for the subject pixel. This process is performed for each pixel in the thresholded input image. The resulting intensity values allow vertical edges in the thresholded input image to be determined. FIG. 11 shows intensity values generated by the unidirectional vertical edge detector for different pixel sub-arrays.

Figure 12:
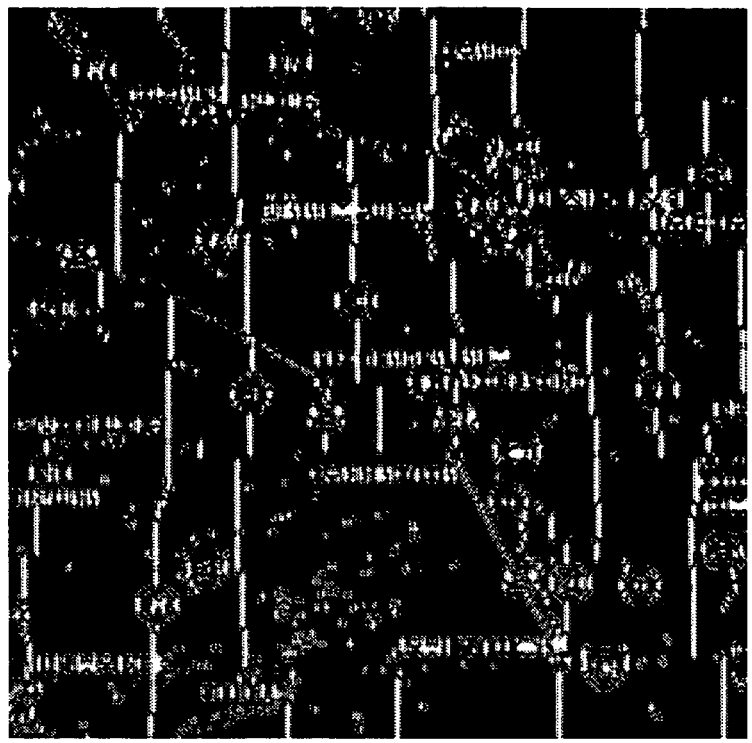
FIG. 12 shows the image of FIG. 8 after application of the unidirectional vertical edge detector of FIG. 10.

Once an intensity value has been generated for each pixel in the thresholded input image, the intensity values are used to modify the thresholded input image and generate a greyscale image as shown in FIG. 12. As can be seen, the vertical edges in the greyscale image are apparent.

Figure 13:
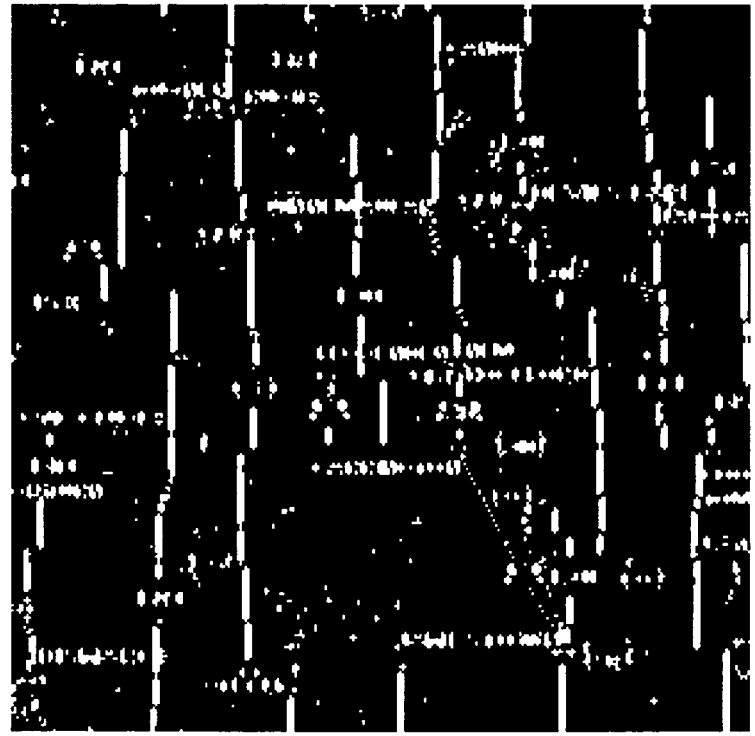
FIG. 13 shows the image of FIG. 12 after thresholding.

To further isolate the vertical edges, the greyscale image is thresholded to ignore intensity values that do not lie above a value of two (2) where the maximum possible intensity value is six (6). Thresholding the image in this manner yields a binary image with clearly defined vertical edges as shown in FIG. 13.

Figure 14:
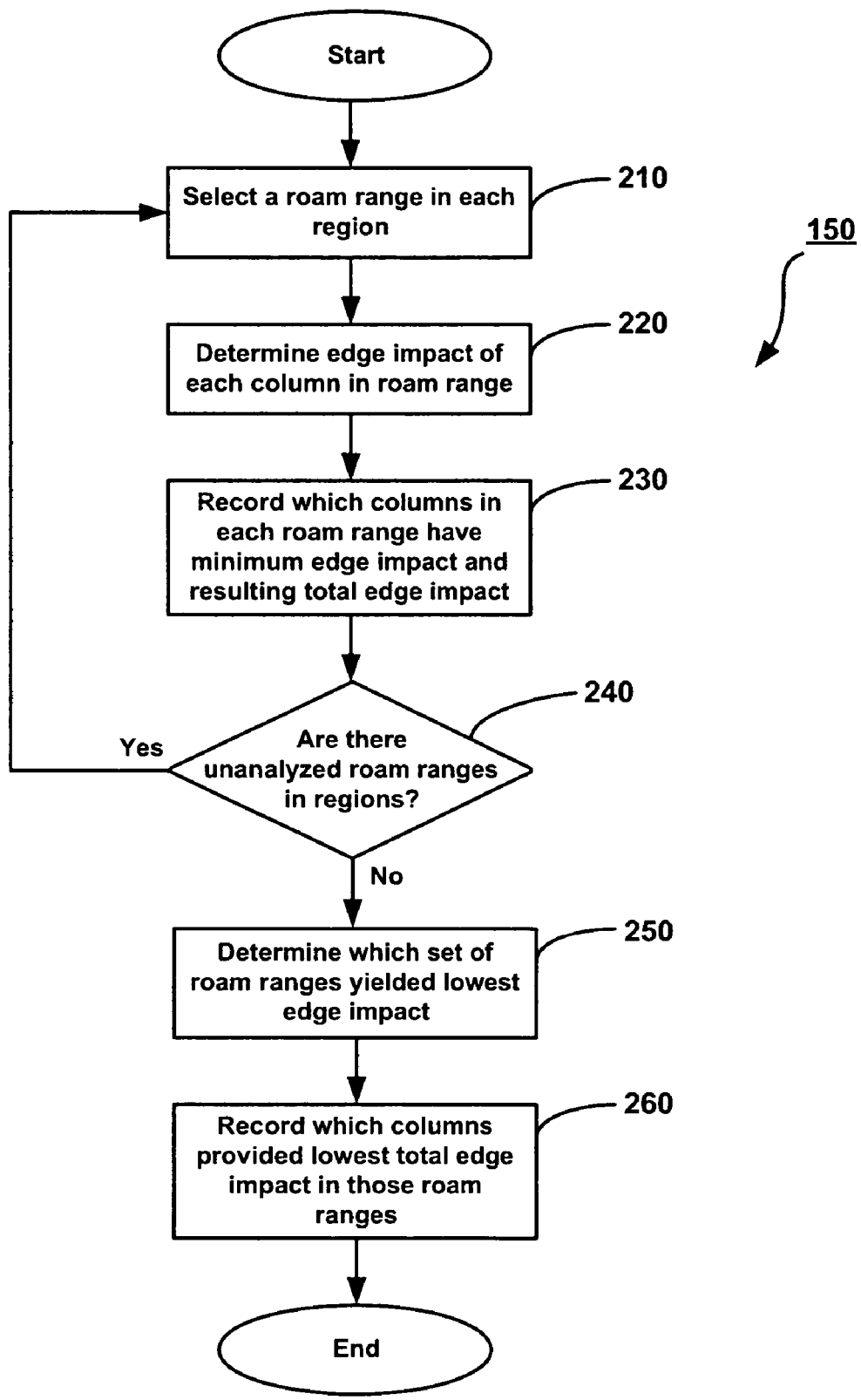
FIG. 14 shows the steps performed by the apparatus of FIG. 6 during adjustment line determination.

The steps performed during determination of the adjustment pixel columns at step 150 are better illustrated in FIG. 14. The adjustment pixel columns are allowed to float within the regions to allow them to be positioned at locations where they will have the least vertical edge impact. In particular, during adjustment pixel column determination, an initial roam range is selected for each region (step 210). Each roam range includes a set of adjacent pixel columns to be analyzed for vertical edge impact. The roam ranges are similarly positioned within the regions, are generally equally-sized and are smaller than the regions i.e. the number of pixel columns in each roam range is less than the number of pixel columns in its associated region. This configuration provides a desired minimum spacing between adjustment pixel columns in each region so that during image resizing, the image is resized generally uniformly across its width. In the present embodiment, the minimum spacing between adjacent adjustment pixel columns is selected to be two (2).

For example, where an input image has been divided into regions with each region encompassing five (5) pixel columns, each roam region includes a set of three pixel columns to provide at least the minimum two pixel column space between adjustment pixel columns in adjacent regions.

With the initial roam ranges selected for each region, the pixel columns in each of the roam ranges are analyzed for vertical edge impact (step 220). During vertical edge impact determination, a vertical edge impact histogram for the pixel columns in each roam range of the thresholded input image is generated. The vertical edge impact histogram represents the number of foreground pixels that lie on detected vertical edges in the pixel columns of the roam ranges i.e. pixels that are presented as white lines in FIG. 13. In order to distinguish vertical edges that would be significantly impacted by resizing along the various pixel columns from those that are simply aberrations or intersect the pixel columns at significant angles, only runs of three or more consecutive foreground pixels along vertical edges are counted during vertical edge impact histogram generation.

With the vertical edge impact histogram generated, the pixel columns in each roam range are then examined to identify and record the pixel column in each roam range having the lowest foreground pixel count. The vertical edge impact for these identified pixel columns is also recorded (step 230).

FIG. 15 shows the image of FIG. 14 and a corresponding vertical edge impact histogram having been determined in accordance with step 220. The height of each vertical edge impact histogram line represents the foreground pixel count and hence, the degree of vertical edge impact for each pixel column. As illustrated, some pixel columns have a relatively high foreground pixel count, whereas others do not.

With the pixel columns and corresponding vertical edge impacts recorded, a check is then made to determine whether any unanalyzed roam ranges in the regions exist i.e. the next consecutive set of adjacent pixel columns in each of the regions (step 240). If unanalyzed roam ranges exist, the method returns to step 210. Steps 210 to 230 are performed until all of the roam ranges within each region are examined to detect the pixel columns therein having the lowest foreground pixel count and hence, the lowest vertical edge impact. For example, if each region encompasses five (5) pixel columns and each roam range is three pixel columns in width, steps 210 to 230 would be performed three times, once for pixel columns 1 to 3, once for pixel columns 2 to 4 and once for pixel columns 3 to 5. As will be appreciated, by permitting the roam ranges themselves to roam in a synchronized manner, a set of adjustment pixel columns that have less vertical edge impact can be selected while maintaining a minimum desired spacing between the adjustment pixel columns.

Once all of the roam ranges have been analyzed, the set of roam ranges having the pixel columns that yield the lowest vertical edge impact is determined i.e. the set of pixel columns that yields the overall lowest total vertical edge impact (step 250). The pixel columns associated with the roam ranges in the determined set are then recorded (step 260). These pixel columns are thus selected to be the adjustment pixel columns.

Figure 17:
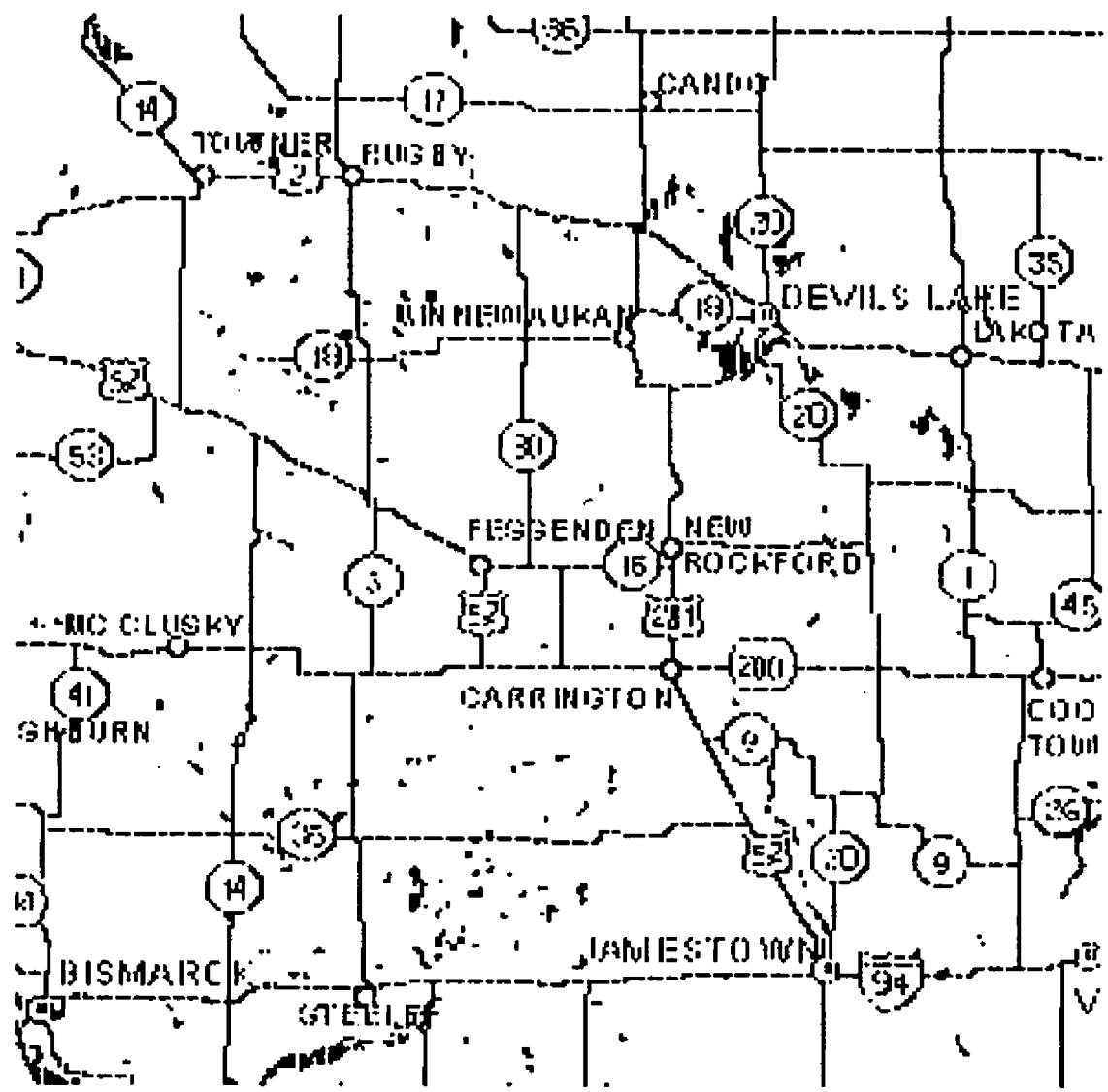
FIG. 17 shows the selected adjustment lines laid over the image of FIG. 8.

FIG. 16 shows the image and vertical edge impact histogram of FIG. 15, together with the selected adjustment pixel columns determined for the regions. As will be noted, the adjustment pixel columns generally do not lie along nor do they intersect vertical edges. The thresholded input image of FIG. 8 with the adjustment pixel columns projected thereon is shown in FIG. 17. As can be seen, the adjustment pixel columns are distributed across the width of the image unevenly to avoid sensitive areas in the threshold input image.

With the adjustment pixel columns in the regions determined, the image is resized according to the scaling factor either by duplicating the adjustment pixel columns or deleting the adjustment pixel columns. Although the positions of the adjustment pixel columns are selected to avoid sensitive areas in the input image so that duplicating the adjustment pixel columns during image stretching avoids pixel line thickening and so that deleting adjustment pixel columns avoids loss of valuable information, the selection of the adjustment pixel columns in the above manner does not ensure that once the image is resized, the resized image will be free of anomalies. As will be appreciated, the adjustment pixel columns may lie along some vertical foreground pixel runs representing vertical edges and/or may intersect foreground pixel runs representing edges that cross the adjustment pixel columns at an angle. Where an image is being stretched, these anomalies can result in small vertical edge duplications in the resized image. Where an image is being reduced, these anomalies can result in vertical edges disappearing in the resized image.

As anomalies may still exist if adjustment pixel columns are simply duplicated or removed, each adjustment pixel column is examined to determine if the adjustment pixel column includes foreground pixels representing vertical edges or edges crossing the adjustment pixel column at an angle. If an adjustment pixel column includes such foreground pixels, impact zones encompassing these foreground pixels as well as nearby pixels in adjacent pixel columns are determined. Determined impact zones are then compared with locator patterns stored in one of the stretch locator pattern library and reduction locator pattern library, depending on whether an image stretch or image reduction is being performed, so that replacement pixel patterns for the pixels encompassed by the impact zones can be used when the adjustment pixel columns are being duplicated or removed.

FIGS. 24-43 and 44-61 show the locator patterns and corresponding replacement pixel patterns stored in the stretch and reduction locator pattern libraries respectively. As can be seen, the locator patterns take into consideration the general shape of vertical edges lying along the adjustment pixel columns or edges intersecting the adjustment pixel columns. The replacement pixel patterns when used to replace the pixels in impact zones, reduce the impact of such edges during image resizing.

Figure 21:
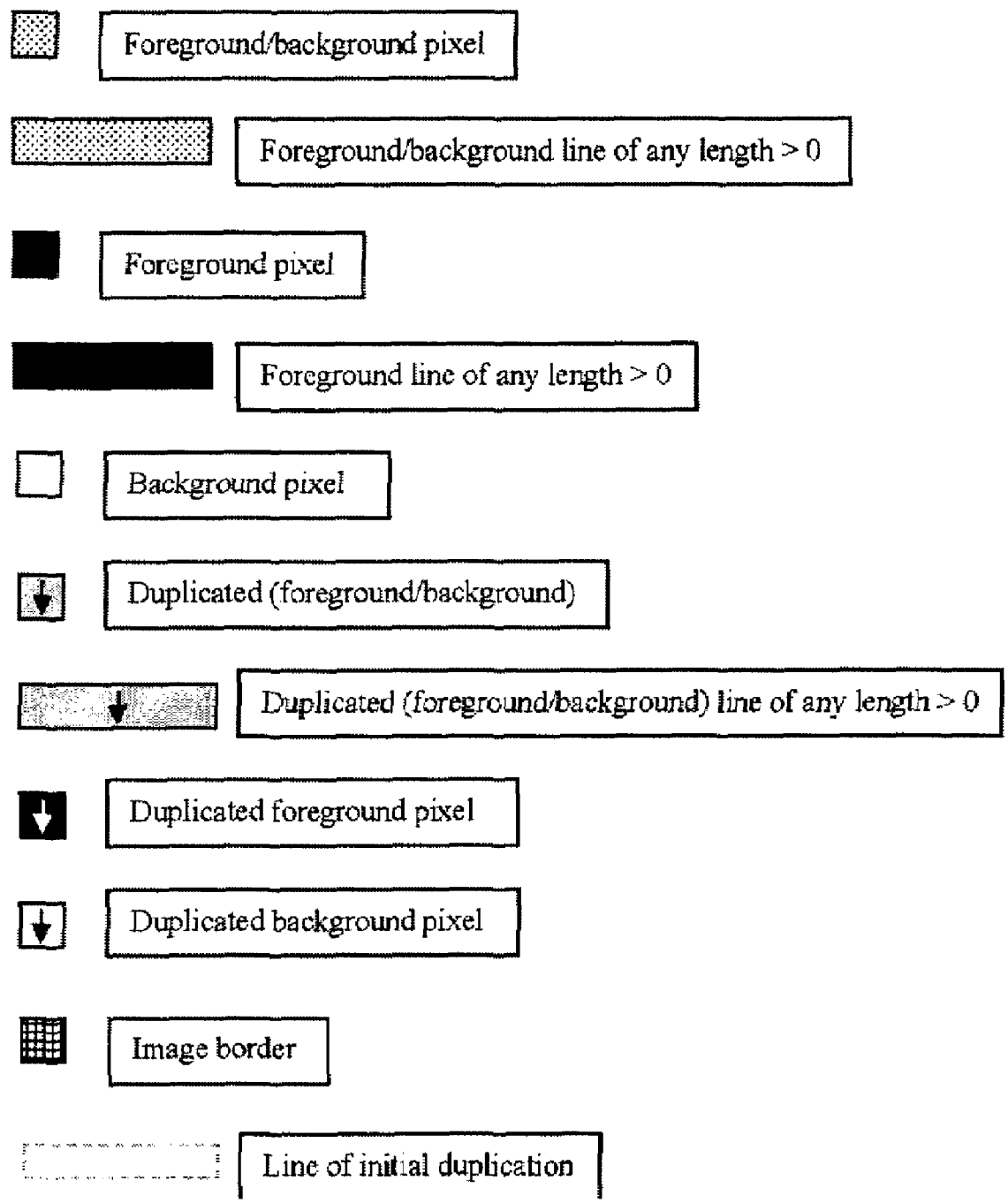
FIG. 21 shows the legend for drawings illustrating the locator patterns and corresponding replacement pixel patterns stored in the stretch locator pattern library.

FIG. 21 shows the legend end for drawings illustrating the locator patterns and corresponding replacement pixel patterns stored in the stretch locator pattern library.

Figure 22:
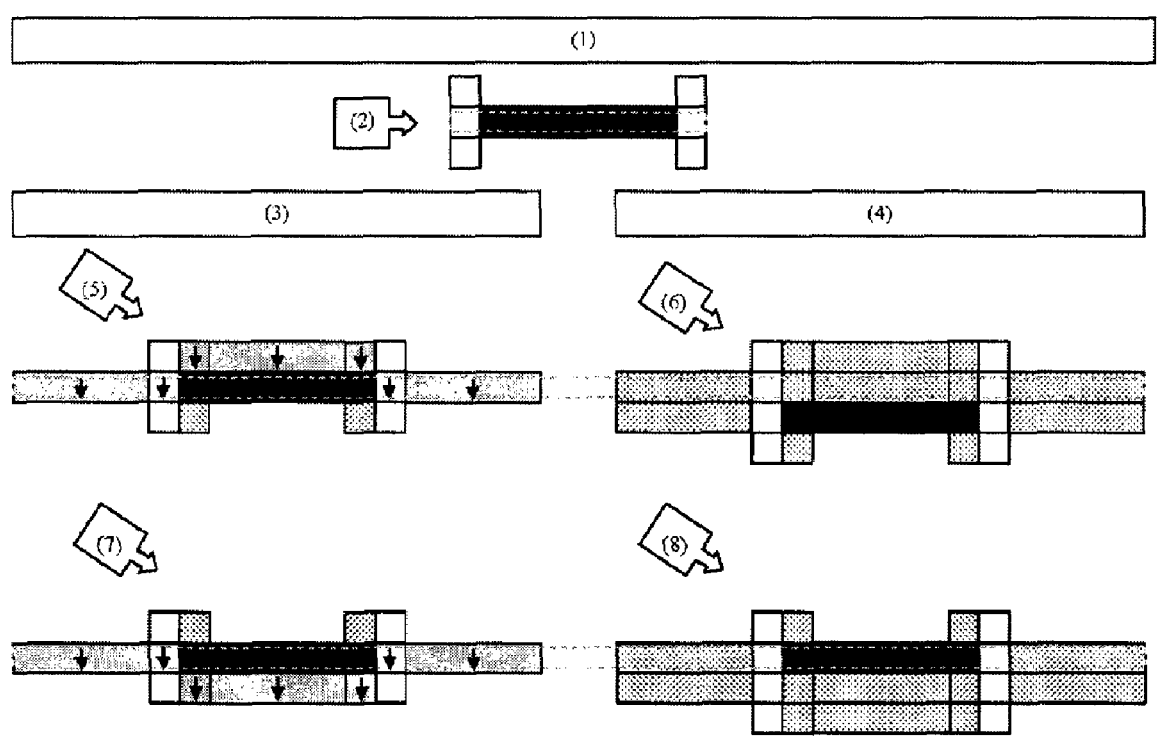
FIG. 22 shows how the stretch locator patterns are structured.

Each scenario shown in FIGS. 24-43 provides an exemplary stretch locator pattern and its corresponding replacement pixel pattern. For ease of illustration, the adjustment pixel columns are presented horizontally, whereas they are vertical in accordance with the embodiment described hereinabove. The scenarios are structured as shown in FIG. 22, and described as follows:

(1) Scenario description (2) Stretch Locator Pattern—the three vertically aligned pixels adjacent each end of the foreground pixel line segment determine the scenario. In case, a straight line is the scenario.

(3) Column of replacement pixel pattern schemes (4) column of resulting output after pixel replacement (5) Duplication scheme—In this case, it is determined that more foreground pixels lie below the foreground line segment than above the foreground line segment and therefore, pixels which lie above the foreground line segment are duplicated.

(6) Duplication result using the replacement pixel pattern scheme directly to the left. In this case, the pixels above the foreground line segment are duplicated.

(7) Duplication scheme—In this case, it is determined that more foreground pixels lie above the foreground line segment than below the foreground line segment. Therefore, pixels which lie below the foreground line segment are duplicated.

(8) Duplication result using the replacement pixel pattern scheme directly to the left. In this case, the pixels below the foreground line segment are duplicated.

In most scenarios, the side of the foreground line segment in which the duplication occurs is determined by whichever side contains the fewest foreground pixels that are adjacent to the foreground line segment.

Duplication occurs in a downward direction. Therefore, duplication occurs directly below the area which is defined to be duplicated. All pixels below this duplication are shifted down to accommodate the new duplicated region. Thus, the region size increases by one pixel column for each scenario.

The diagrams illustrating the scenarios only depict a small portion of the pixels surrounding the foreground line segment initially chosen to be duplicated. All image information outside of the illustrated regions can be either foreground or background pixels.

Figure 23:
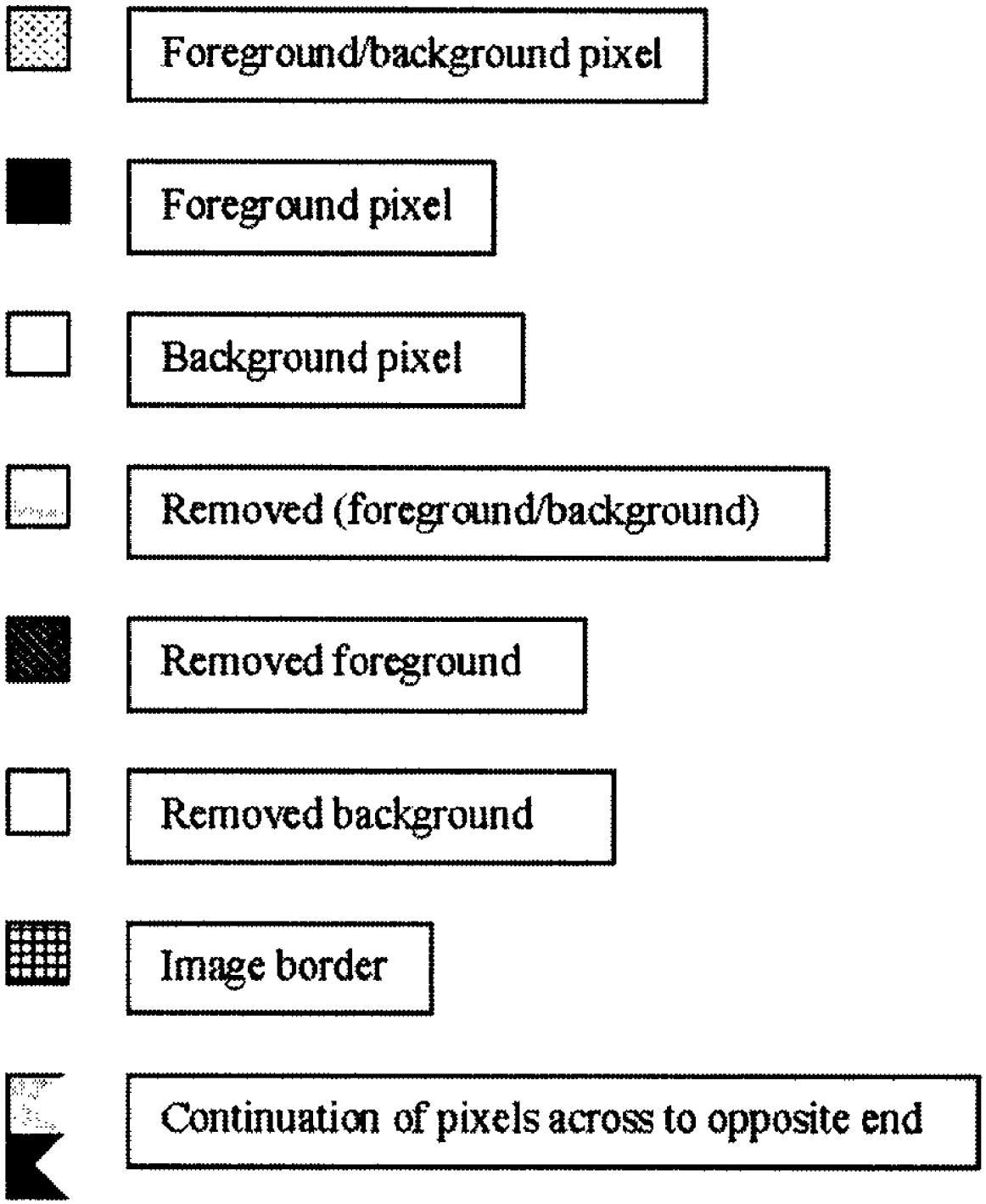
FIG. 23 shows the legend for drawings illustrating the locator patterns and corresponding replacement pixel patterns stored in the reduction locator pattern library.
Figure 24:
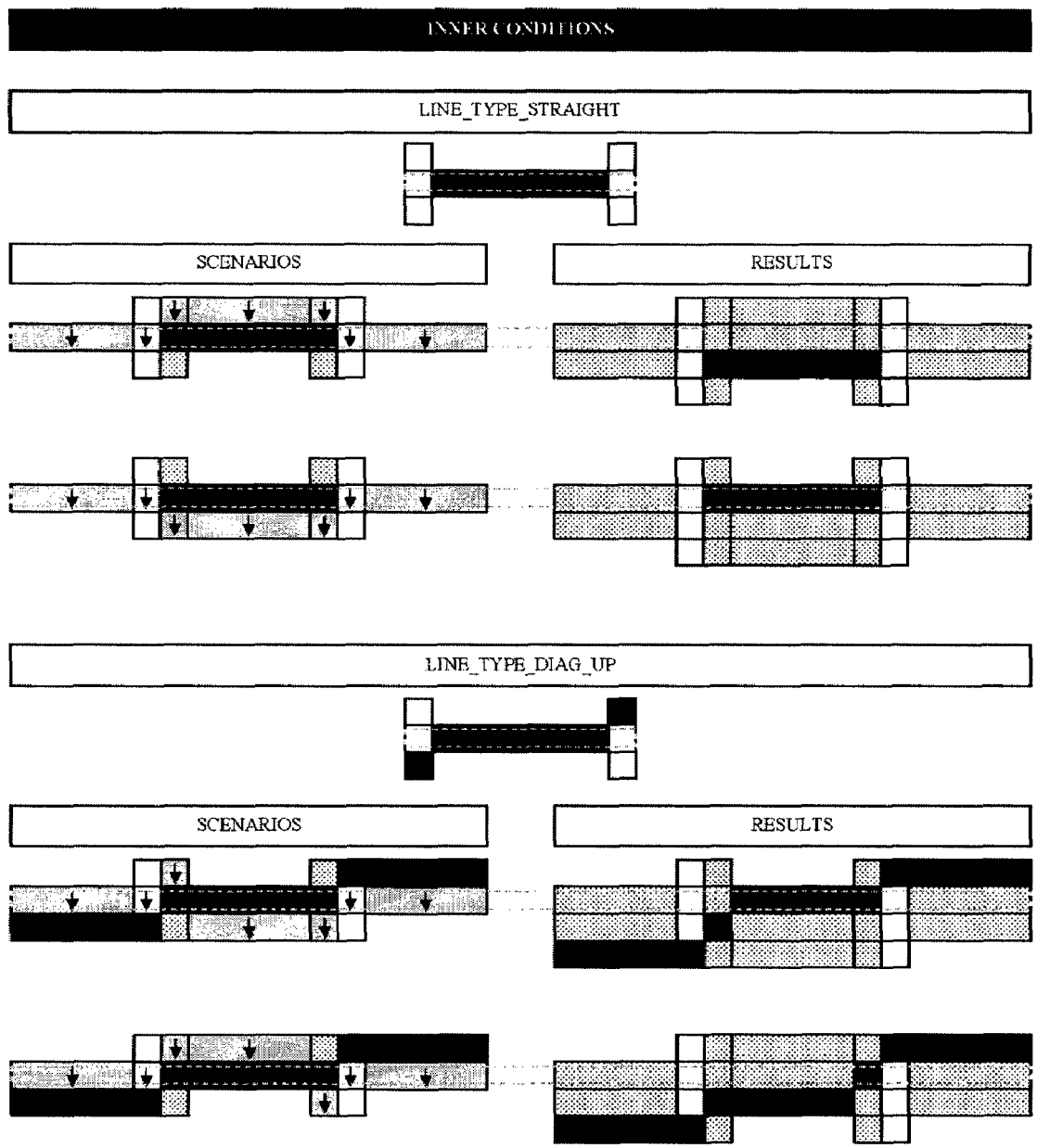
FIGS. 24 through 43 show the locator patterns and corresponding replacement pixel patterns stored in the stretch locator pattern library.
Figure 25:
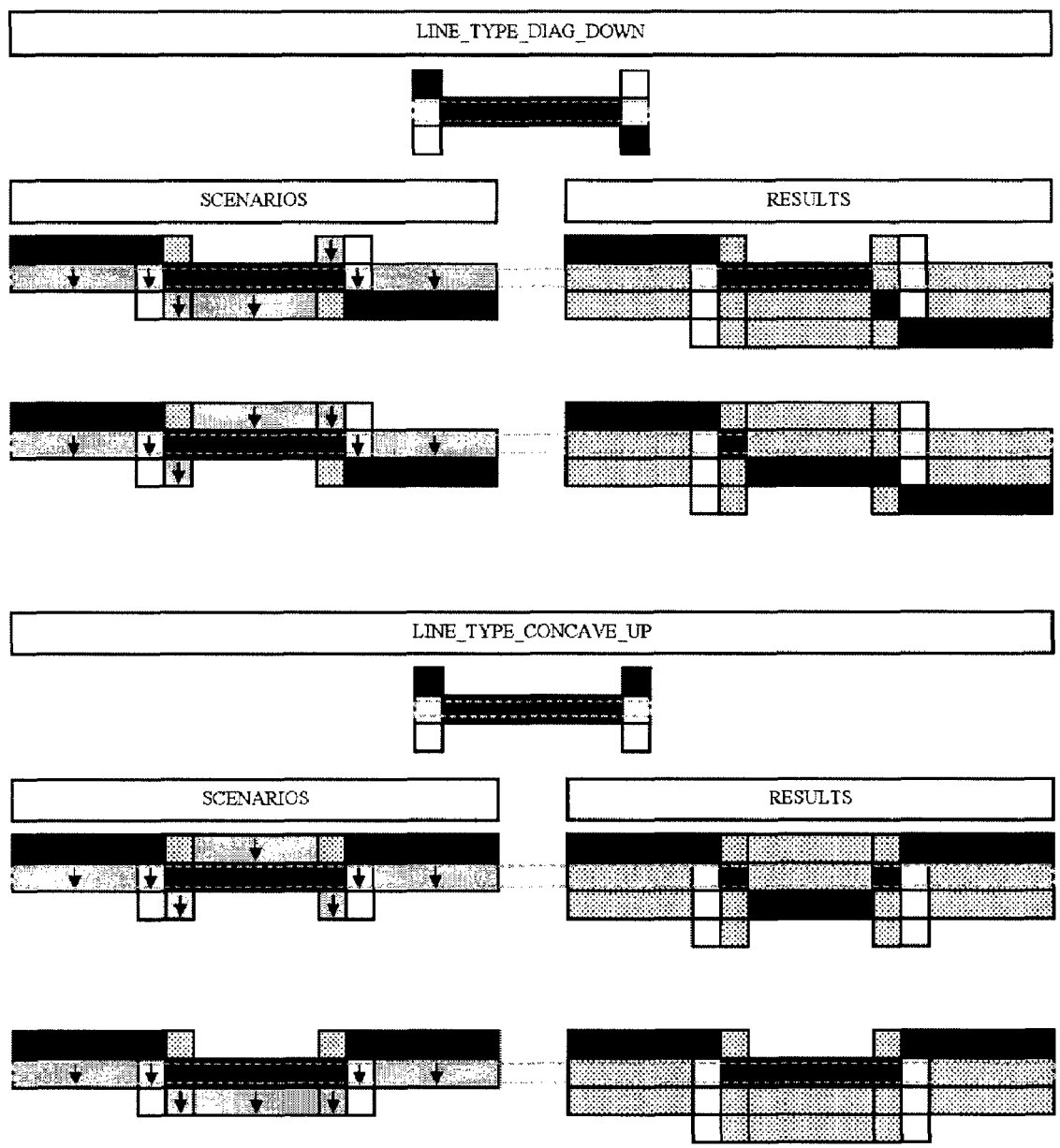
Figure 26:
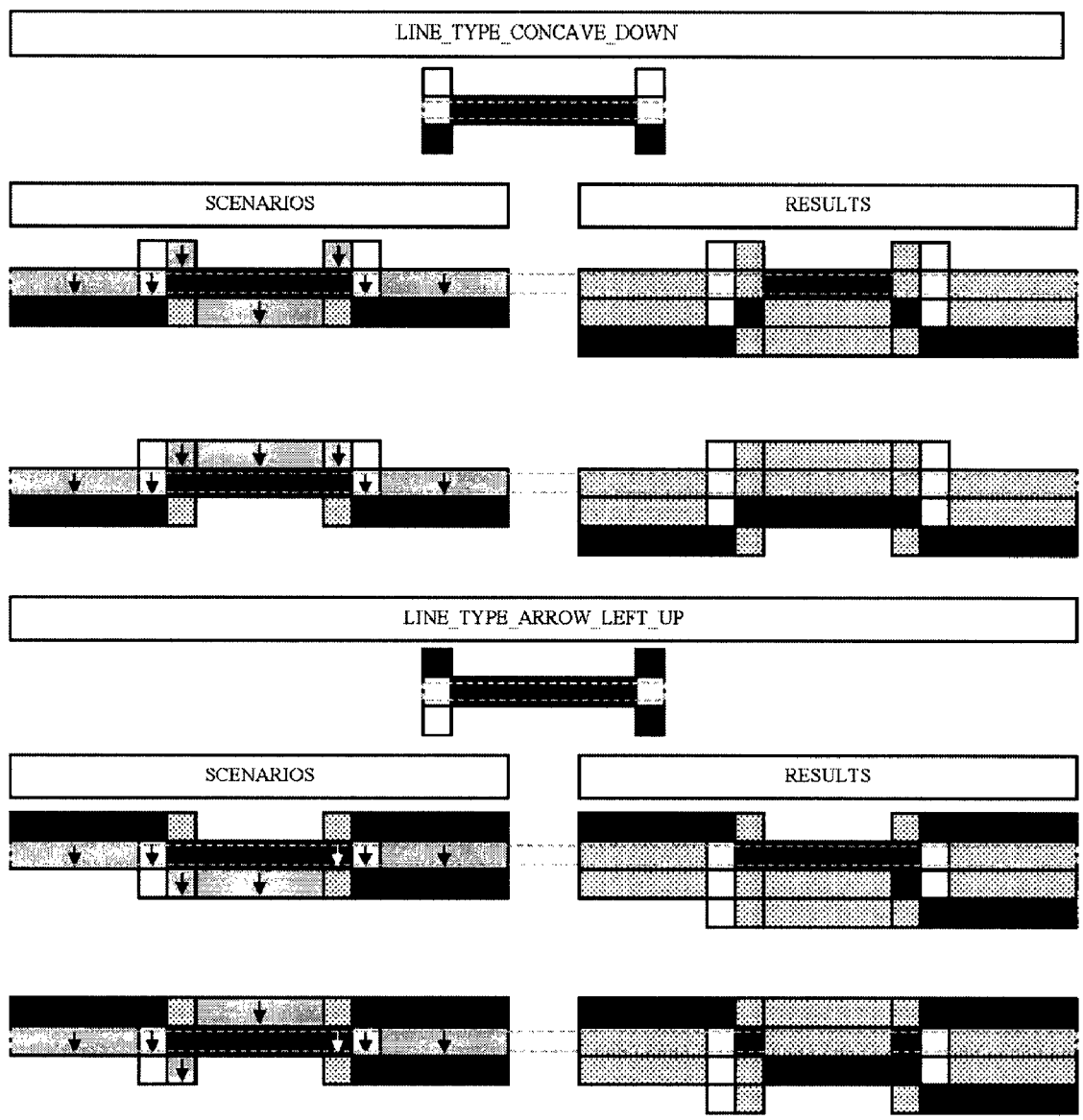
Figure 27:
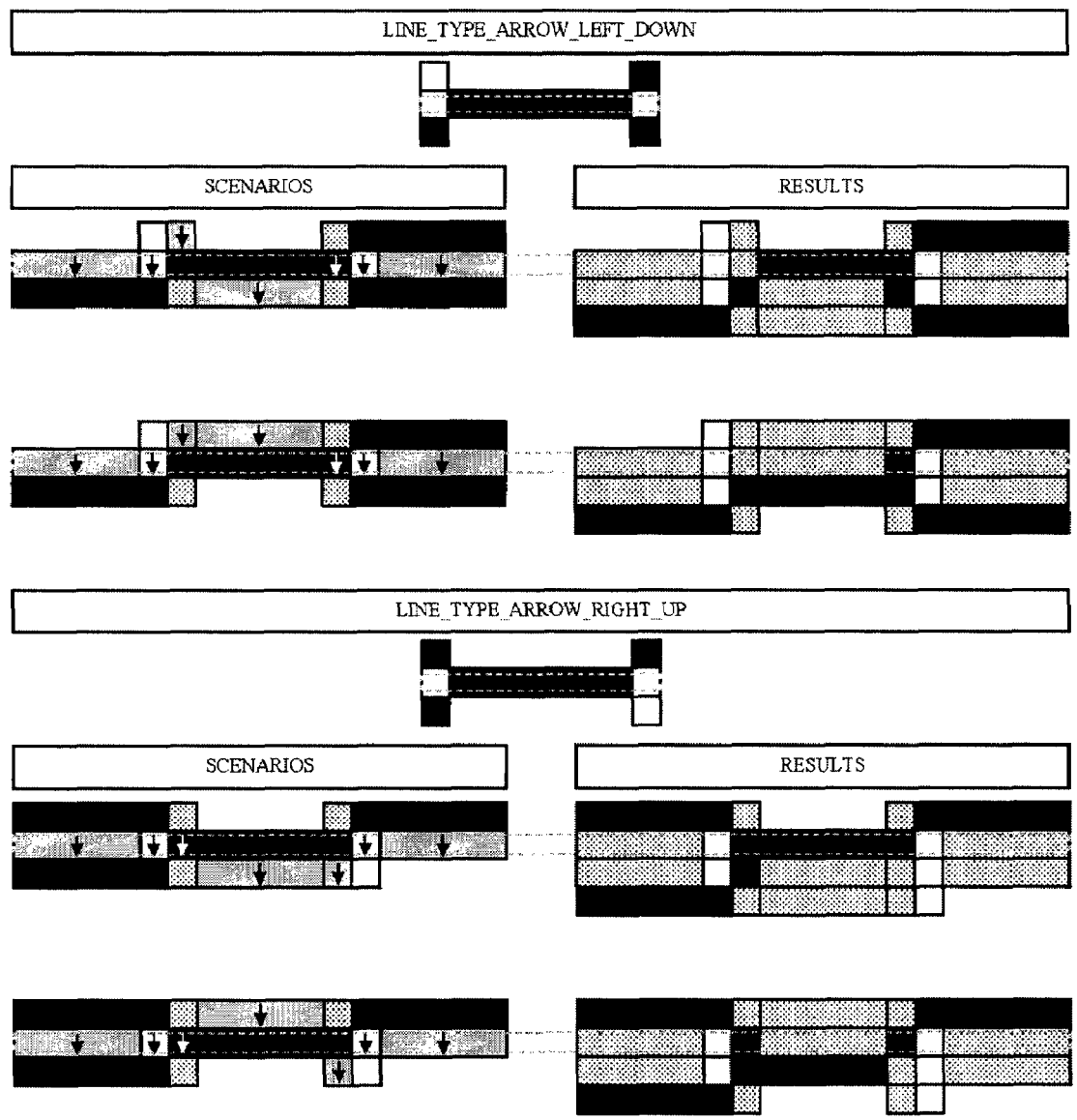
Figure 28:
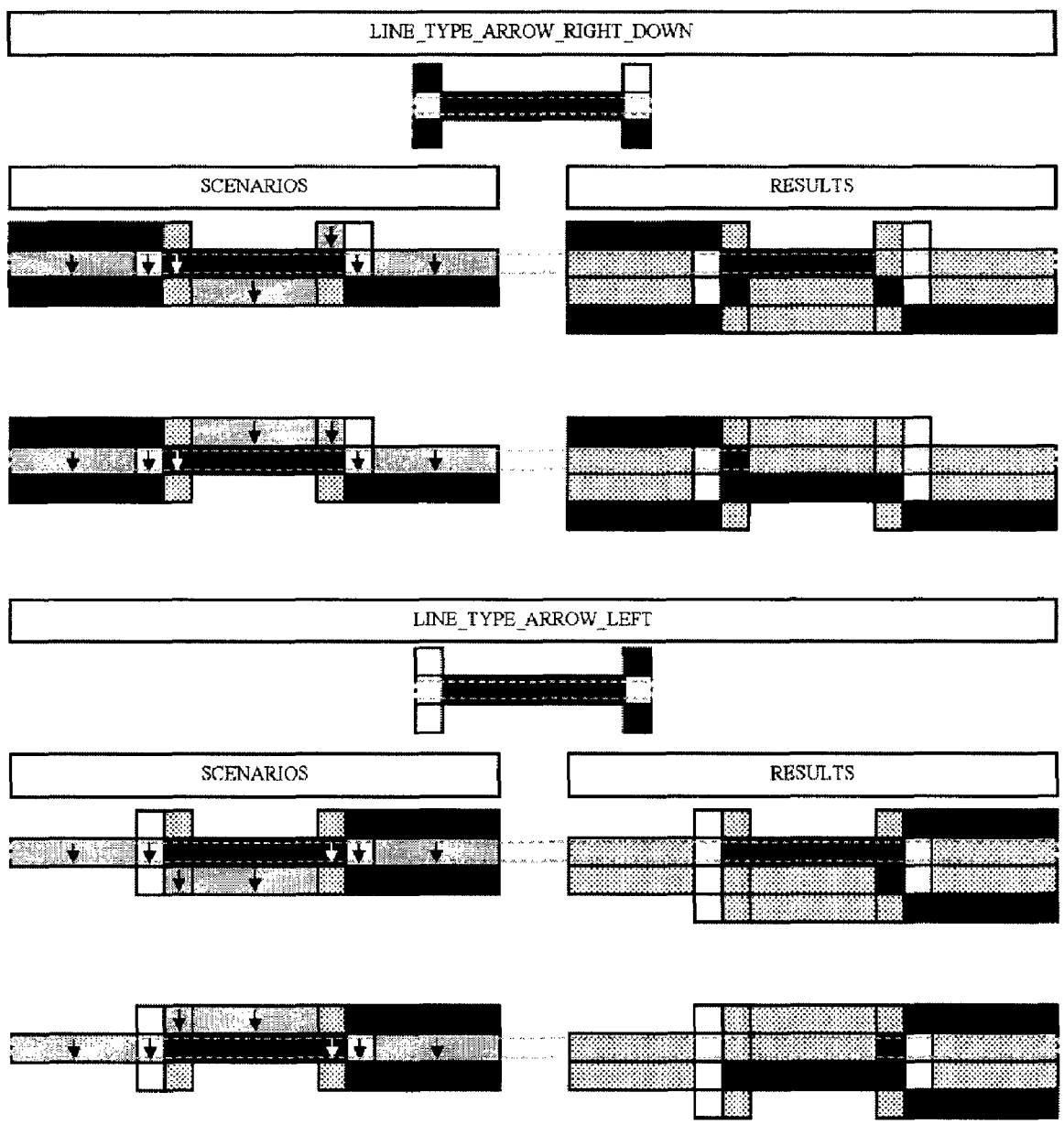
Figure 29:
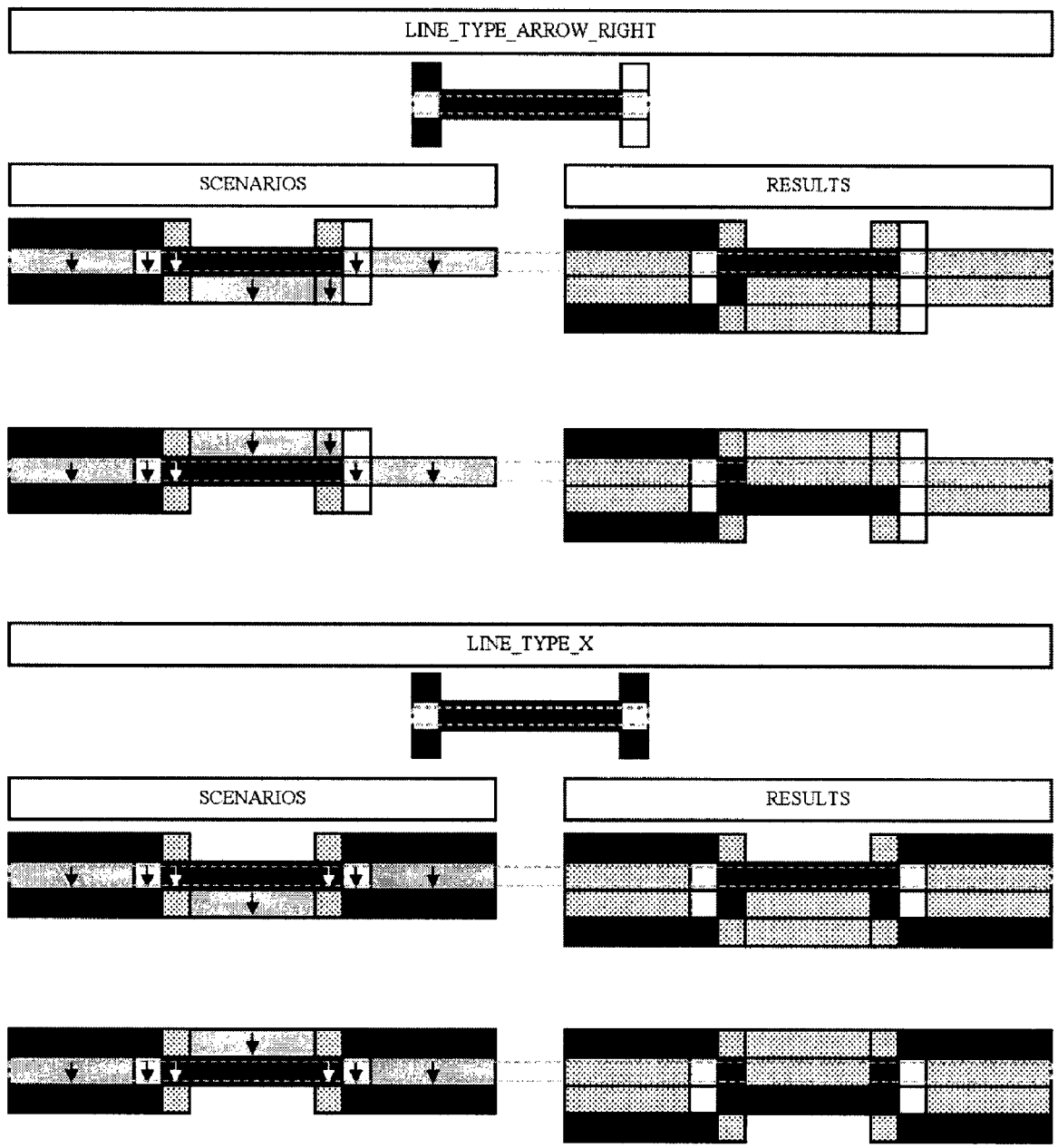
Figure 30:
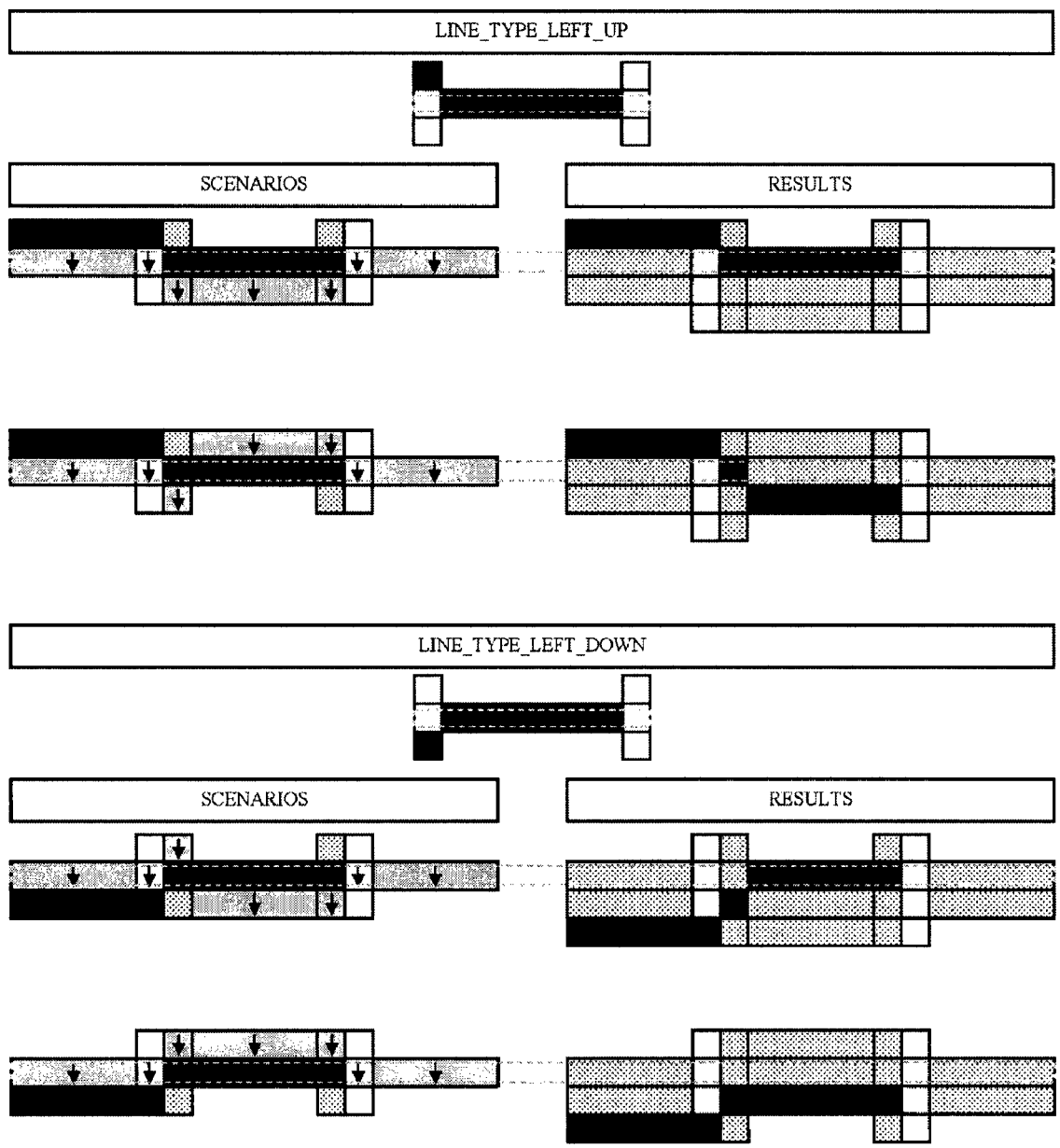
Figure 31:
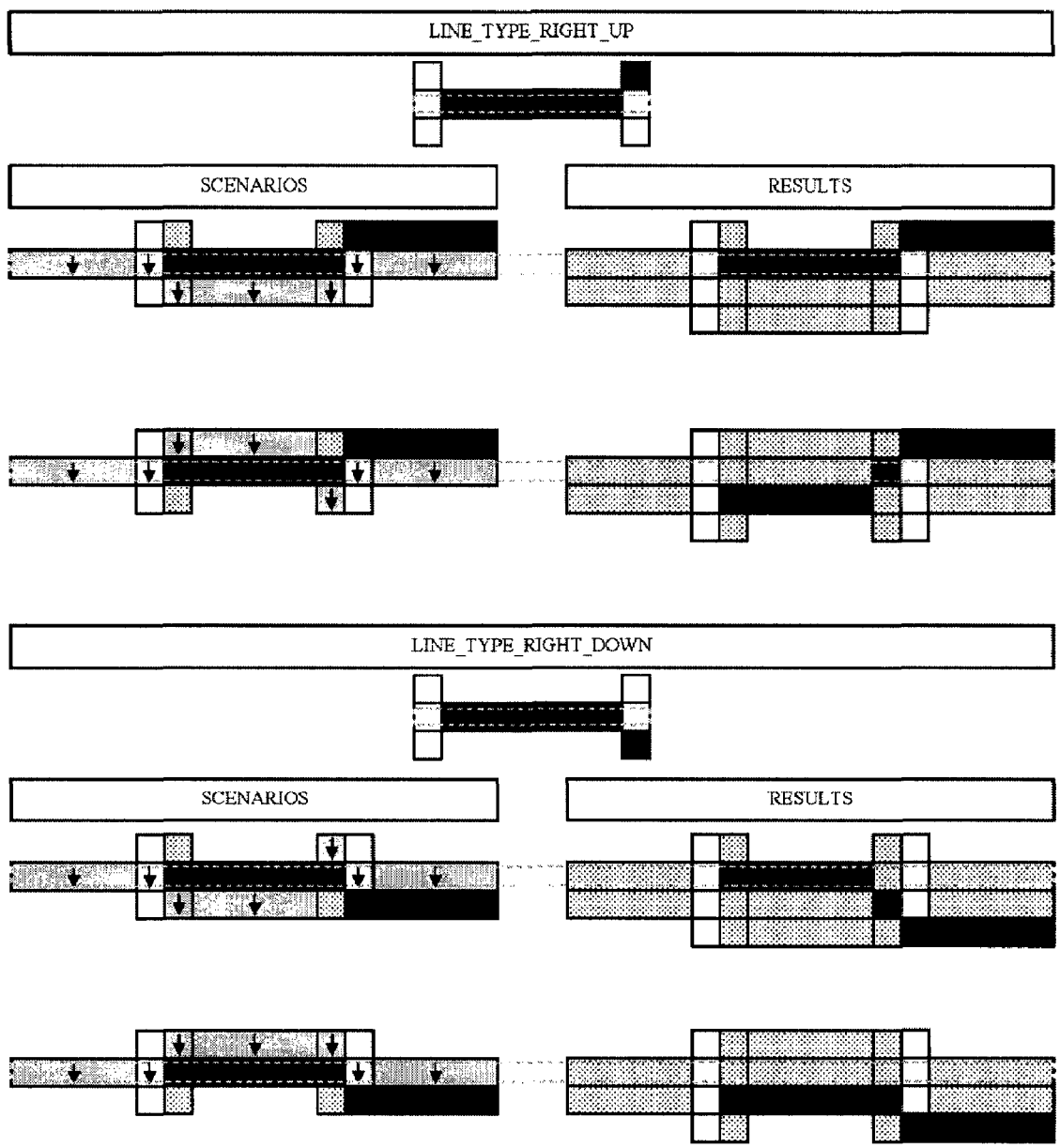
Figure 32:
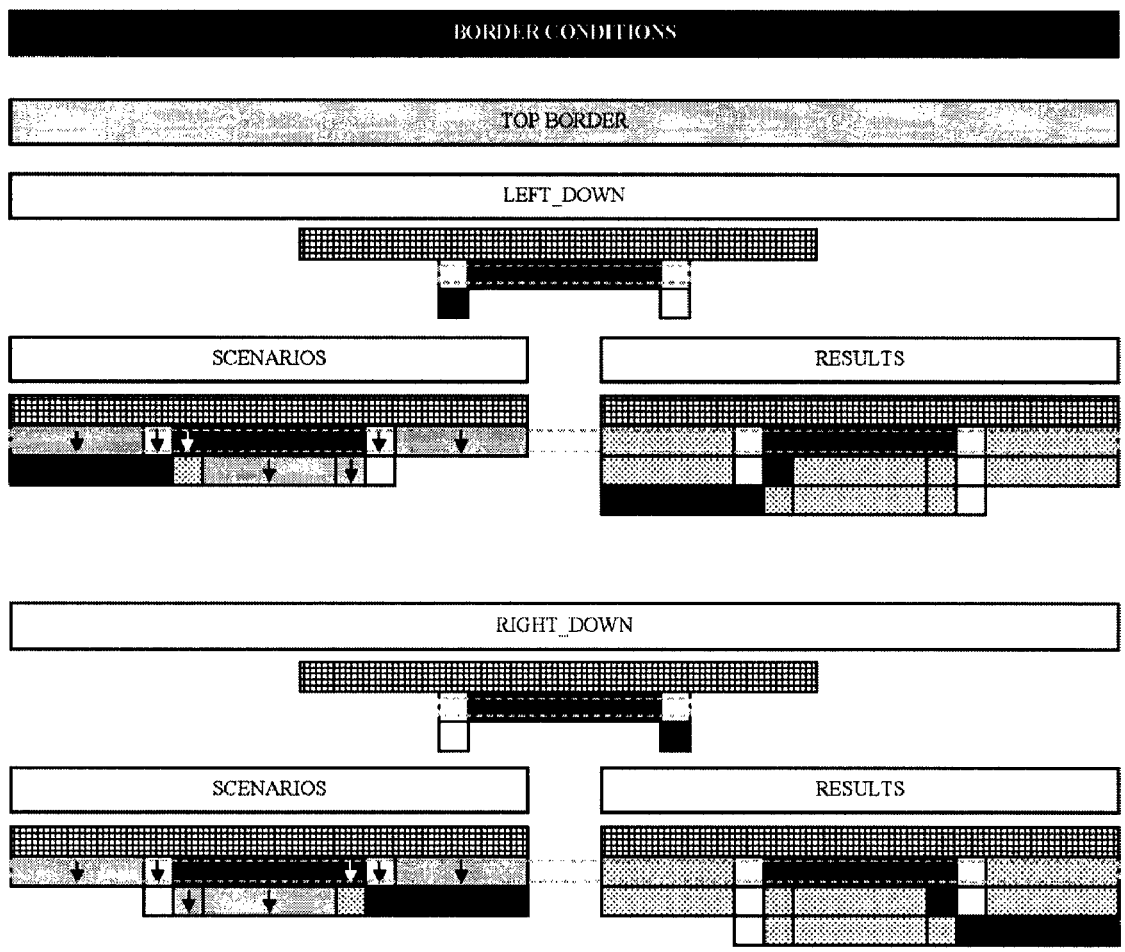
Figure 33:
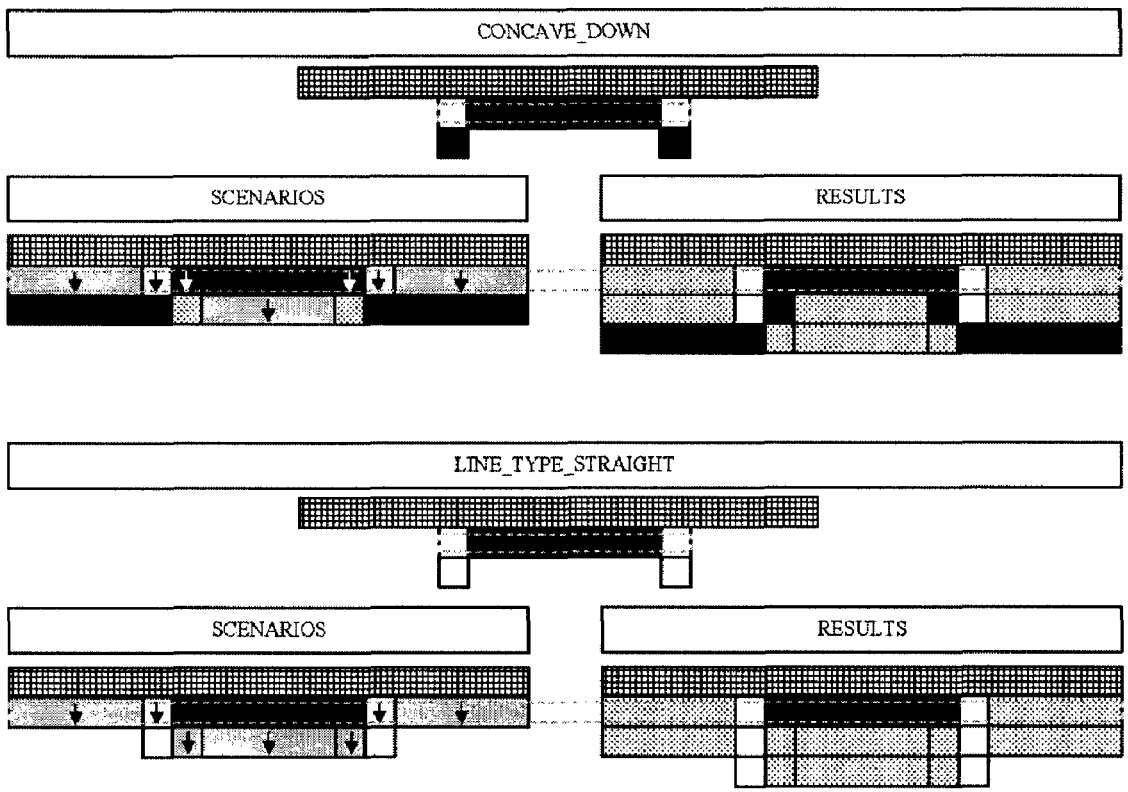
Figure 34:
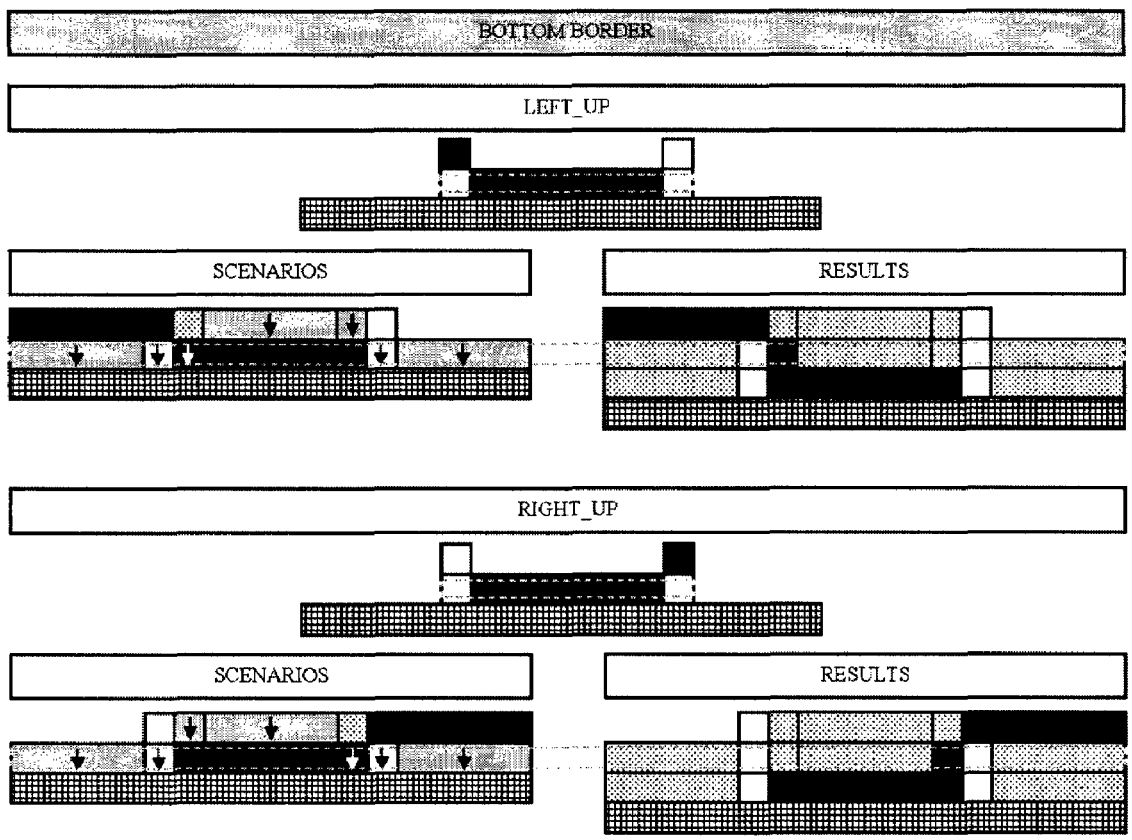
Figure 35:
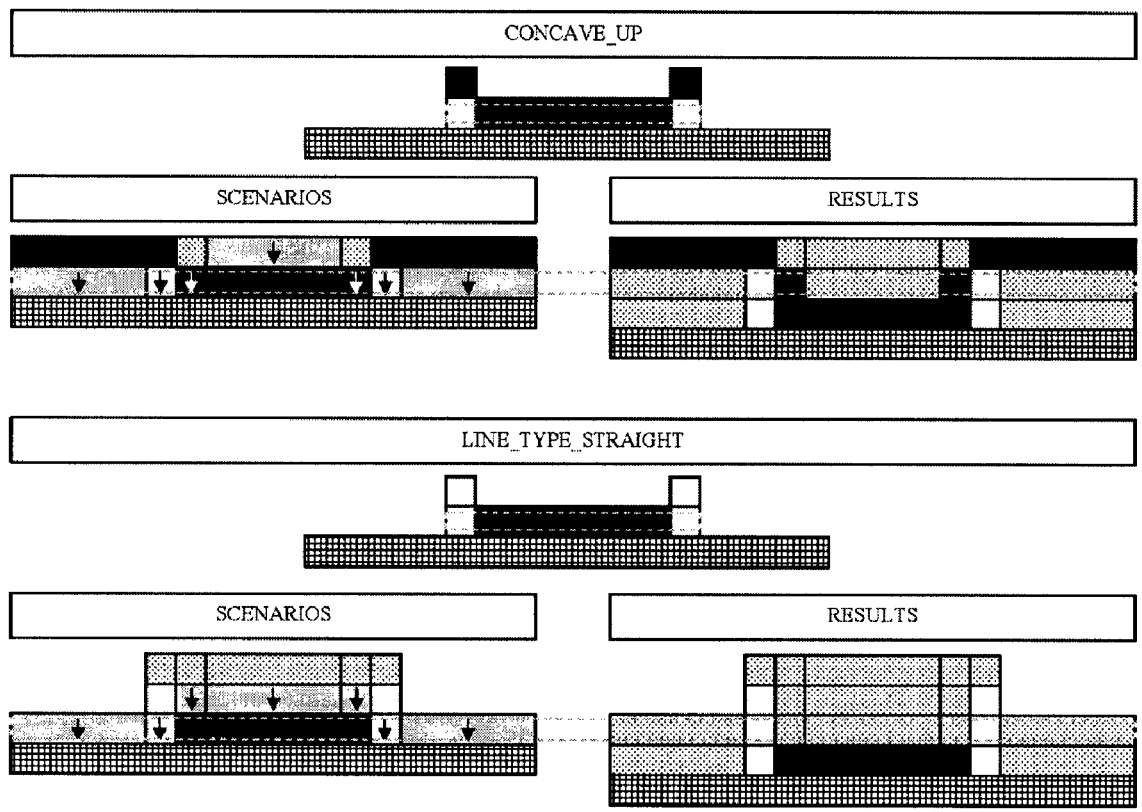
Figure 36:
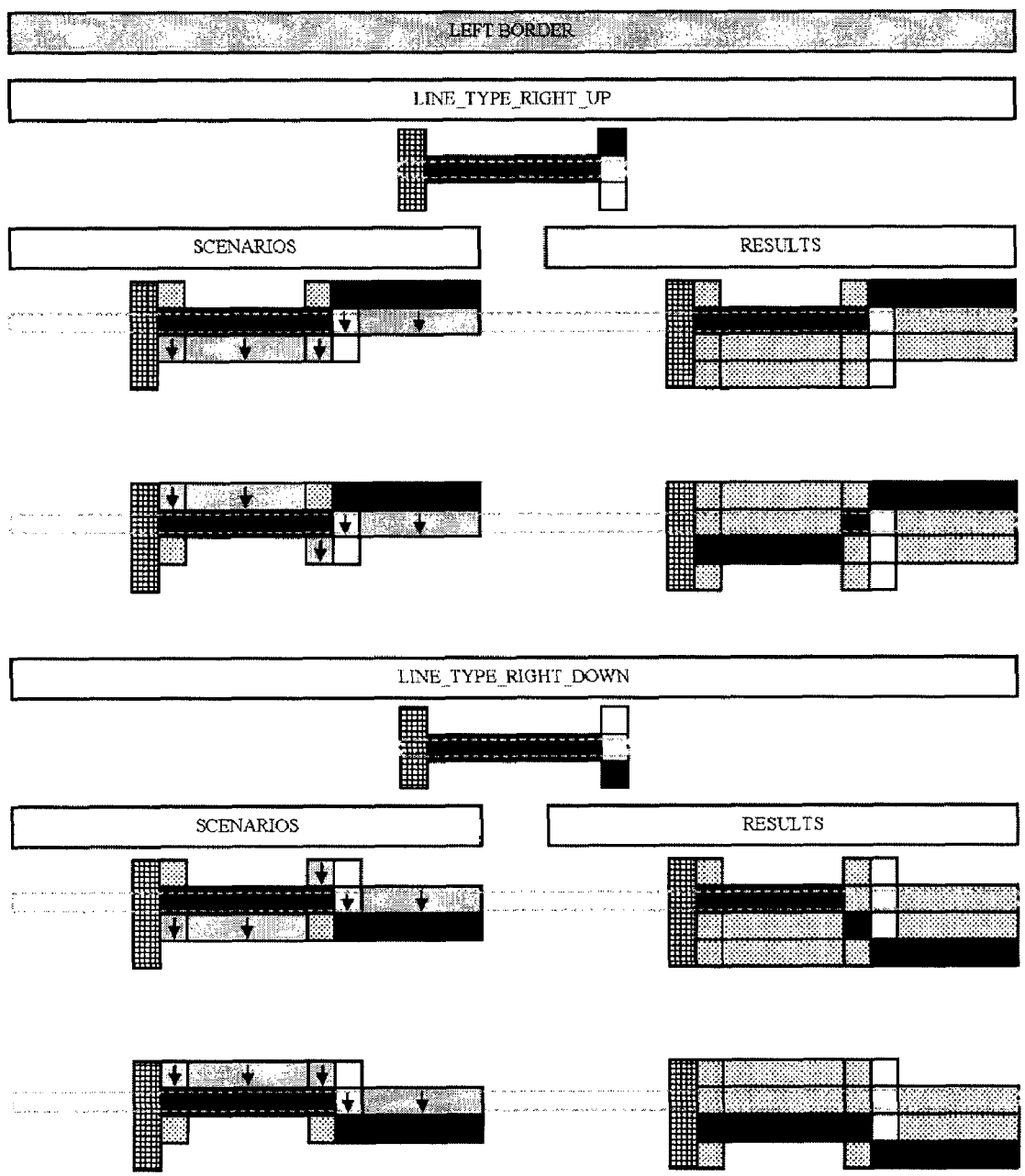
Figure 37:
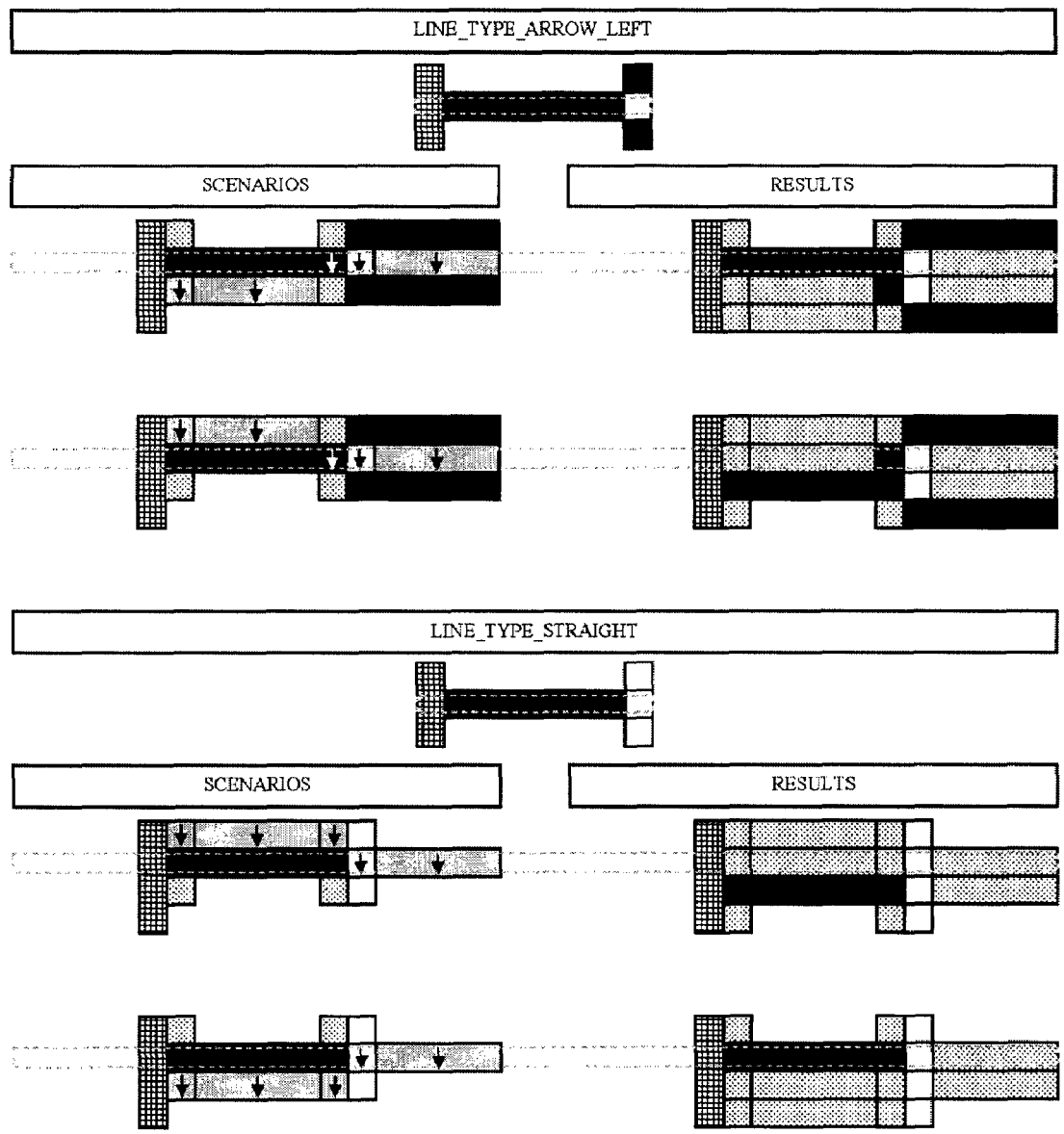
Figure 38:
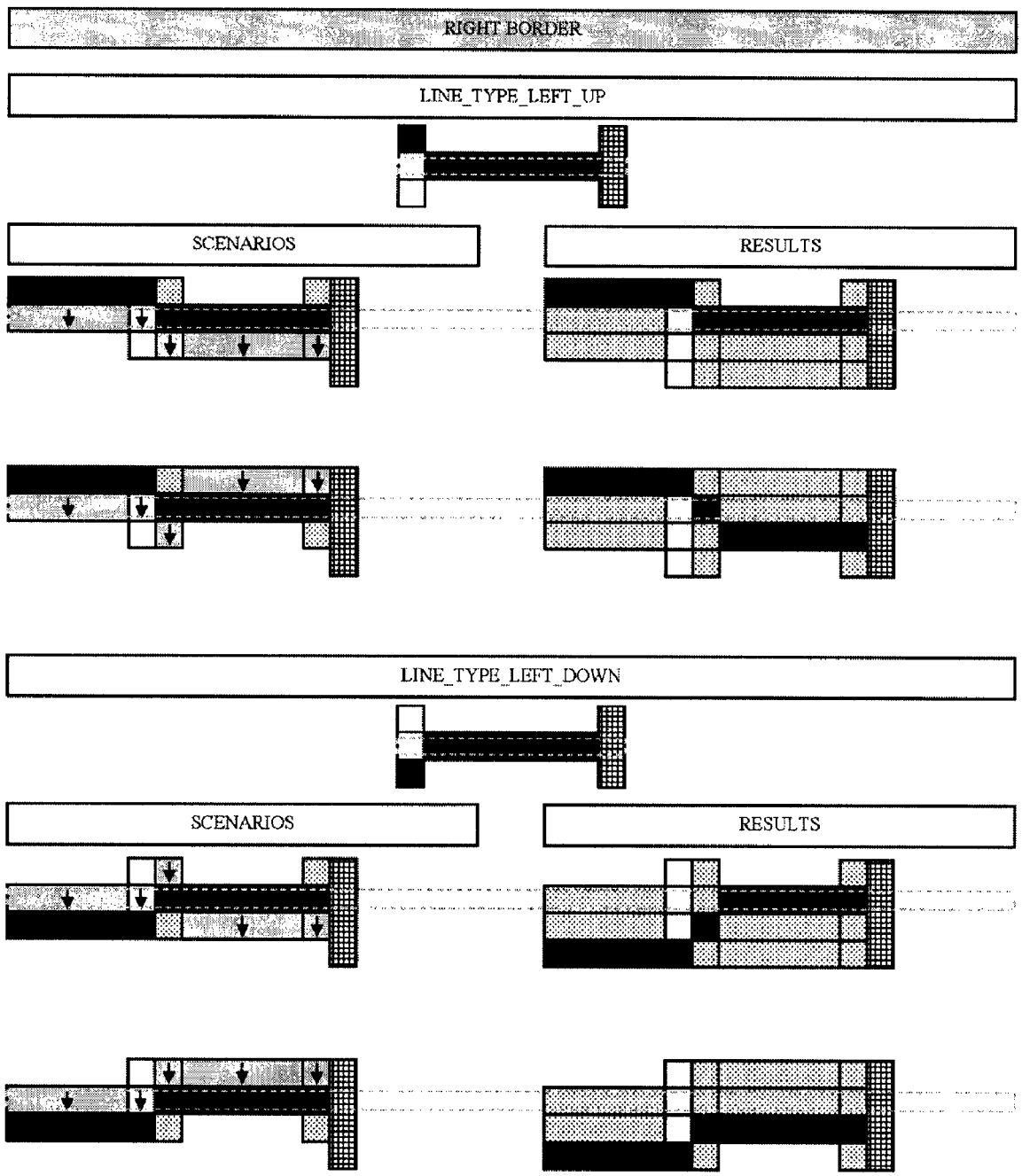
Figure 39:
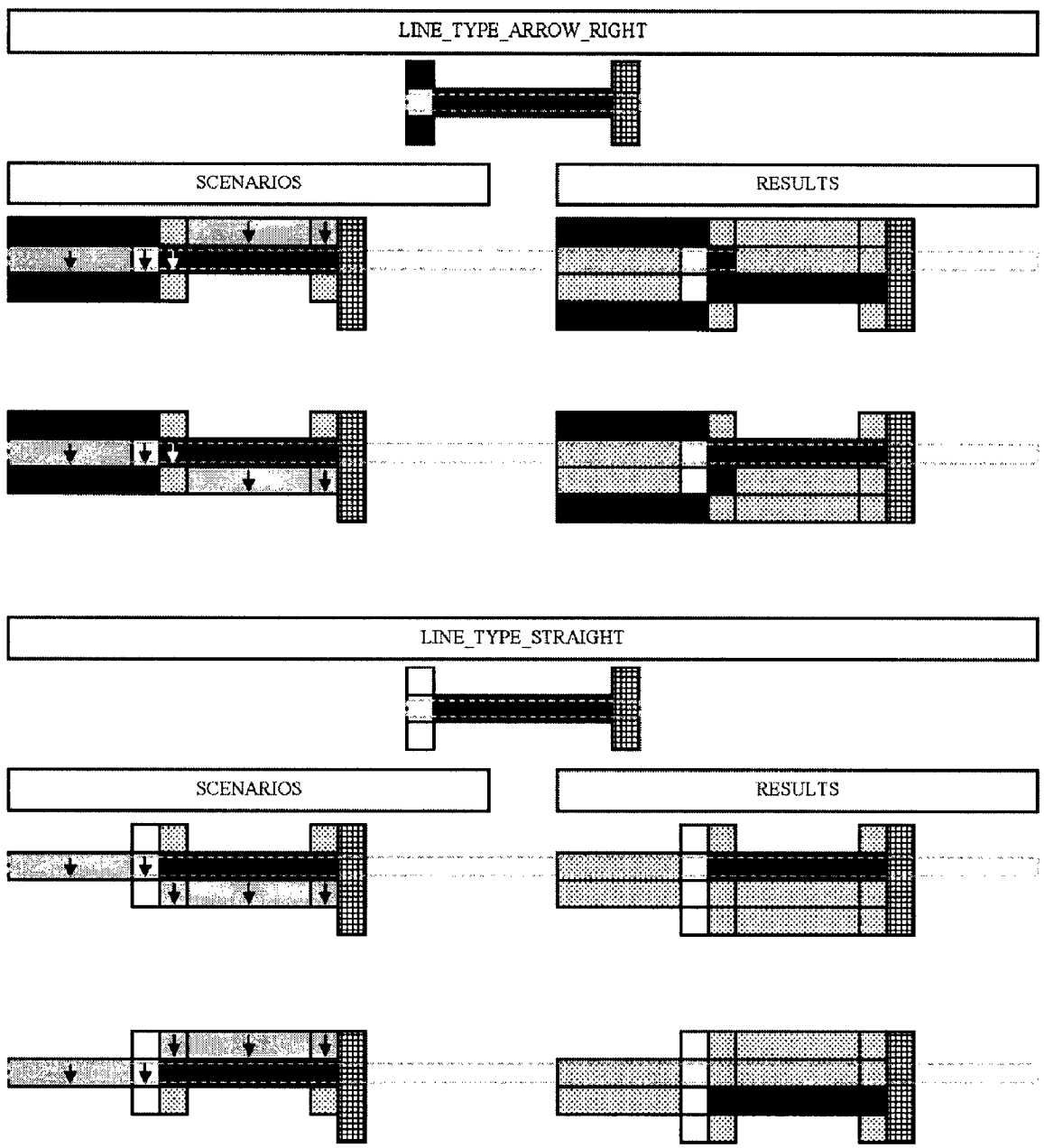
Figure 40:
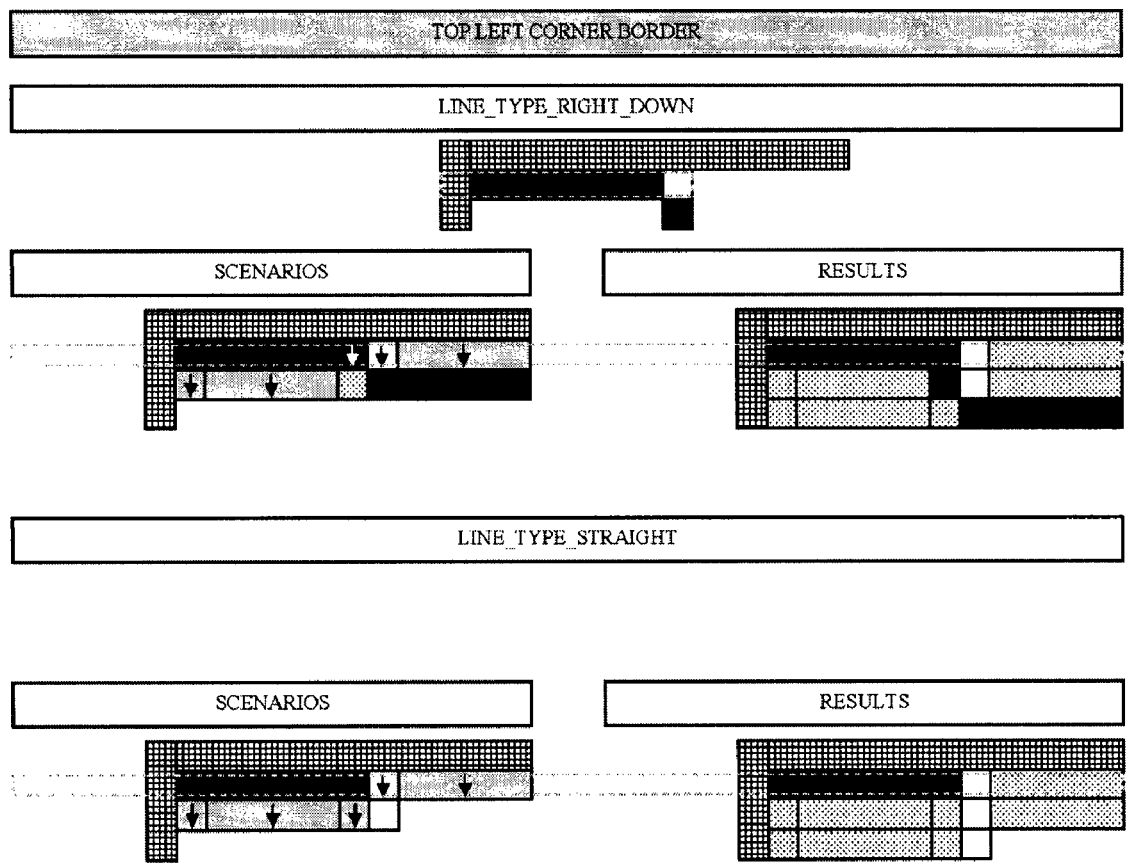
Figure 41:
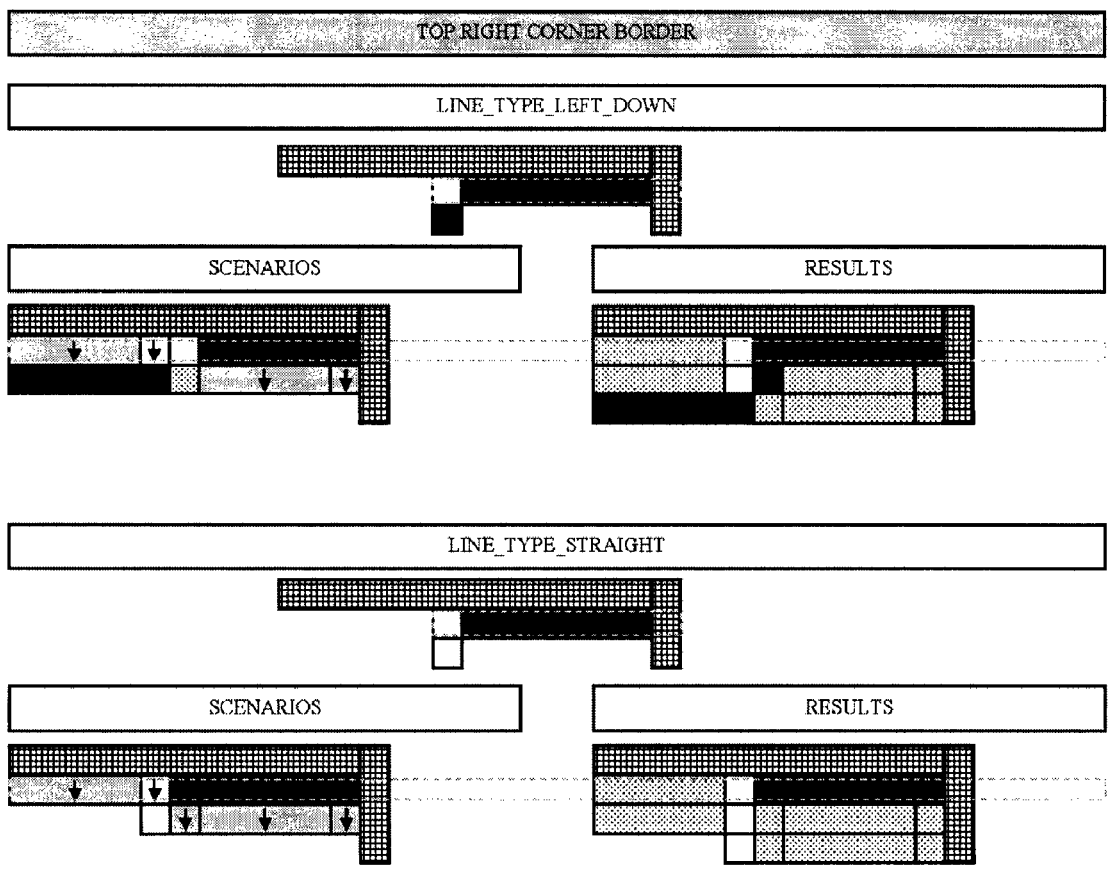
Figure 42:
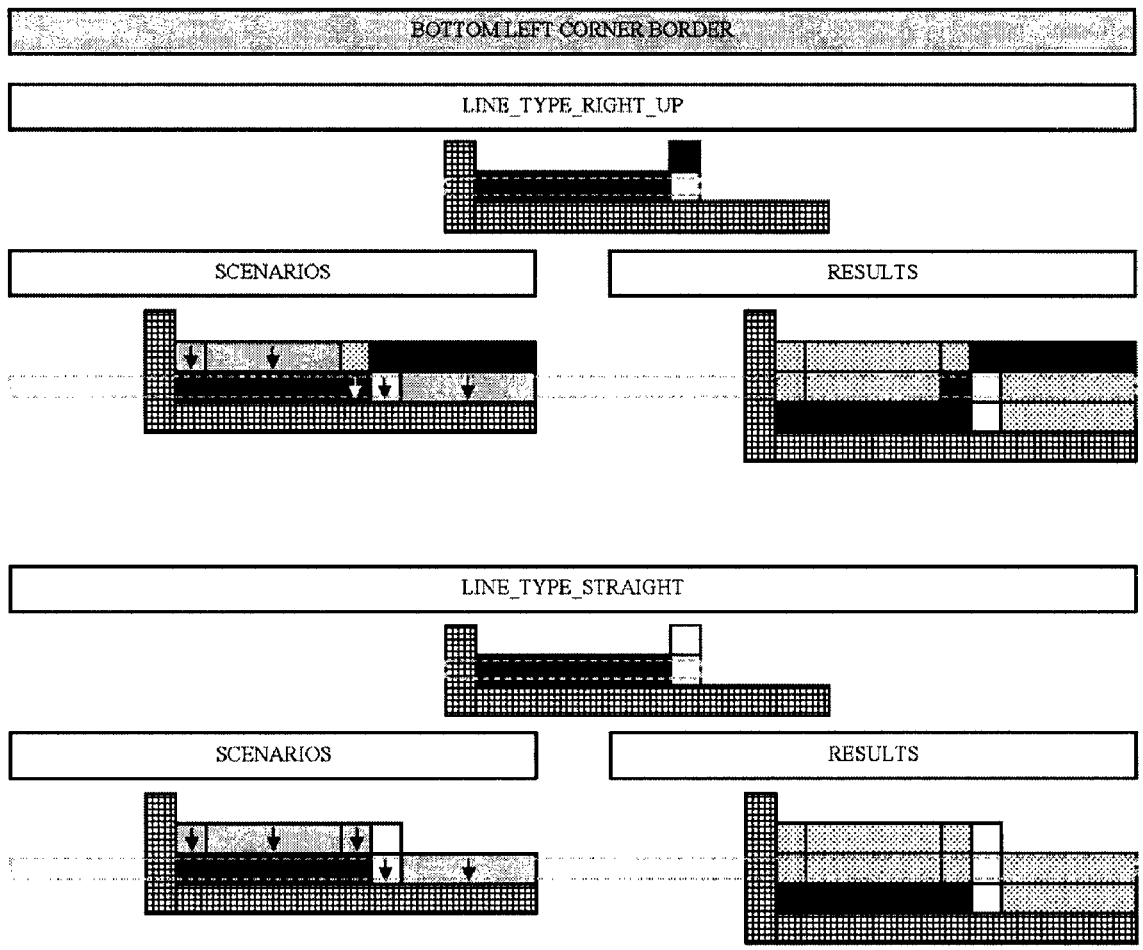
Figure 43:
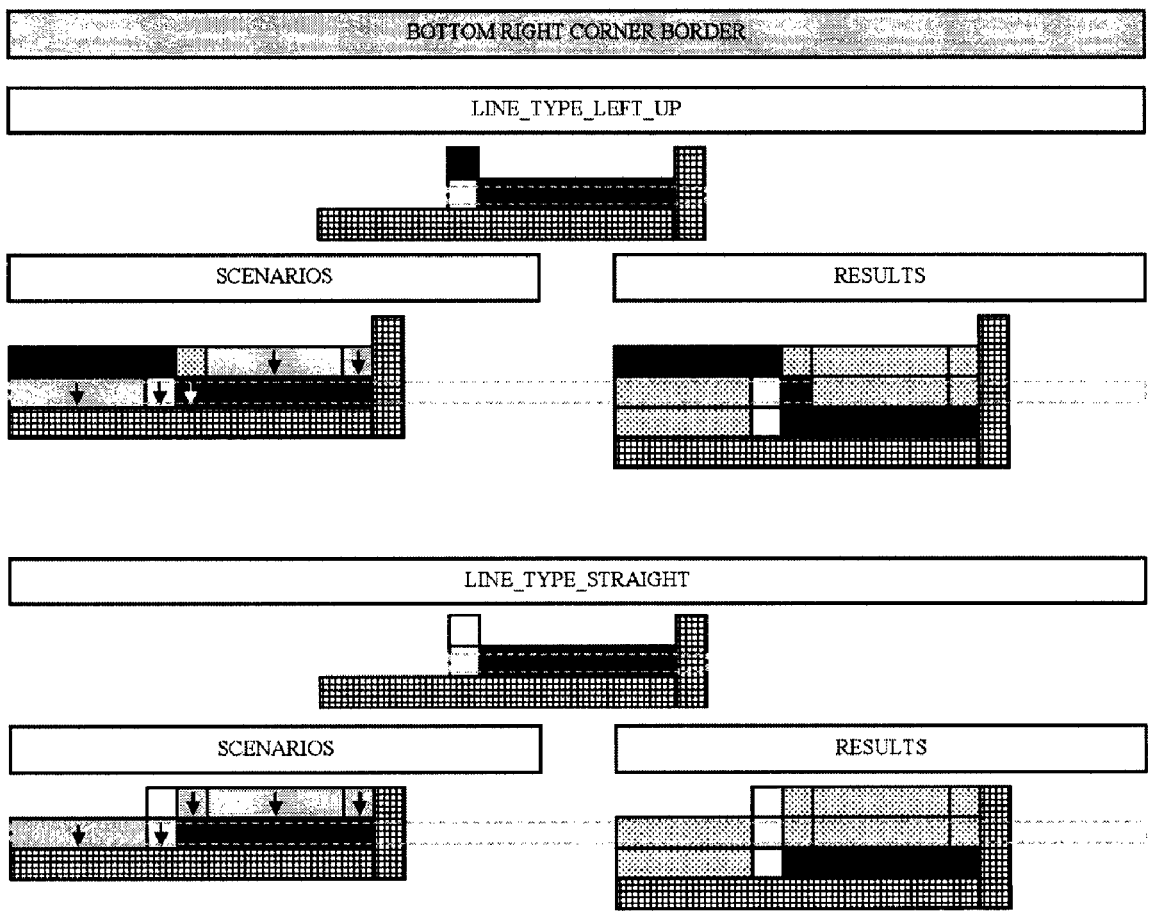
Figure 44:
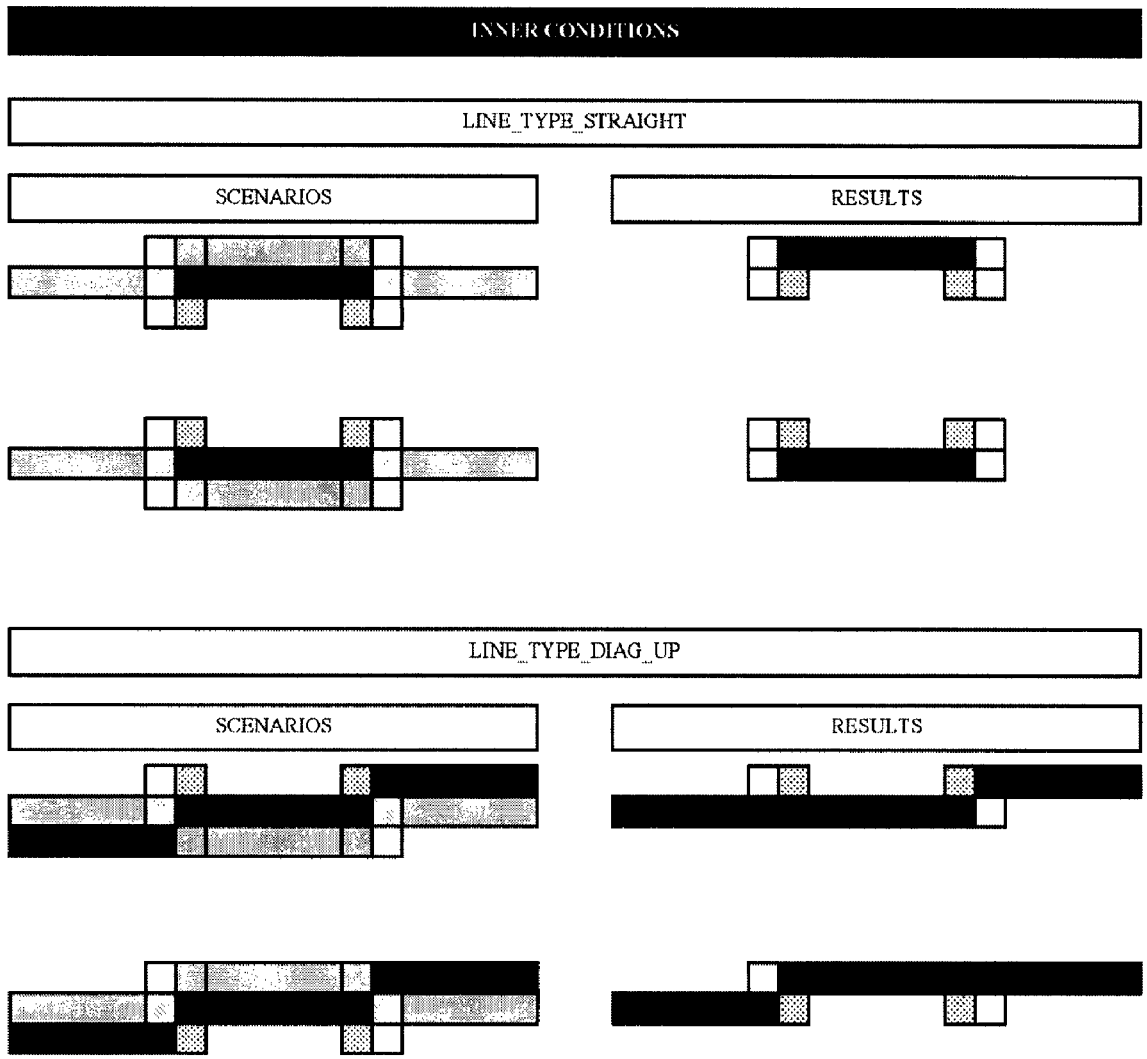
FIGS. 44 through 61 show the locator patterns and corresponding replacement pixel patterns stored in the reduction locator pattern library.
Figure 45:
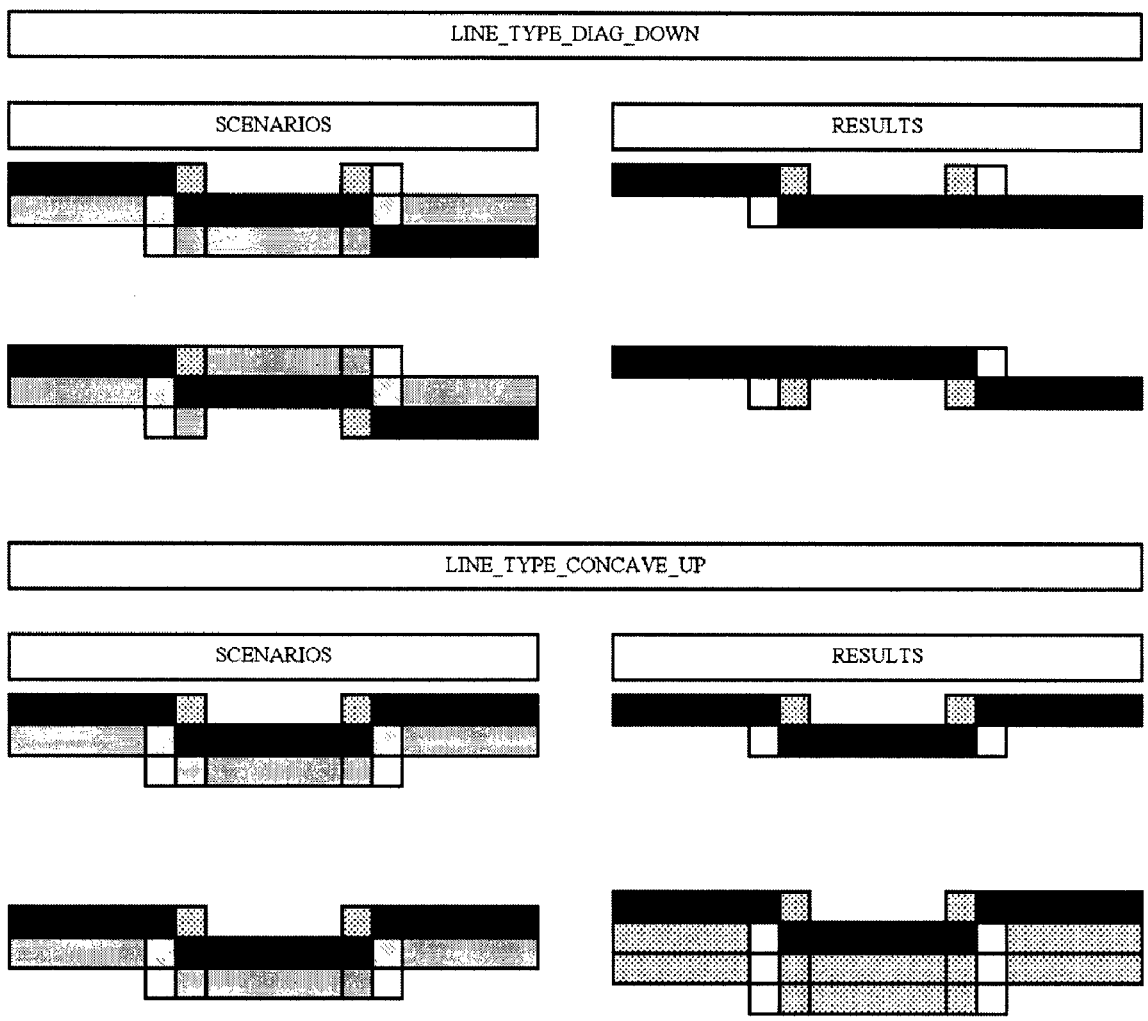
Figure 46:
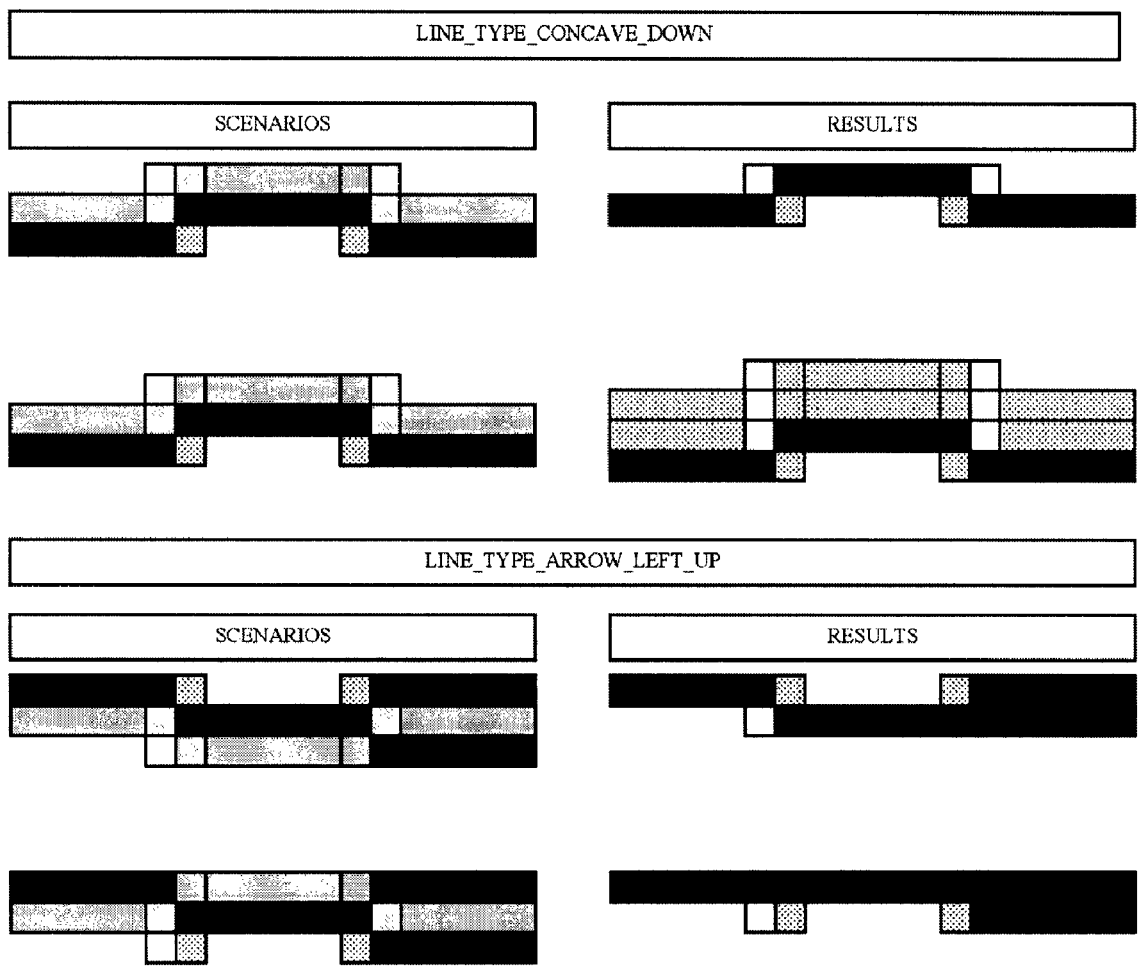
Figure 47:
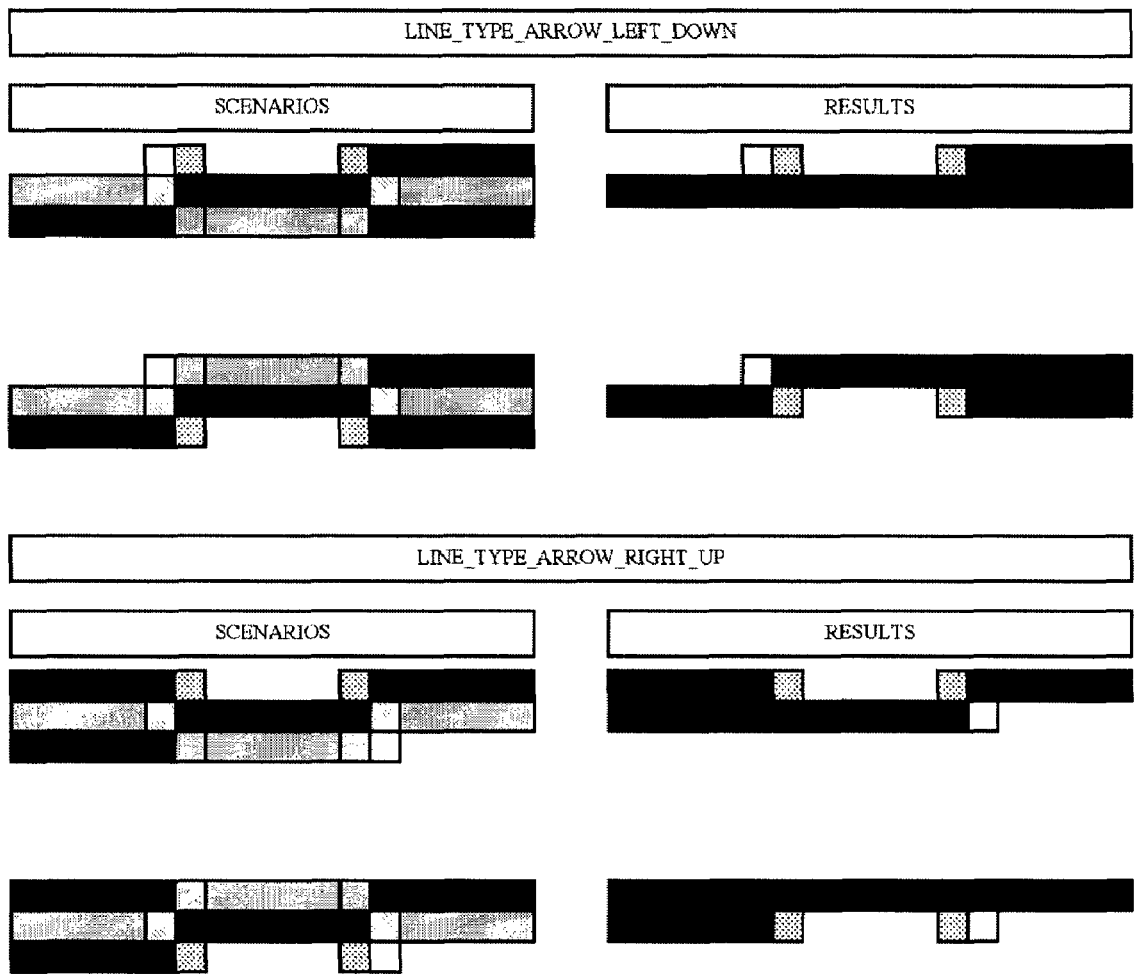
Figure 48:
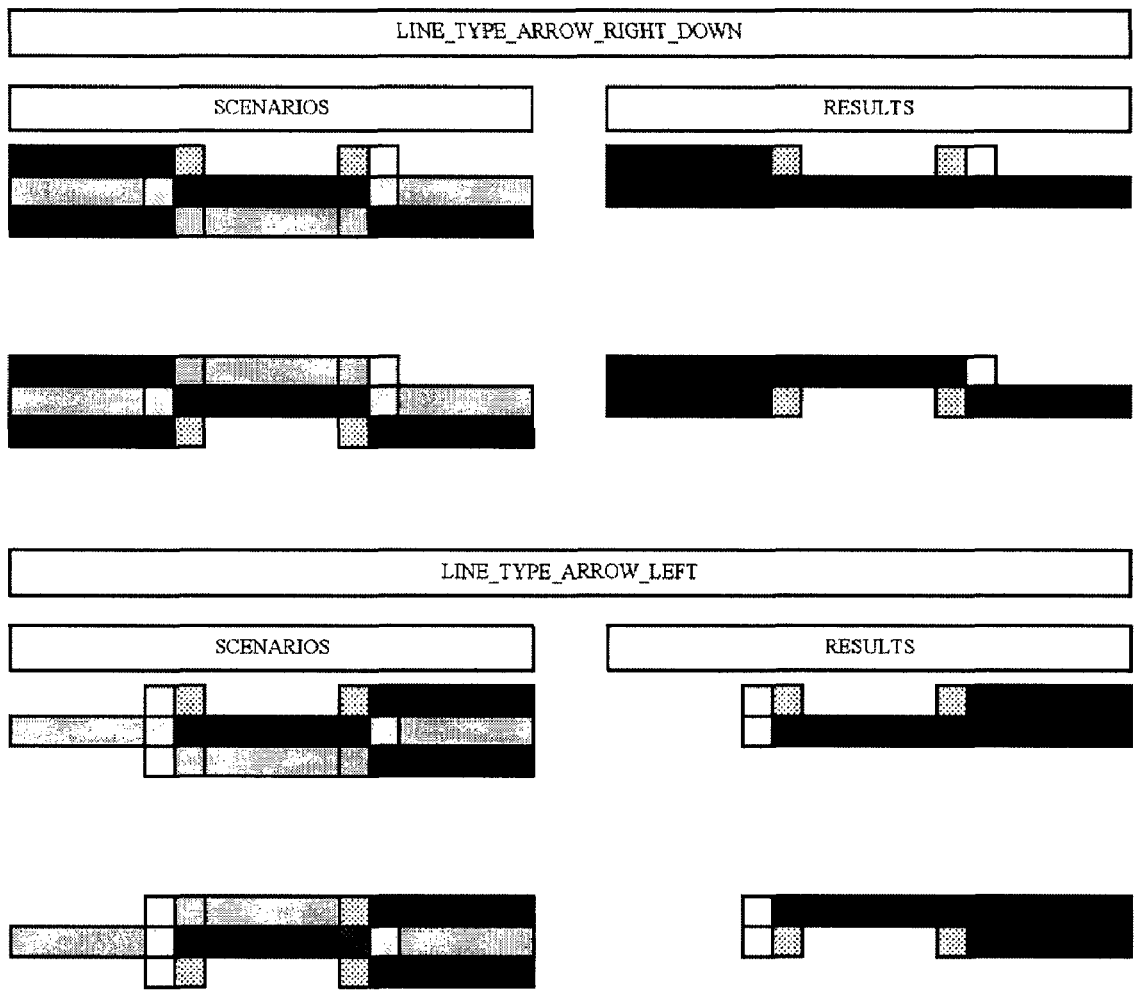
Figure 49:
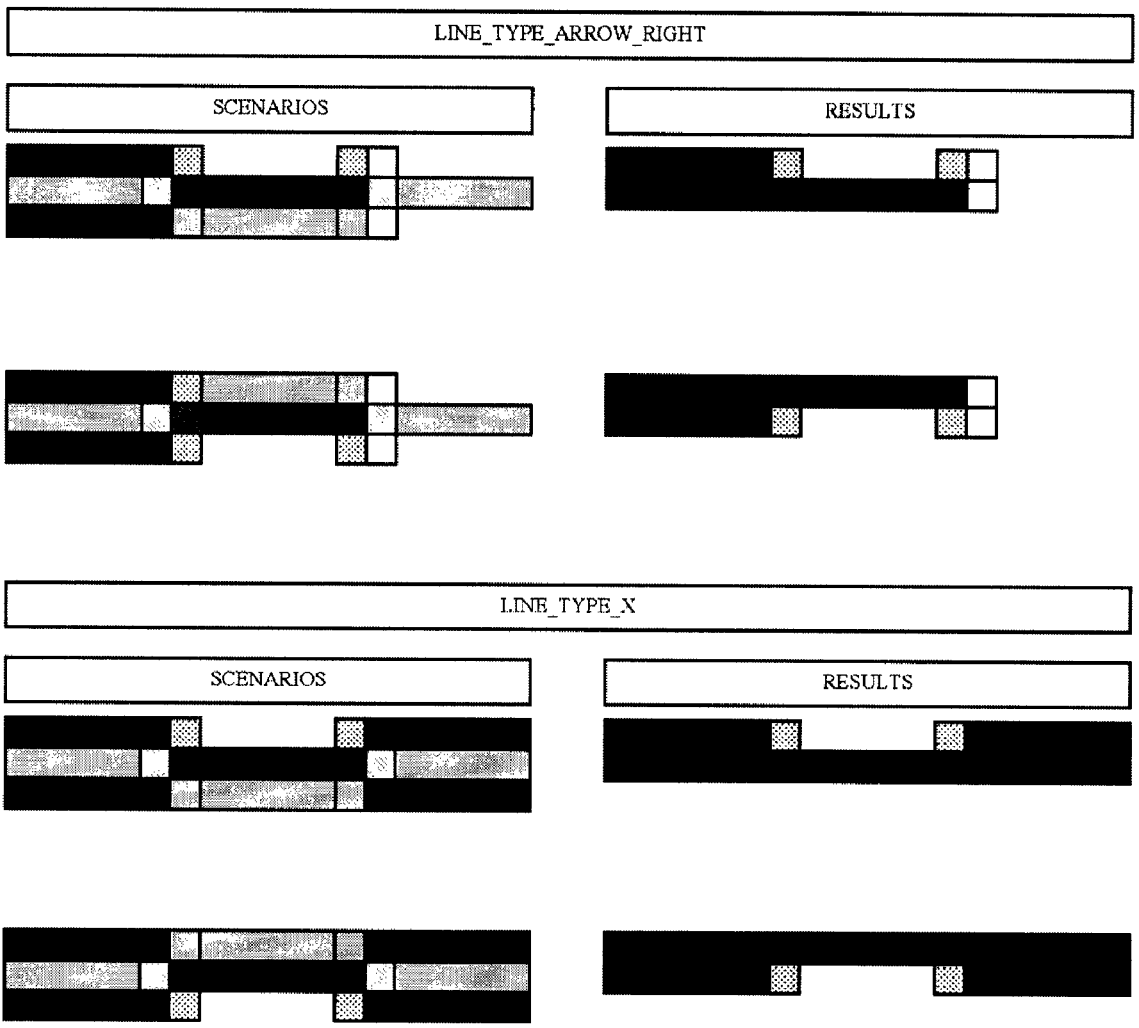
Figure 50:
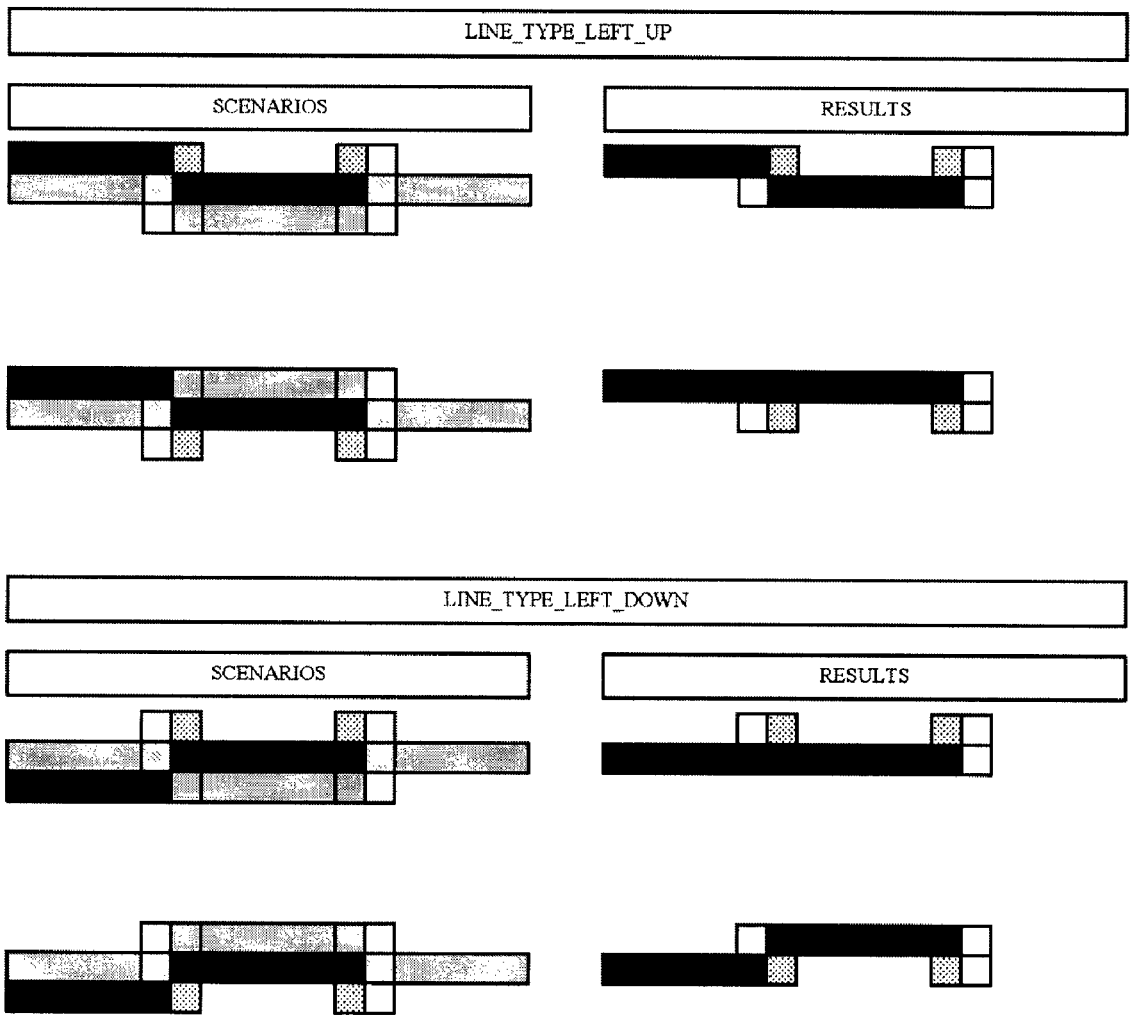
Figure 51:
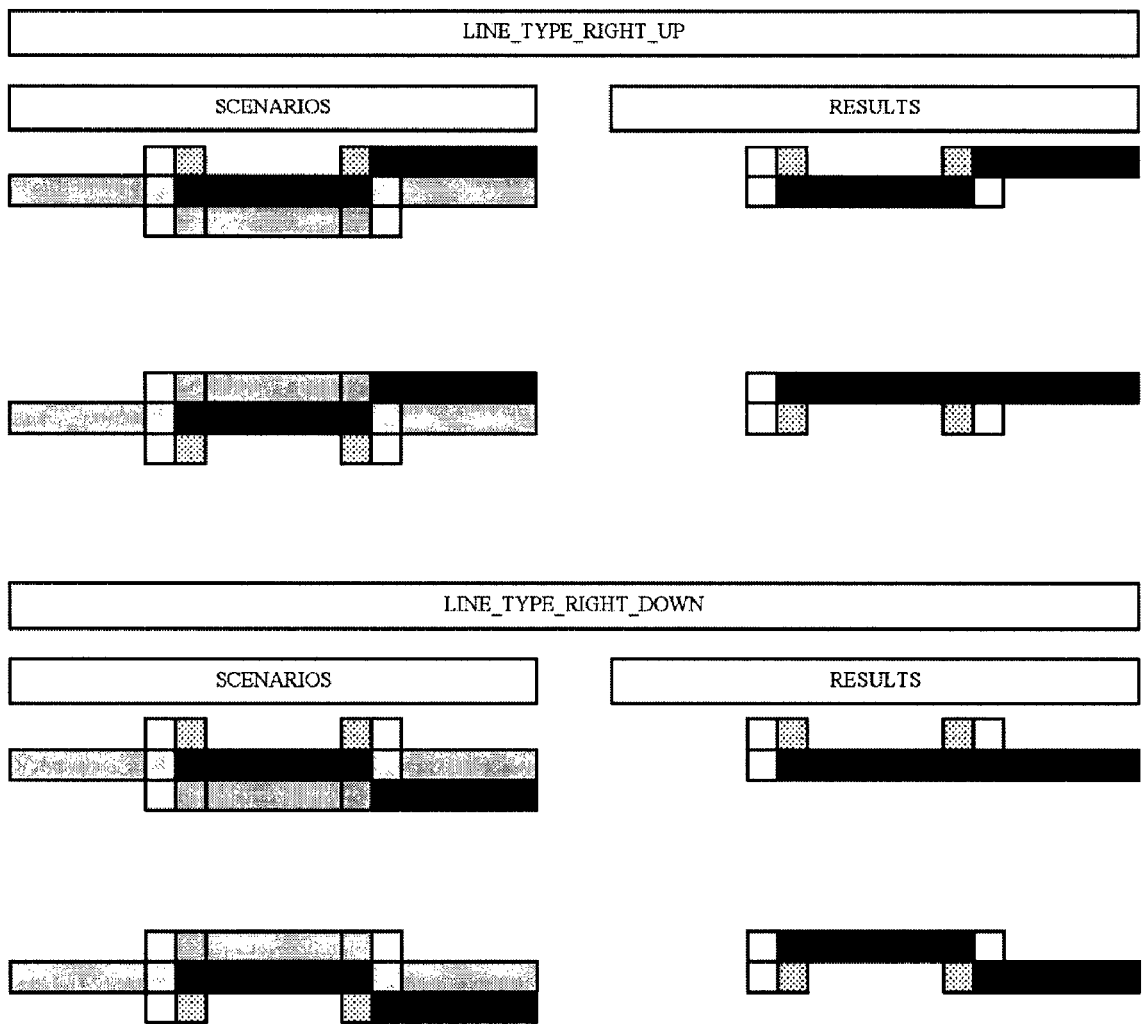
Figure 52:
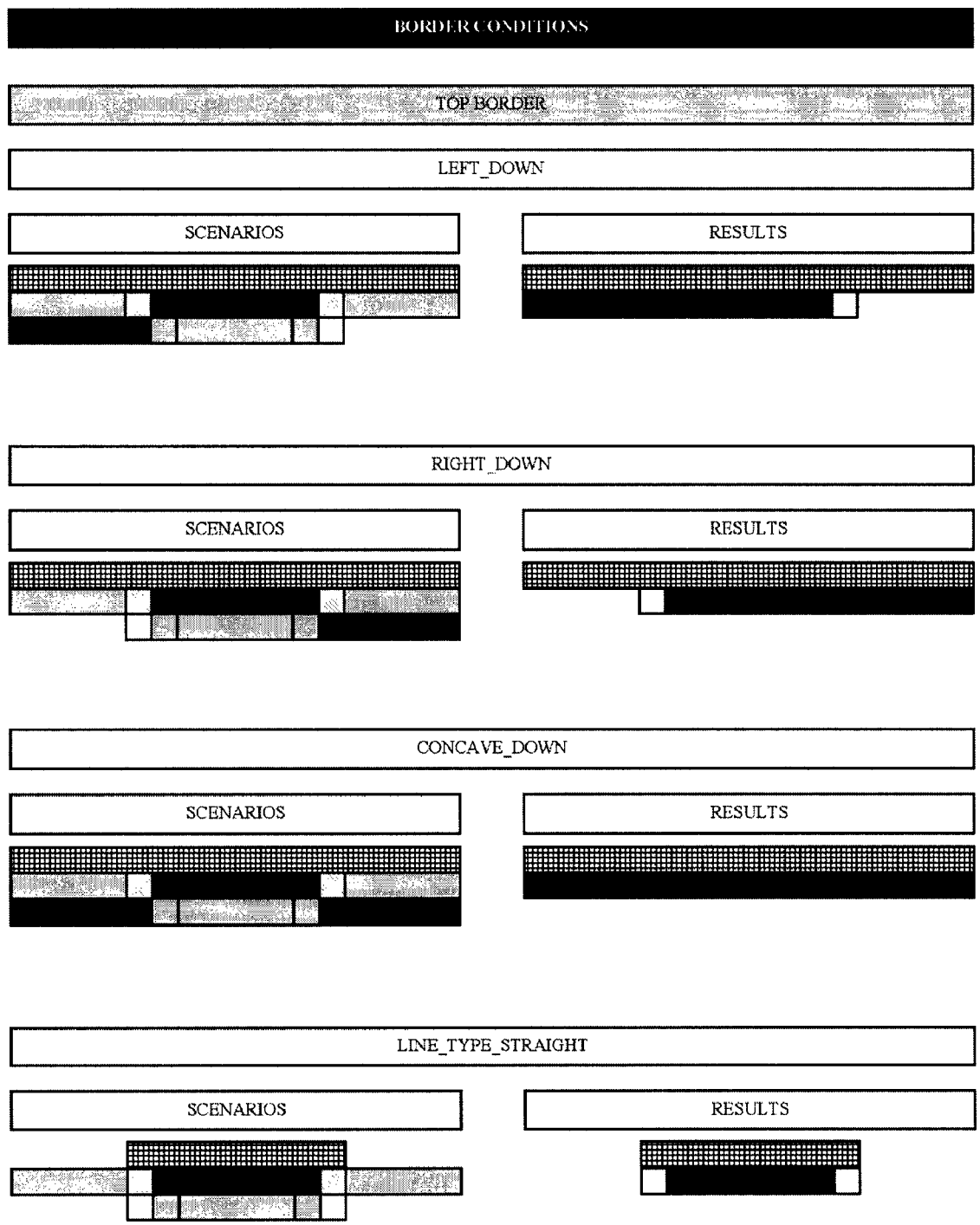
Figure 53:
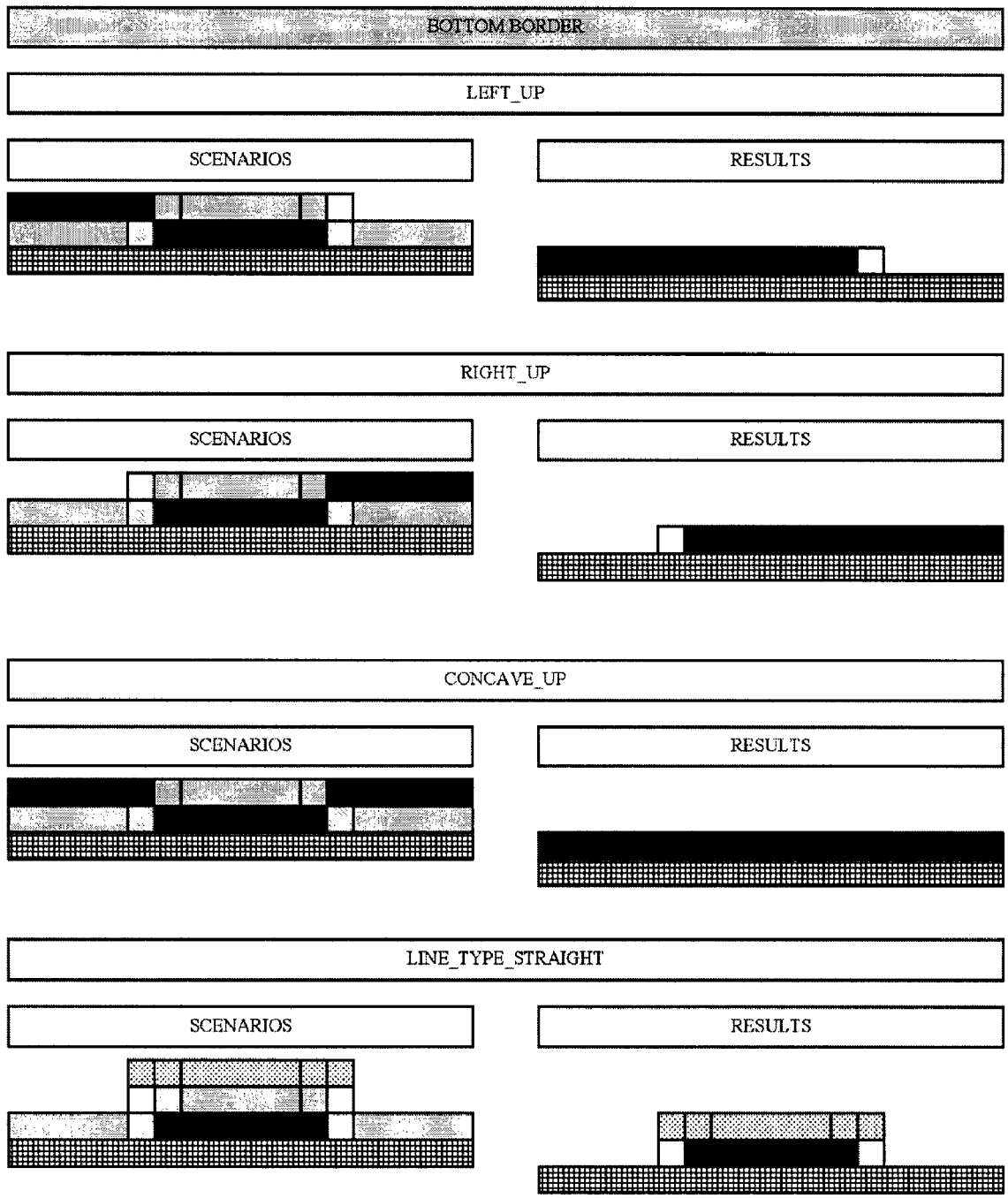
Figure 54:
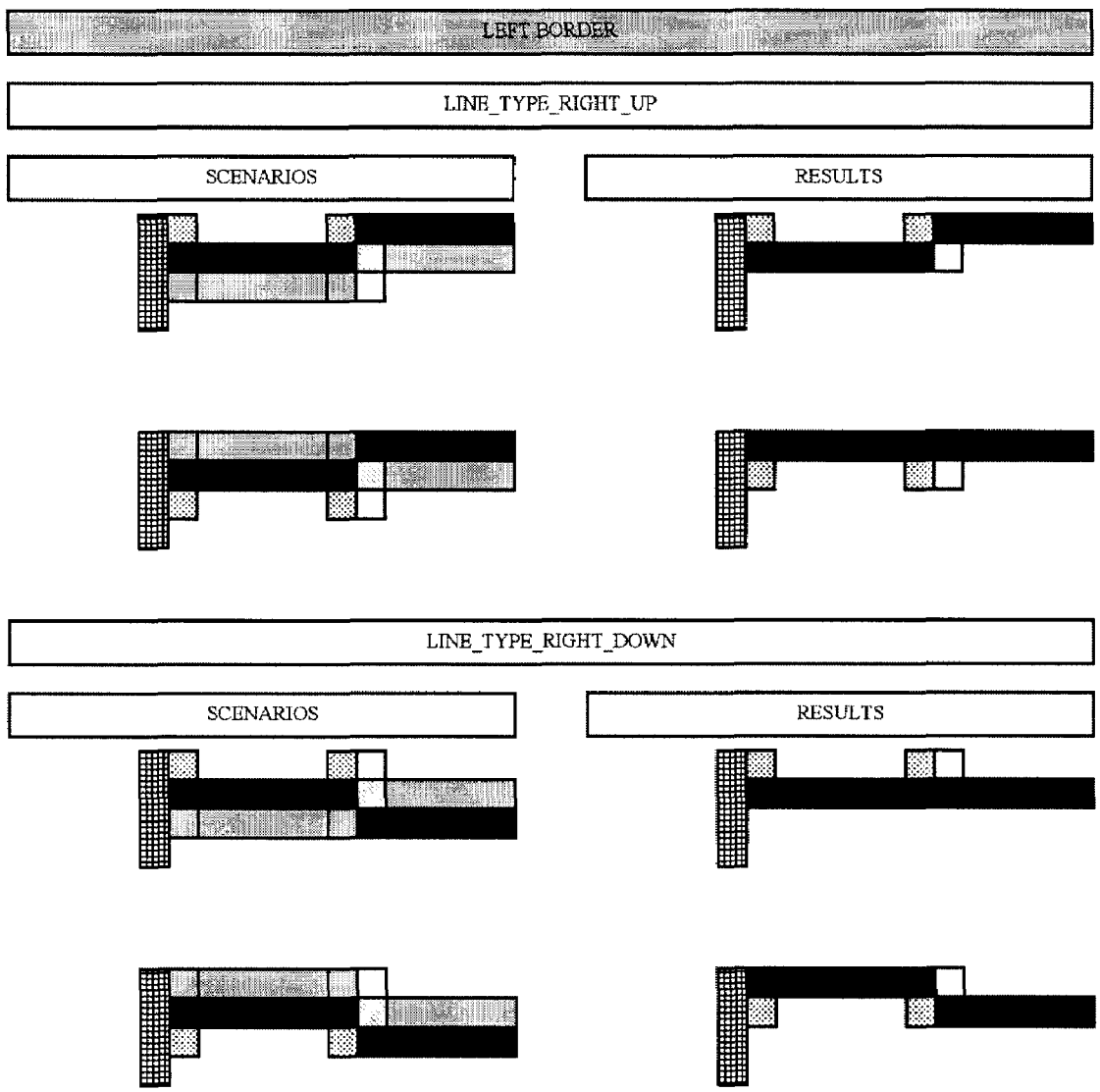
Figure 55:
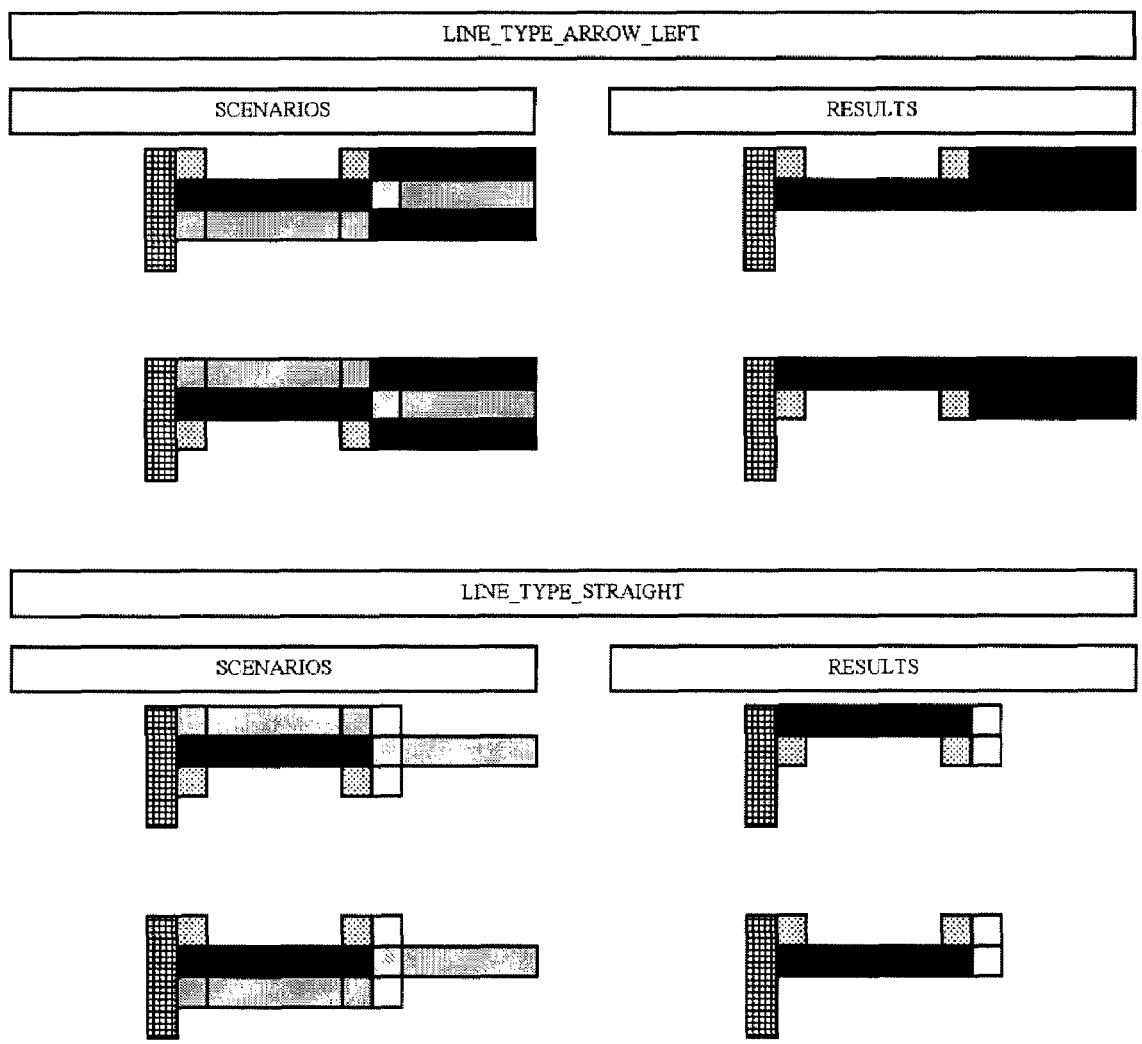
Figure 56:
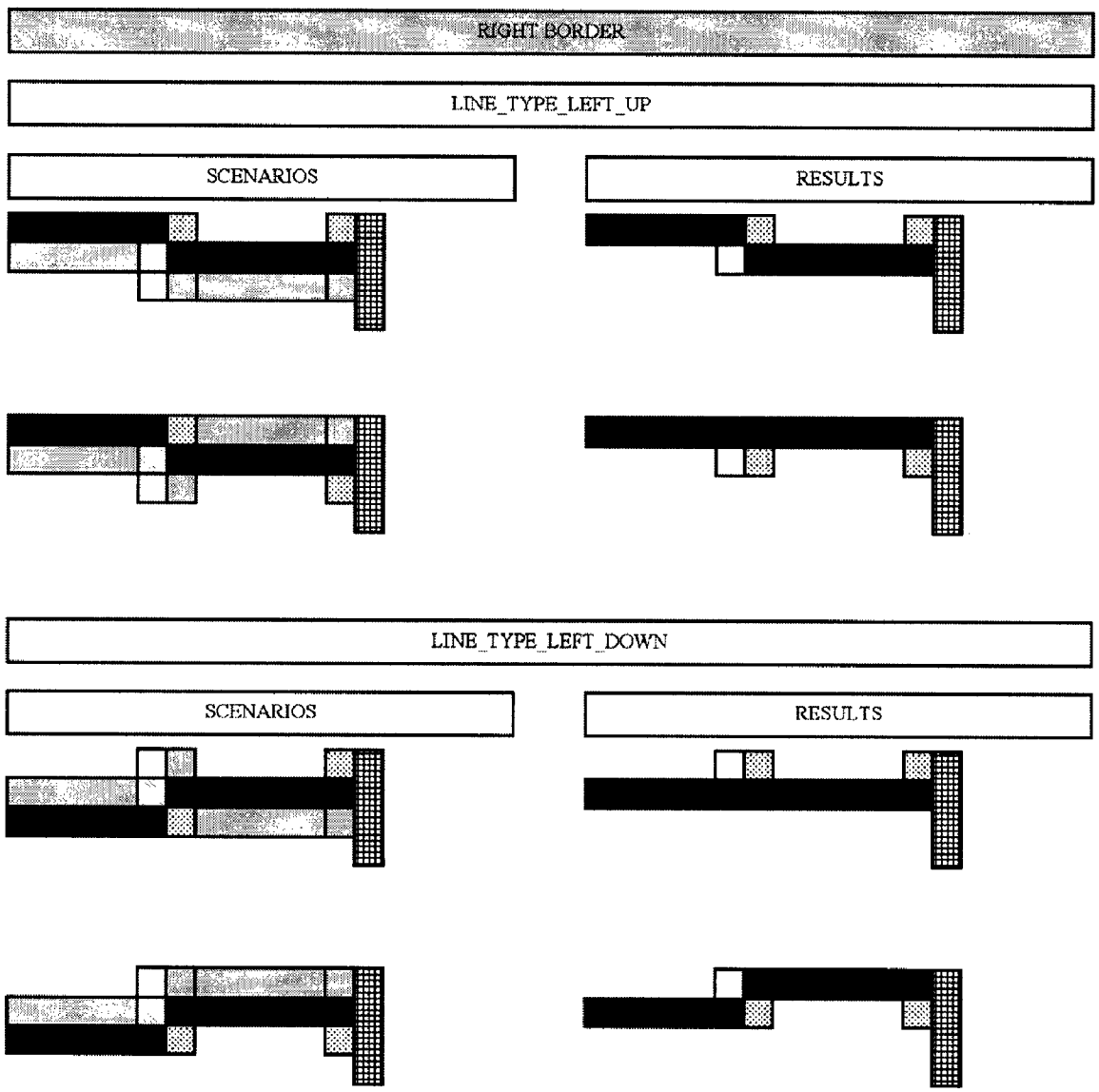
Figure 57:
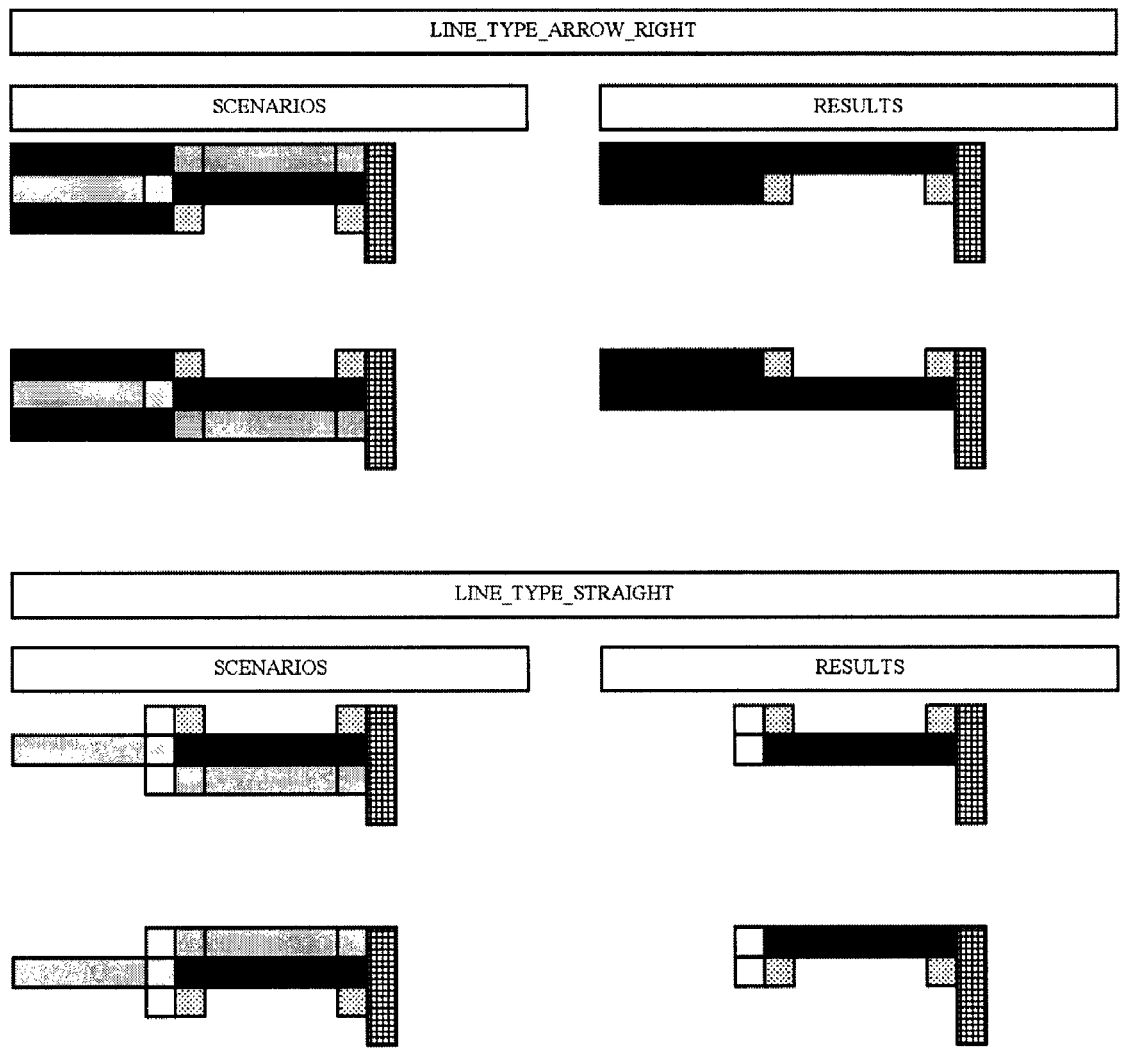
Figure 58:
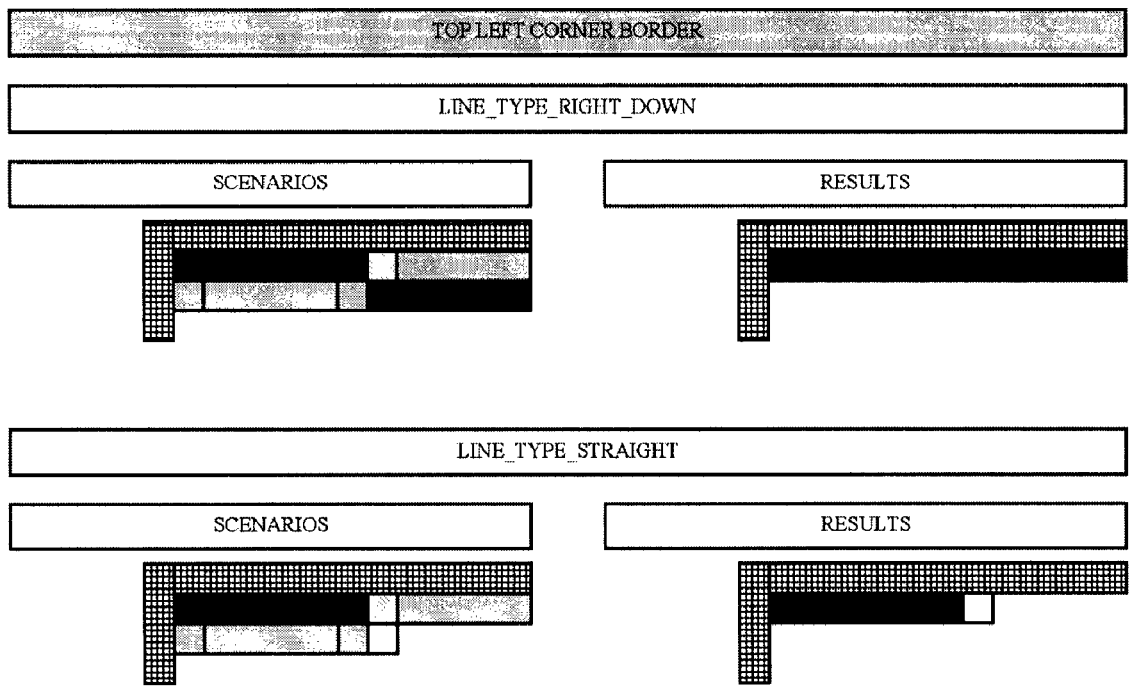
Figure 59:
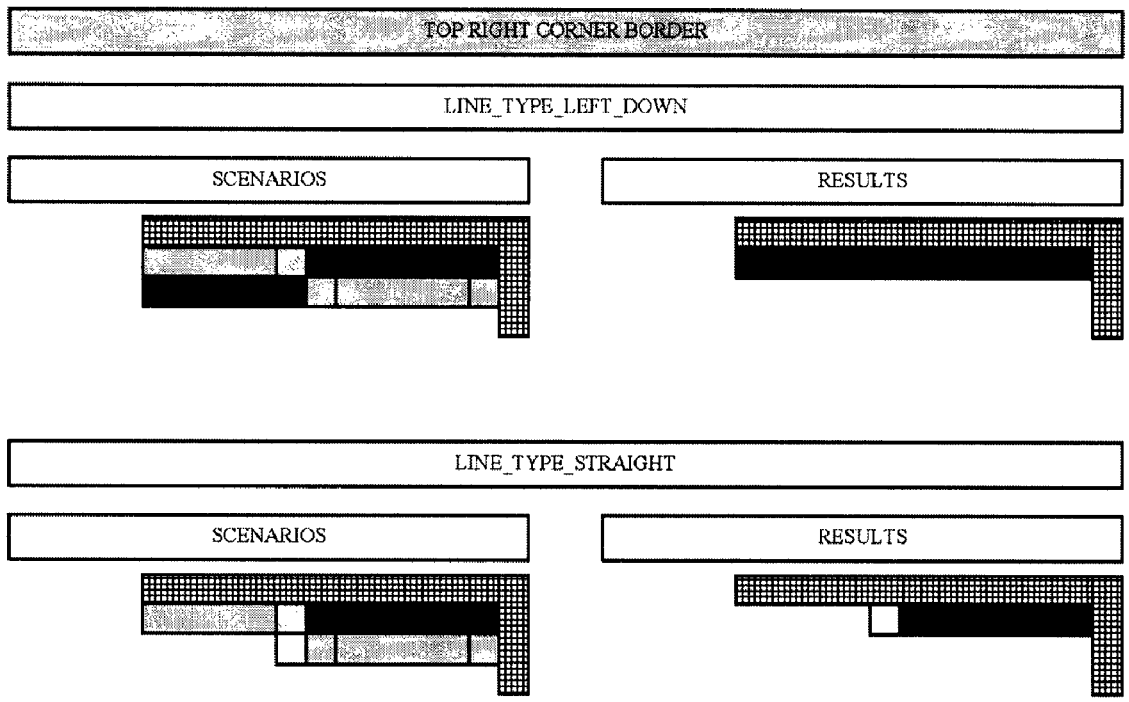
Figure 60:
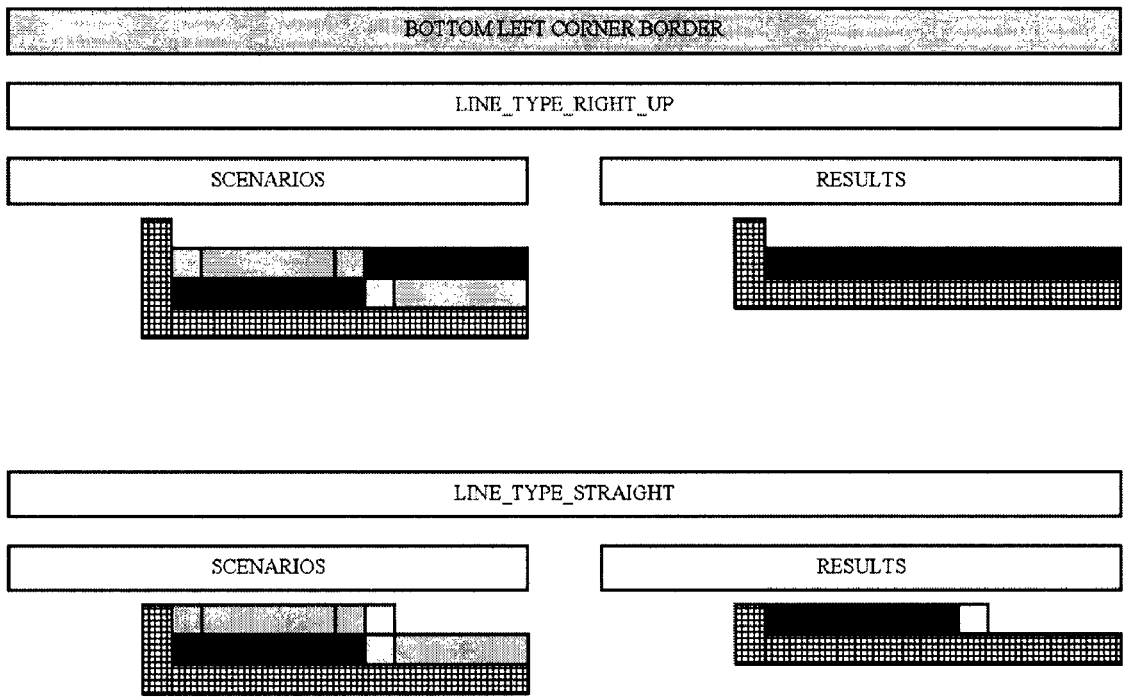
Figure 61:
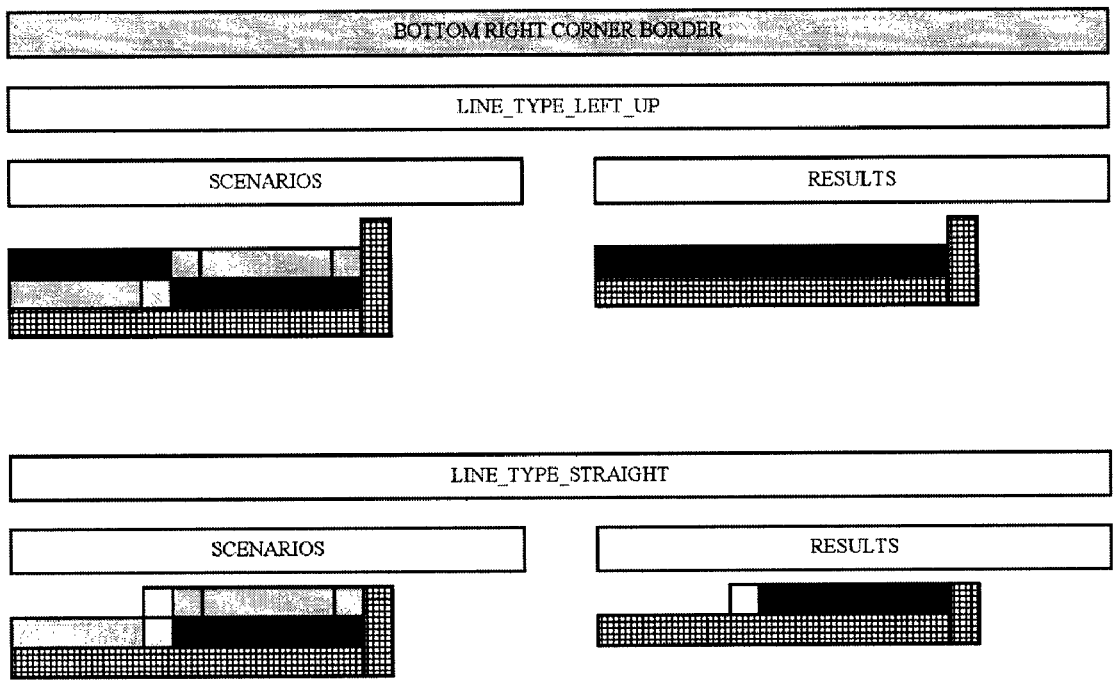

FIG. 23 shows the legend for drawings illustrating the locator patterns and corresponding replacement pixel patterns stored in the reduction locator pattern library.

Each scenario shown in FIGS. 44-61 provides an exemplary reduction locator pattern and its corresponding replacement pixel pattern. For ease of illustration, the adjustment pixel columns are presented horizontally, whereas they are vertical in accordance with the embodiment described hereinabove. The scenarios are structured in a similar manner to FIG. 22.

FIGS. 18a and 18b illustrate an exemplary locator pattern in the stretch locator pattern library and its corresponding replacement pixel pattern. As can be seen in FIG. 18a, the locator pattern includes an edge shown in black. The edge travels along three pixel columns, the middle one of which has been selected for duplication in order to stretch the image i.e. selected as an adjustment pixel column. The corresponding replacement pixel pattern shown in FIG. 18b replaces the segment of the edge intersected by the adjustment pixel column with a segment that spans both the selected adjustment pixel column and the inserted duplicate pixel column. Since the segment of the edge is not simply duplicated, a smooth transition between the two segments of the edge in pixel columns adjacent the adjustment pixel column results. Further, by not simply duplicating the segment of the edge along the adjustment pixel column, an edge having an undesirable double pixel thickness along a portion of its length is avoided.

FIGS. 19a and 19b illustrate an exemplary locator pattern in the reduction locator pattern library and its corresponding replacement pixel pattern. As can be seen in FIG. 19a, the locator pattern includes an edge similar to that of FIG. 18a shown in black. The edge travels along three pixel columns, the middle one of which has been selected for deletion in order to reduce the image i.e. selected as an adjustment pixel column. The corresponding replacement pixel pattern shown in FIG. 19b shows that, while the segment of the edge intersected by the adjustment pixel column has been deleted along with the adjustment pixel column, the adjacent pixel columns have been adjusted to compensate for the removed edge segment, allowing the edge to continue in an unbroken manner.

Figure 20A:
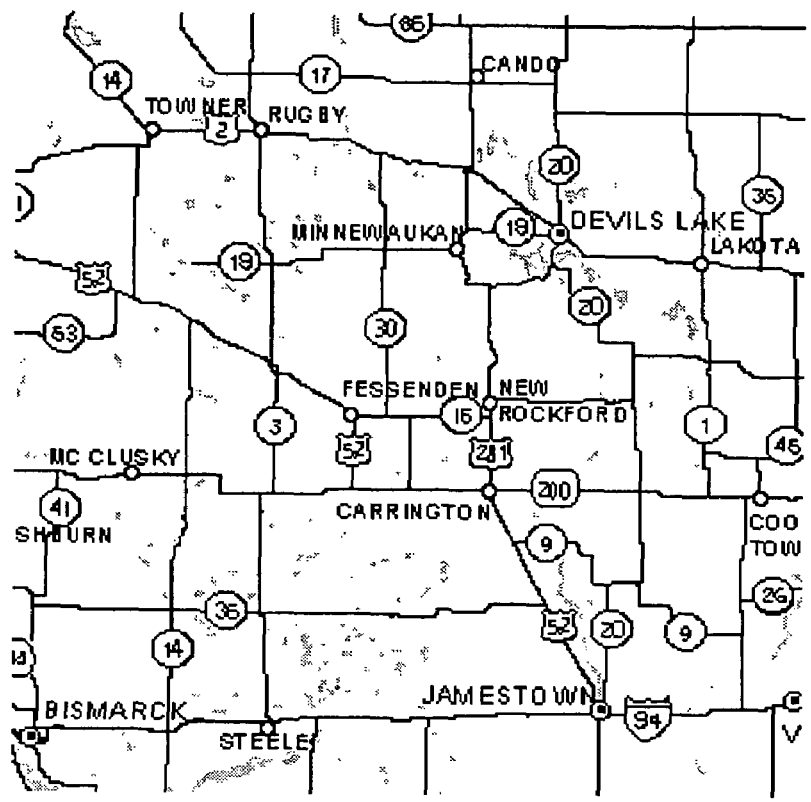
FIGS. 20a and 20b show the image of FIG. 4 and a horizontally stretched image generated by the apparatus of FIG. 6.
Figure 20B:
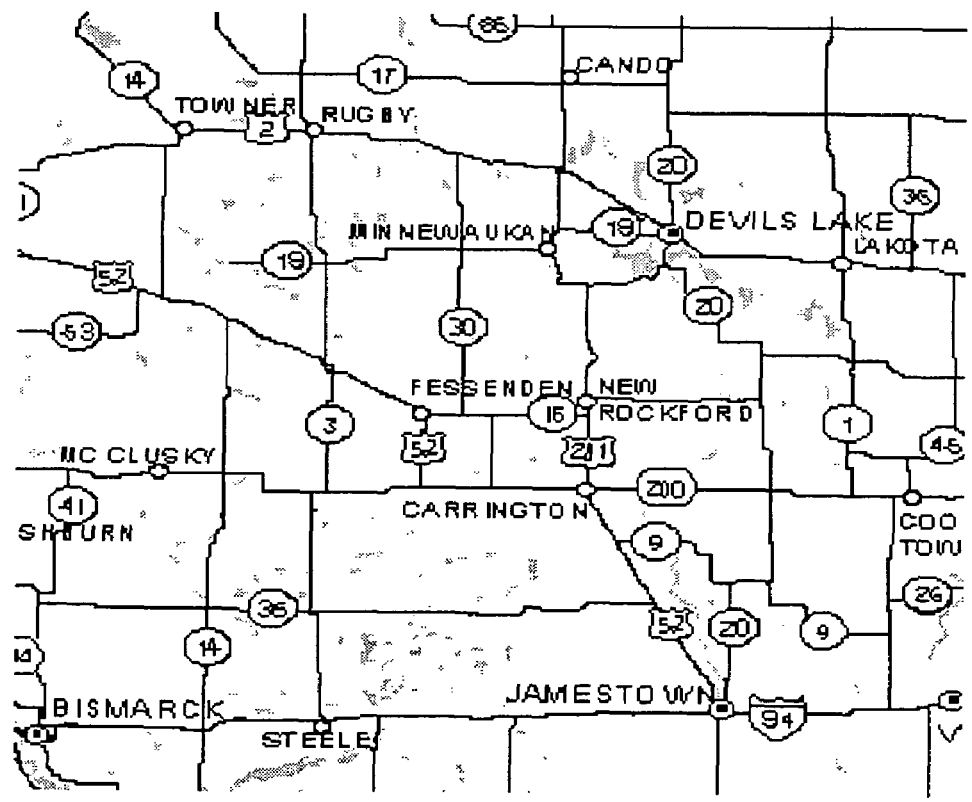

FIGS. 20a and 20b show the original image of FIG. 4 before and after having been resized to 120% of its original size along its width from 300-by-300 pixels to 300-by-360 pixels. As can be seen, the resized image in FIG. 20b contains few visual aberrations as a result of the resize and appears to be relatively evenly stretched.

It may be advantageous to consider the spacing between selected adjustment pixel columns in some circumstances. In such cases, the selection of the adjustment pixel columns can be done in a similar manner to the traveling salesman problem in that a number of adjustment pixel columns can be kept under consideration until all regions have been considered. In this manner, spacing between adjustment pixel columns can be considered in selecting the adjustment pixel columns.

While specificity to vertical edges in input images has been made, those of skill in the art will appreciate that other edge orientations and/or types of areas of sensitivity in input images can be taken into account. For example, areas of sensitivity can also include intricate designs that can be identified by patterns of pixel runs, such as alternating short repeating foreground and background pixel runs. If desired, rather than simply detecting edges, the areas of sensitivity can include lines of more than one pixel in thickness. In some cases, it can be desirable to preserve the relative thicknesses of the lines and/or segments of a line.

If desired, the areas of sensitivity in the image can be specified by a user using a software tool. For example, where it is desirable to maintain the proportions of a portion of a design, such as a logo, the user can specify the area of the logo as an area of sensitivity. When the image is being stretched or reduced, the area of sensitivity can be provided with special consideration in order to reduce any impact resizing of the image will have on the specified area of sensitivity.

It can be desirable to place little or no weight on some of the selected adjustment pixel columns inhibiting the image from being resized along these designated selected adjustment pixel columns. For example, where an image must be resized by a small ratio, and the image contains a large area of sensitivity, it can be desirable only to resize the image along adjustment pixel columns outside of the area of sensitivity.

It can be desirable to select adjustment pixel columns that are not straight in some circumstances. Where the areas of sensitivity have non-trivial lengths and widths, and are not distributed in a rectangular array, the adjustment pixel columns can be selected to circumvent the areas of sensitivity. Additionally, a minimum resize factor can be determined for certain areas of sensitivity, up to which no adjustment will occur in such areas of sensitivity, and above which the area of sensitivity is transformed.

It may be desirable to transform the image prior to resizing and then reversing the transformation after resizing. For example, where an image has a grid pattern of diagonal lines, it can be advantageous to rotate the image prior to stretching it so that the grid lines fall along columns and rows. In this manner, the straightness of the grid lines can be preserved.

The present method is readily adaptable to non-bitmap images. For example, where a vector graphics image is being resized, it can be desirable to resize the image in areas where such resizing does not impact the perceived quality of the image as it would it other areas. This can be particularly true where it is desired to maintain a certain grade for particular image lines. The present method can also be applied to resize color images. In this case, the areas of sensitivity can represent other characteristics of the image, such as for example areas of a certain color, brightness, contrast, general location in an image, etc.

Other forms of thresholding can be applied under various circumstances. For example, in the case of color images where areas containing the color blue are deemed to be areas of sensitivity in the images, the images can be thresholded to divide the images into areas within and outside of a preset range of the color spectrum around the color blue. Other types of thresholding methods will occur to those skilled in the art.

The roam ranges can be sized to provide little flexibility in the selection of the adjustment pixel columns to maintain a larger spacing therebetween or, alternatively, can be sized to provide more flexibility in the selection of the adjustment pixel columns to maintain a smaller or basically no spacing therebetween.

The image resizing software can of course be used in other applications aside from photocopiers. For example, the image resizing software may be executed by a personal computer or the like and run as a stand-alone digital image editing tool or may be incorporated into other available digital image editing applications to provide enhanced image resizing functionality.

The image resizing software can be embodied as computer readable program code stored on a computer readable medium. The computer readable medium is any data storage device that can store data, which can thereafter be read by a computer system. Examples of computer readable medium include read-only memory, random-access memory, CD-ROMs, magnetic tape and optical data storage devices. The computer readable program code can also be distributed over a network including coupled computer systems so that the computer readable program code is stored and executed in a distributed fashion.

Although embodiments have been described, those of skill in the art will appreciate that the variations and modifications may be made without departing from the spirit and scope thereof as defined by the appended claims.

What is claimed is:

1. A computer-implemented method of fractionally resizing an image, comprising:
   using one or more computer processing units to perform the following:
   locating areas of sensitivity in said image;
   selecting adjustment lines in said image at least partially based on the location of said areas of sensitivity; and
   resizing said image along said adjustment lines;
   wherein said adjustment lines are selected to avoid areas of sensitivity; and
   wherein said image is resized according to a non-integer scaling factor, for scaling factors below one, said adjustment lines being deleted during resizing and for scaling factors greater than one, said adjustment lines being duplicated during resizing.

2. The method of claim 1 wherein said areas of sensitivity are edges in said image.

3. The method of claim 1 further comprising examining said adjustment lines to detect zones thereof passing through areas of sensitivity, upon deleting or duplicating of adjustment lines, detected zones being replaced with image information selected to maintain visual continuity in said resized image.

4. The method of claim 3 wherein said image information is selected from at least one library.

5. The method of claim 3, further comprising dividing said image into a number of regions, each region encompassing an adjustment line.

6. The method of claim 5, wherein said regions are generally evenly-sized.

7. The method of claim 5 further comprising examining subsets of said regions to determine the extent to which lines therein pass through areas of sensitivity and using the results of said examining to select said adjustment lines.

8. The method of claim 7 wherein during said examining, corresponding subsets of said regions are examined to determine the set of adjustment lines for each subset group that avoids areas of sensitivity to the greatest extent, the sets of adjustment lines being compared to detect and select the set of adjustment lines that overall avoids areas of sensitivity to the greatest extent.

9. The method of claim 8, wherein said subsets are generally evenly-sized.

10. The method of claim 9 wherein said subsets are sized to maintain a minimum spacing between adjustment lines in adjacent regions.

11. The method of claim 8 wherein during said examining at least one histogram representing edges in said image is generated and used to detect and select said set of adjustment lines.

12. The method of claim 11 wherein said subsets are sized to maintain a minimum spacing between adjustment lines in adjacent regions.

13. The method of claim 1 wherein said adjustment lines are parallel lines of image pixels.

14. The method of claim 13, wherein said locating, selecting and resizing are first performed along a first dimension of said image, and are then repeated for a second orthogonal dimension of said image.

15. A computer-implemented method of fractionally resizing an image, comprising:
using one or more computer processing units to perform the following:
locating areas of sensitivity in said image; and
resizing said image along unevenly spaced lines in said image to avoid resizing along lines passing through localized areas of sensitivity, and
wherein said image is resized according to a non-integer scaling factor, for scaling factors below one, said unevenly spaced lines being deleted during resizing and for scaling factors greater than one, said unevenly spaced lines being duplicated during resizing.

16. The method of claim 15 further comprising examining said unevenly spaced lines to detect zones thereof passing through localized areas of sensitivity, upon deleting or duplicating of unevenly spaced lines, detected zones being replaced with image information selected to maintain visual continuity in said resized image.

17. The method of claim 16, wherein said locating and resizing are first performed along a first dimension of said image, and are then repeated for a second orthogonal dimension of said image.

18. The method of claim 16 wherein said areas of sensitivity are edges in said image.

19. The method of claim 18 wherein said unevenly spaced lines are parallel lines of image pixels.

20. A computer-implemented method of fractionally resizing an image according to a non-integer scaling factor, comprising:
using one or more computer processing units to perform the following:
selecting a number of adjustment lines in said image distributed generally evenly across said image according to said scaling factor, for scaling factors below one said adjustment lines being deleted during resizing and for scaling factors greater than one, said adjustment lines being duplicated during resizing;
identifying areas of sensitivity in said image;
adjusting the positions of said adjustment lines to reduce the intersection of said adjustment lines with said identified areas of sensitivity; and
resizing said image along said adjustment lines.

21. The method of claim 20 further comprising examining said adjustment lines to detect zones thereof passing through areas of sensitivity, upon deleting or duplicating of adjustment lines, detected zones being replaced with image information selected to maintain visual continuity in said resized image.

22. The method of claim 21 wherein said areas of sensitivity are edges in said image.

23. The method of claim 20, wherein said selecting, identifying, adjusting and resizing are first performed along a first dimension of said image, and are then repeated for a second orthogonal dimension of said image.

24. The method of claim 23 wherein said adjustment lines are parallel lines of image pixels.

25. A computer readable medium embodying a computer program executable by a computer for fractionally resizing an image, by:
locating areas of sensitivity in said image;
selecting adjustment lines in said image at least partially based on the location of said areas of sensitivity; and
resizing said image along said adjustment lines;
wherein said adjustment lines are selected to avoid areas of sensitivity; and
wherein said image is resized according to a non-integer scaling factor, for scaling factors below one, said adjustment lines being deleted during resizing and for scaling factors greater than one, said adjustment lines being duplicated during resizing.

26. An apparatus for fractionally resizing an image according to a non-integer scaling factor comprising:
an image processor examining said image to locate areas of sensitivity in said image and selecting unevenly spaced adjustment lines in said image, said adjustment lines being selected to avoid areas of sensitivity in said image, said image processor resizing said image by duplicating selected adjustment lines during an image stretch and by deleting selected adjustment lines during an image reduction.

27. An apparatus according to claim 26 wherein said image processor detects zones of said selected adjustment lines passing through areas of sensitivity and replaces detected zones of said resized image with image information selected to maintain visual continuity in said resized image.

28. An apparatus according to claim 27 further comprising at least one library storing said image information.

29. An apparatus according to claim 27 further comprising a scanner to scan said image prior to processing.

30. An apparatus according to claim 27 wherein said areas of sensitivity are edges in said image.

* * * * *